PRESORTING METHOD AND APPARATUS

Filed June 24, 1966

INVENTORS
DAVID G. CURPHEY
WILLIAM J. FOWLER

BY Francis W. Anderson
ATTORNEY

INVENTORS
DAVID G. CURPHEY
WILLIAM J. FOWLER

BY Francis W. Anderson
ATTORNEY

INVENTORS
DAVID G. CURPHEY
WILLIAM J. FOWLER
BY Francis W. Anderson
ATTORNEY

INVENTORS
DAVID G. CURPHEY
WILLIAM J. FOWLER
BY Francis W. Anderson
ATTORNEY

INVENTORS
DAVID G. CURPHEY
WILLIAM J. FOWLER

BY Francis W. Anderson
ATTORNEY

INVENTORS
DAVID G. CURPHEY
WILLIAM J. FOWLER
BY Francis W. Anderson
ATTORNEY

PRESORTING METHOD AND APPARATUS

Filed June 24, 1966

INVENTORS
DAVID G. CURPHEY
WILLIAM J. FOWLER

BY Francis W. Anderson

ATTORNEY

INVENTORS
DAVID G. CURPHEY
WILLIAM J. FOWLER

BY *Francis W. Anderson*
ATTORNEY

INVENTORS
DAVID G. CURPHEY
WILLIAM J. FOWLER
BY Francis W. Anderson
ATTORNEY

INVENTORS
DAVID G. CURPHEY
WILLIAM J. FOWLER
BY Francis W. Anderson
ATTORNEY

INVENTORS
DAVID G. CURPHEY
WILLIAM J. FOWLER
BY Francis W. Anderson
ATTORNEY

PRESORTING METHOD AND APPARATUS

Filed June 24, 1966

INVENTORS
DAVID G. CURPHEY
WILLIAM J. FOWLER

BY Francis W. Anderson

ATTORNEY

INVENTORS
DAVID G. CURPHEY
WILLIAM J. FOWLER

BY Francis W. Anderson
ATTORNEY

ADJACENT BIT RECOGNIZER CIRCUIT

INVENTORS
DAVID G. CURPHEY
WILLIAM J. FOWLER

BY *Francis W. Anderson*
ATTORNEY

INVENTORS
DAVID G. CURPHEY
WILLIAM J. FOWLER

BY Francis W. Anderson
ATTORNEY

INVENTORS
DAVID G. CURPHEY
WILLIAM J. FOWLER
BY Francis W. Anderson
ATTORNEY

INVENTORS
DAVID G. CURPHEY
WILLIAM J. FOWLER
BY Francis W. Anderson
ATTORNEY

INVENTORS
DAVID G. CURPHEY
WILLIAM J. FOWLER

BY Francis W. Anderson
ATTORNEY

INVENTORS
DAVID G. CURPHEY
WILLIAM J. FOWLER
BY Francis W. Anderson
ATTORNEY

March 11, 1969 D. G. CURPHEY ET AL 3,432,032

PRESORTING METHOD AND APPARATUS

Filed June 24, 1966

Sheet 20 of 21

INVENTORS
DAVID G. CURPHEY
WILLIAM J. FOWLER

BY Francis W. Anderson
ATTORNEY

INVENTORS
DAVID G. CURPHEY
WILLIAM J. FOWLER
BY Francis W. Anderson
ATTORNEY

United States Patent Office 3,432,032
Patented Mar. 11, 1969

3,432,032
PRESORTING METHOD AND APPARATUS
David G. Curphey, Sunnyvale, and William J. Fowler, San Jose, Calif., assignors to FMC Corporation, San Jose, Calif., a corporation of Delaware
Filed June 24, 1966, Ser. No. 560,323
U.S. Cl. 209—73 46 Claims
Int. Cl. B07c 5/06, 5/34; G06k 9/00

ABSTRACT OF THE DISCLOSURE

The presorting apparatus of the present invention serves to separate non-machine readable mail from the machine readable mail. It is the purpose of the presorting apparatus to scan and detect the character-to-character relationship of the address of an article to determine whether the address is in the form of printed indicia or non-printed indicia. Toward this end, the factors considered are the character density, the character height, envelope length, skew and location of the address.

The present invention relates in general to mail sorting systems, and more particularly to a presorting apparatus for a mail sorting system.

Mail sorting systems employ automatic address reading apparatus, which are relatively expensive character recognition equipment. Such apparatus are capable of reading the address on letter mail when prescribed address characteristics are present. The prescribed address characteristics are determined by the size and density of the characters, extent of character skew, and position of the address block on the envelope. The addresses on letter mail that conform to the prescribed address characteristics are referred to as machine readable letter mail and the addresses on letter mail that fail to conform to the prescribed address characteristics are referred to as non-machine readable letter mail.

Accordingly, an object of the present invention is to provide apparatus for the separation of the non-machine readable mail from the machine readable mail.

Another object of the present invention is to provide presorting apparatus for improving the efficiency of mail sorting systems by separating the non-machine readable mail from the machine readable mail.

Another object of the present invention is to provide presorting apparatus for reducing the loss of time in operating expensive character recognition equipment by diverting therefrom non-machine readable mail.

Another object of the present invention is to provide presorting apparatus for reducing the equipment costs for mail sorting systems without sacrificing the efficiency or reliability thereof.

Another object is to provide a method of sorting articles according to the types of indicia thereon.

Other and further objects and advantages of the present invention will be apparent to one skilled in the art from the following description taken in conjunction with the accompanying drawings, in which.

Figure 10A:
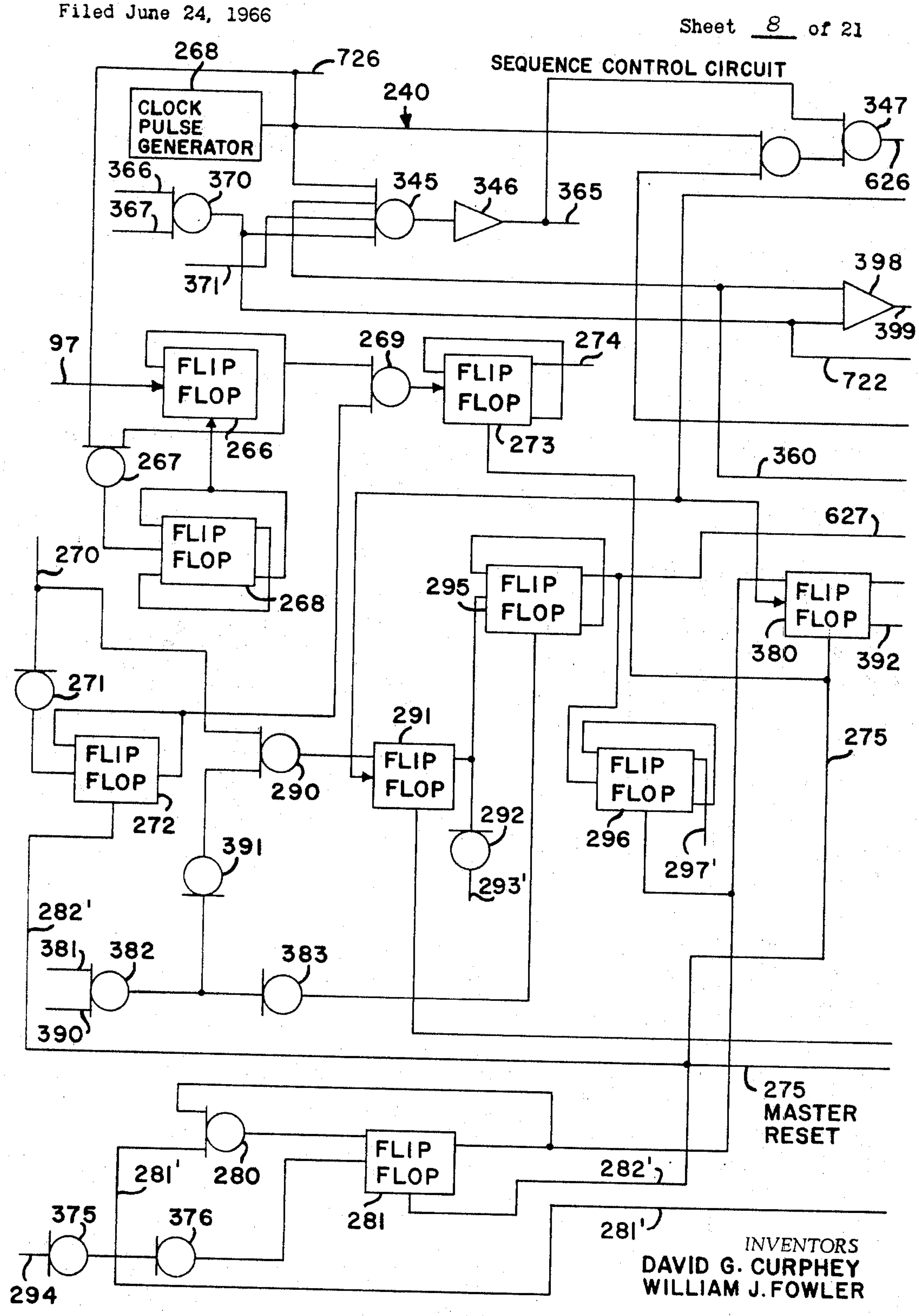
Figure 10B:
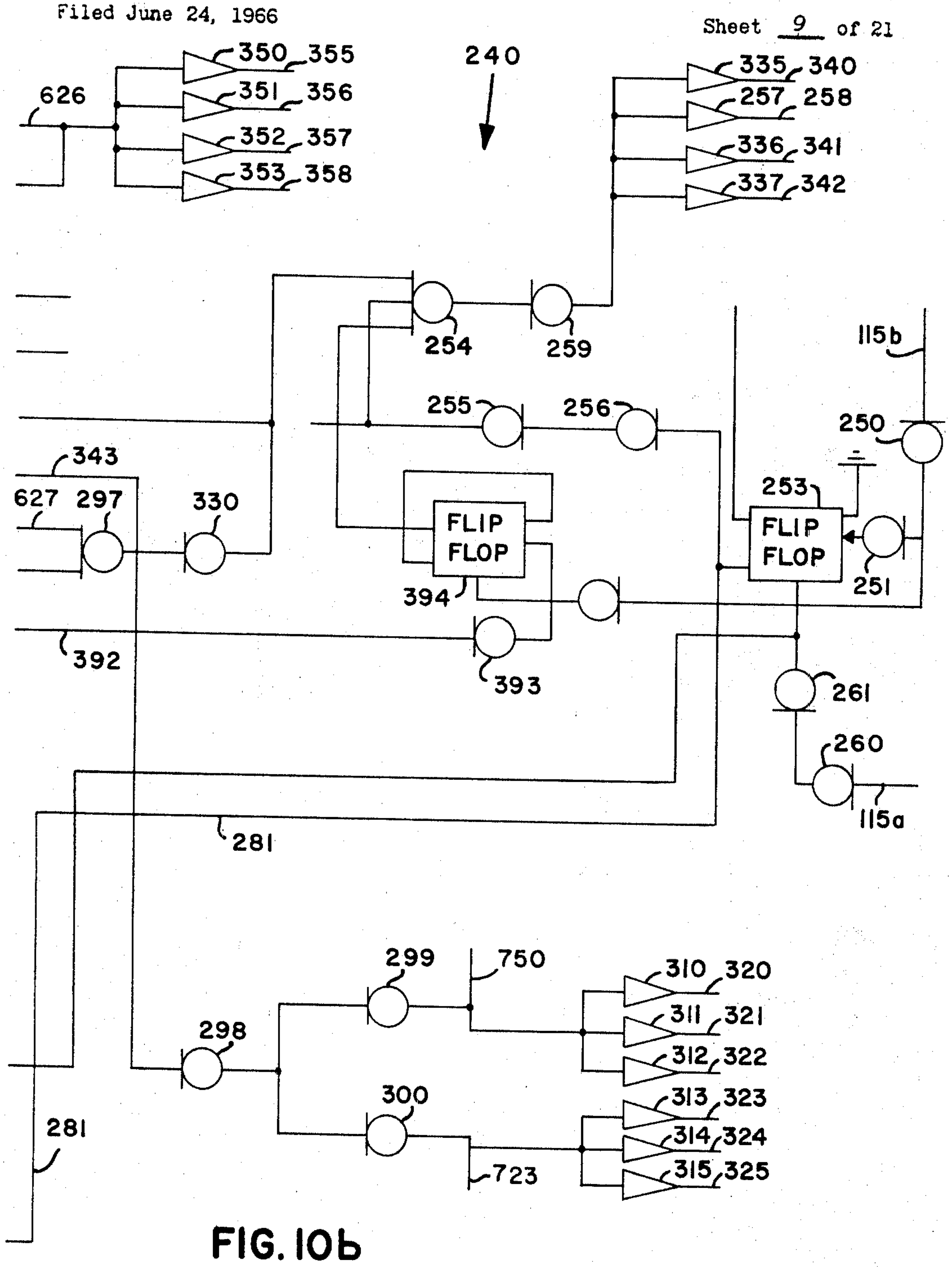

FIGS. 10*a* and 10*b*, when placed side by side with FIG. 10*b* to the right of FIG. 10*a*, are a schematic diagram of a sequence control circuit employed in the presorting apparatus of the present invention.

Figure 11A:
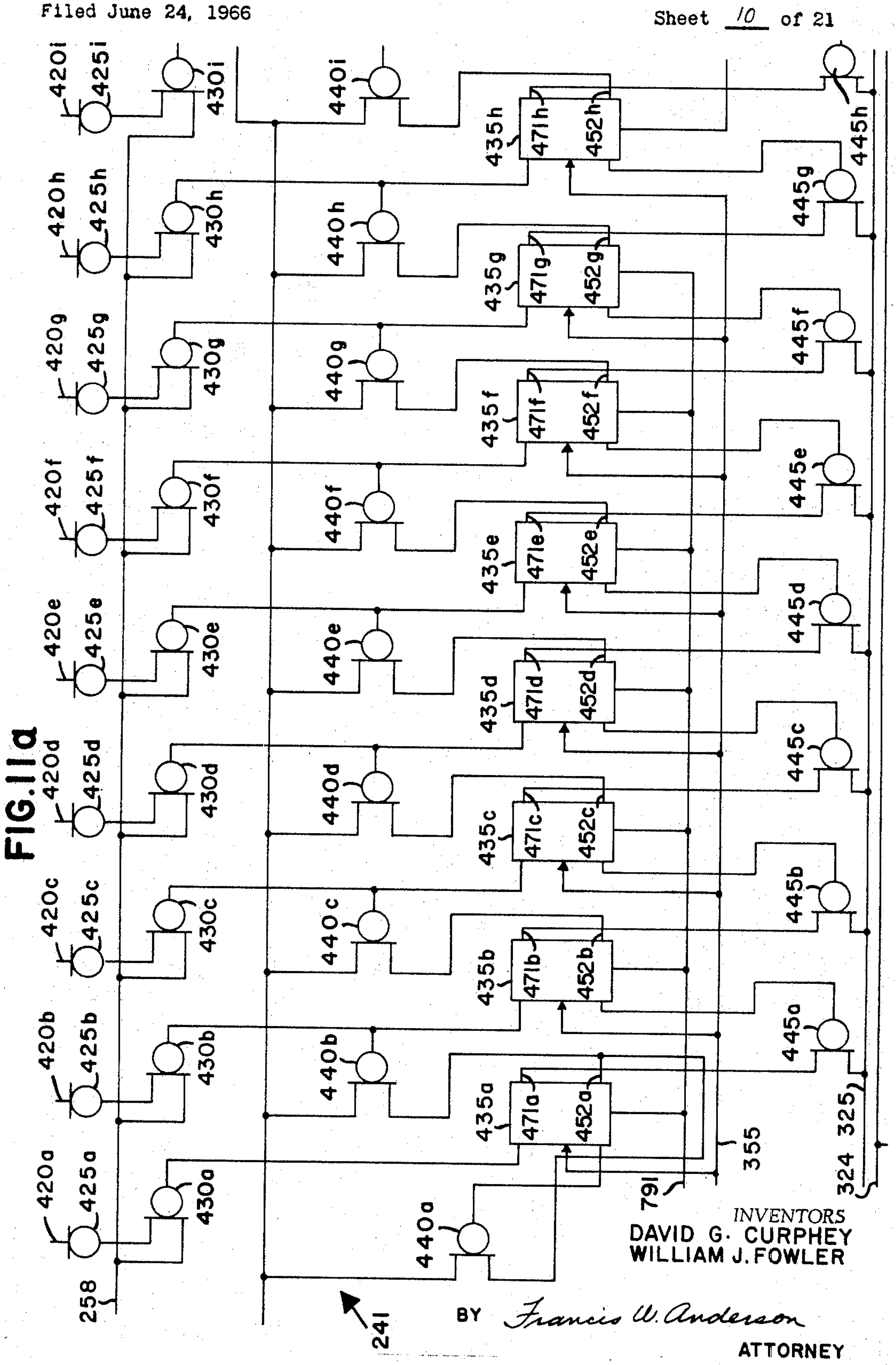
Figure 11B:
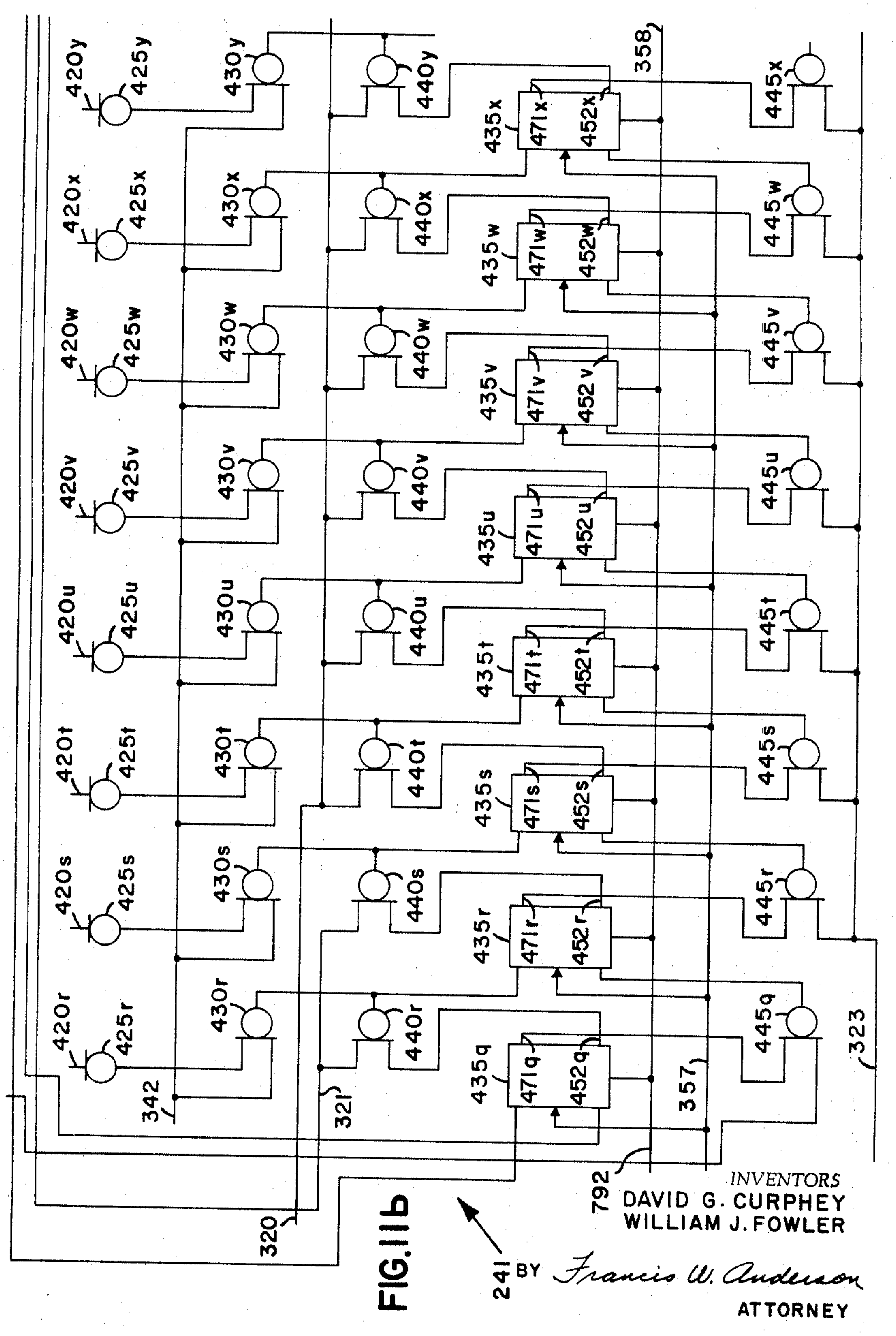
Figure 11C:
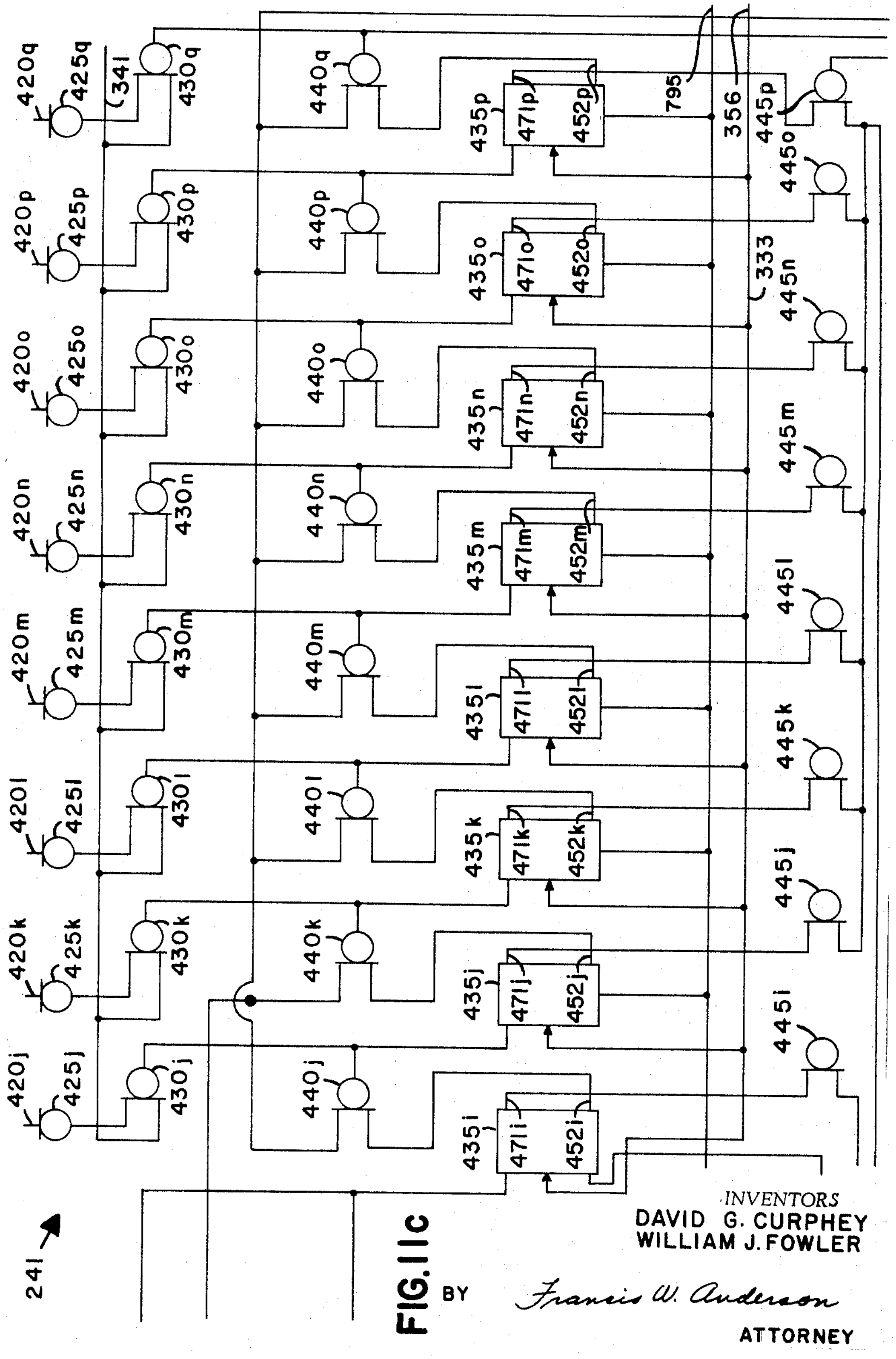

FIGS. 11*a*–11*d* when placed in the manner shown in FIG. 11*e* are a schematic diagram of a shift register circuit and an out-of-range detector circuit employed in the presorting apparatus of the present invention.

Figure 12:
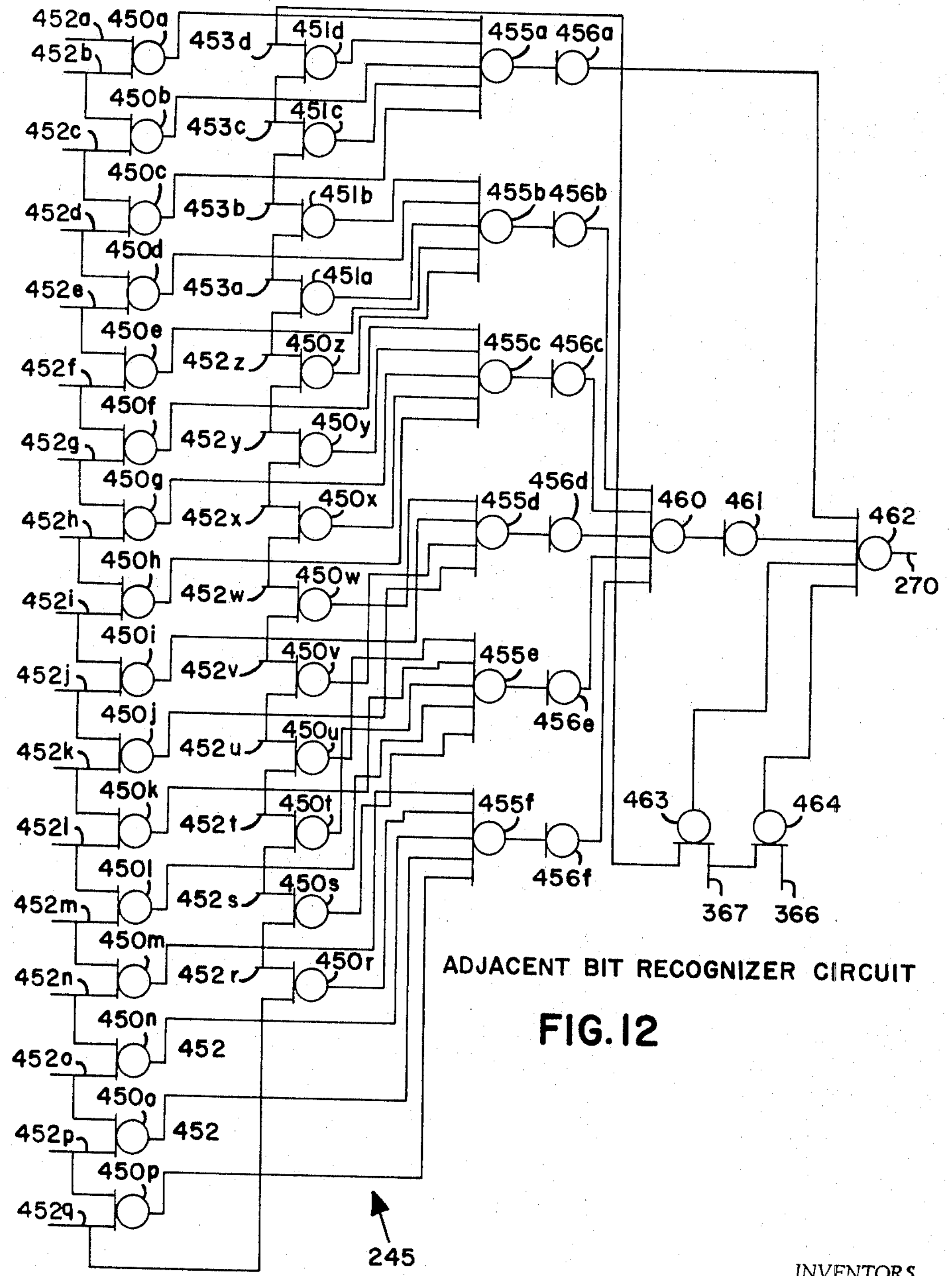

FIG. 12 is a schematic diagram of the adjacent bit recognition circuit employed in the presorting apparatus of the present invention.

Figure 13:
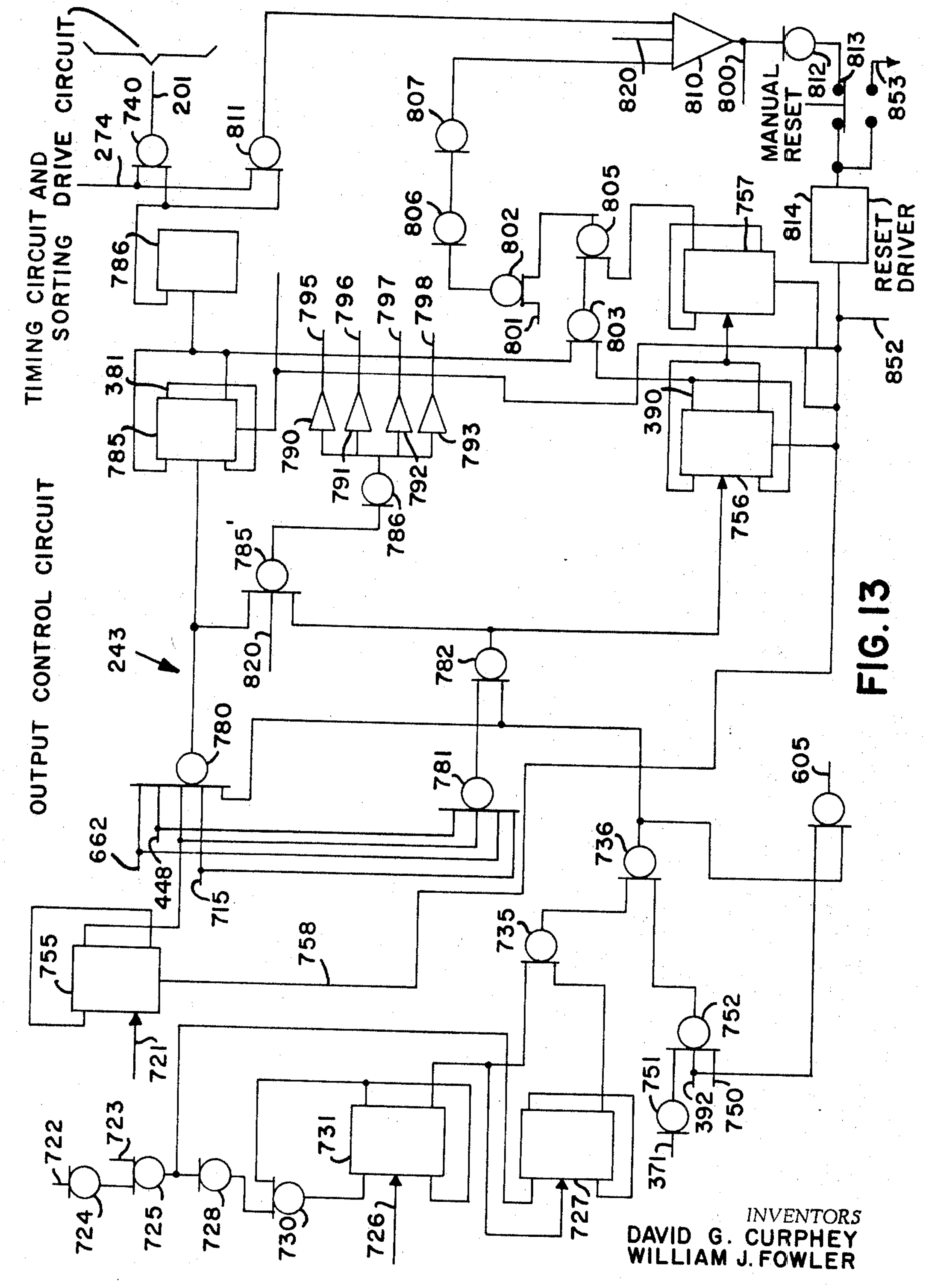

FIG. 13 is a schematic diagram of the output control circuit employed in the presorting apparatus of the present invention.

Figure 14A:
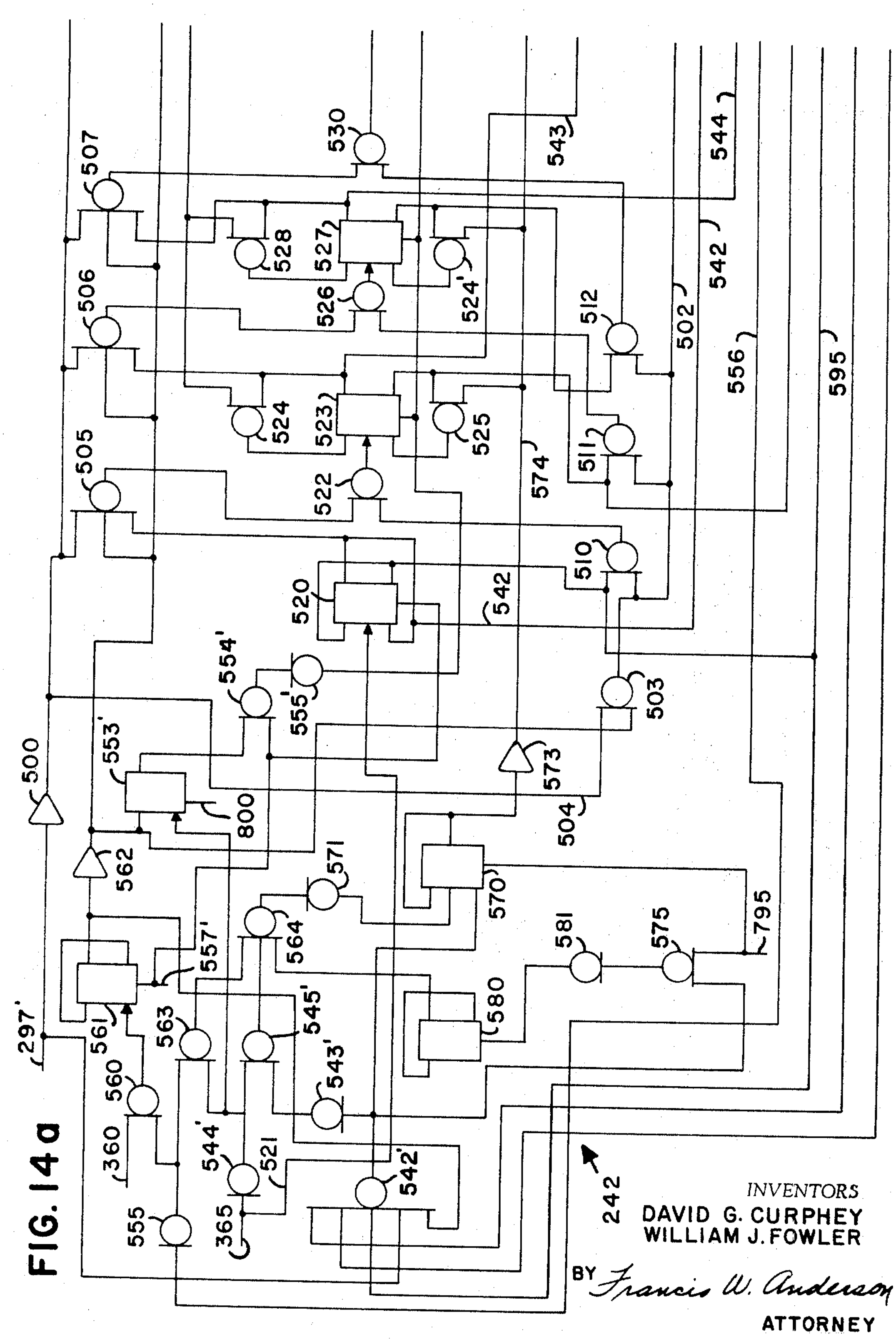
Figure 14B:
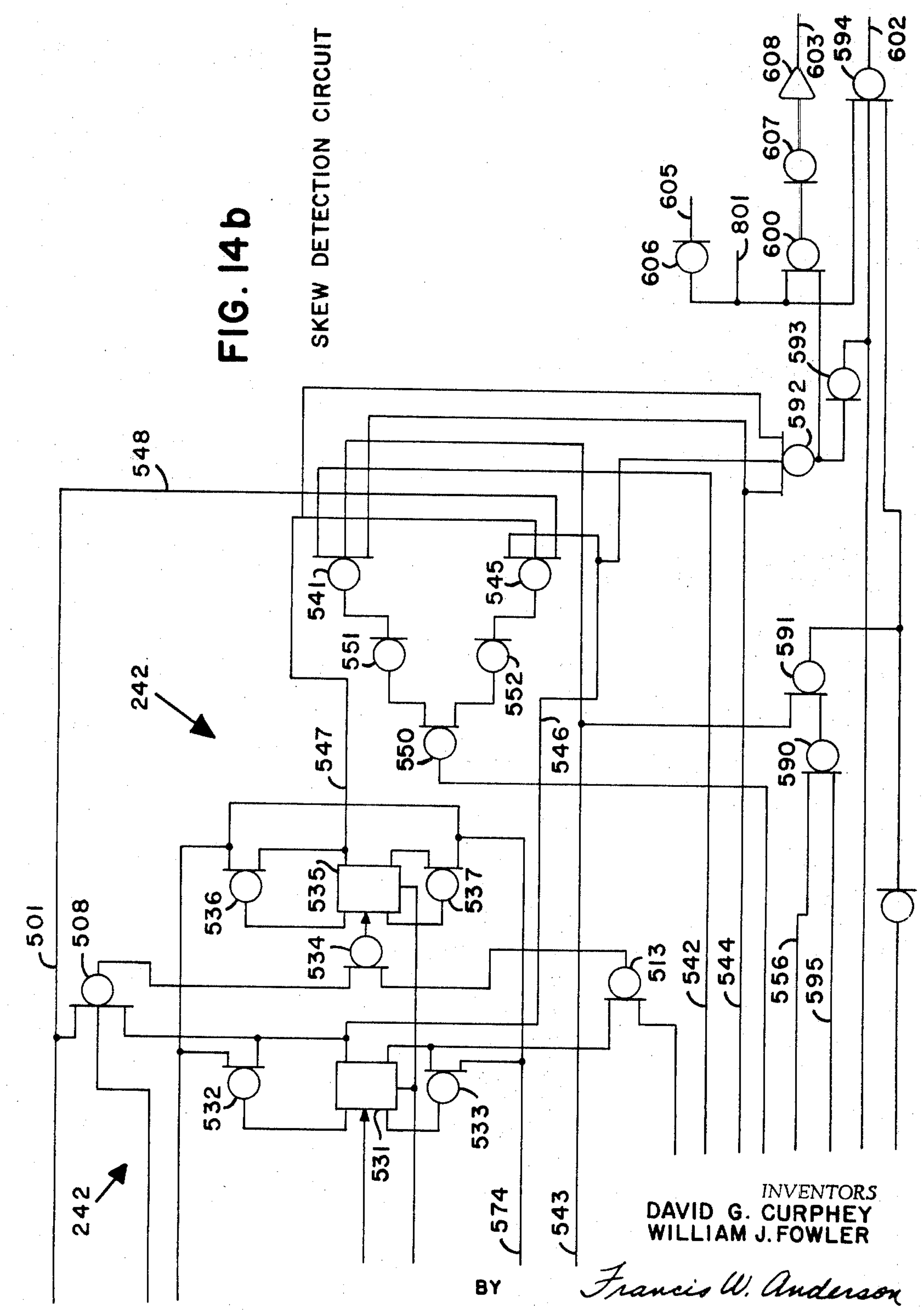

FIGS. 14*a* and 14*b*, when placed end to end with FIG. 14*b* to the right of FIG. 14*a*, are a schematic diagram of a skew detector and up-down counter circuit employed in the presorting apparatus of the present invention.

Figure 15:
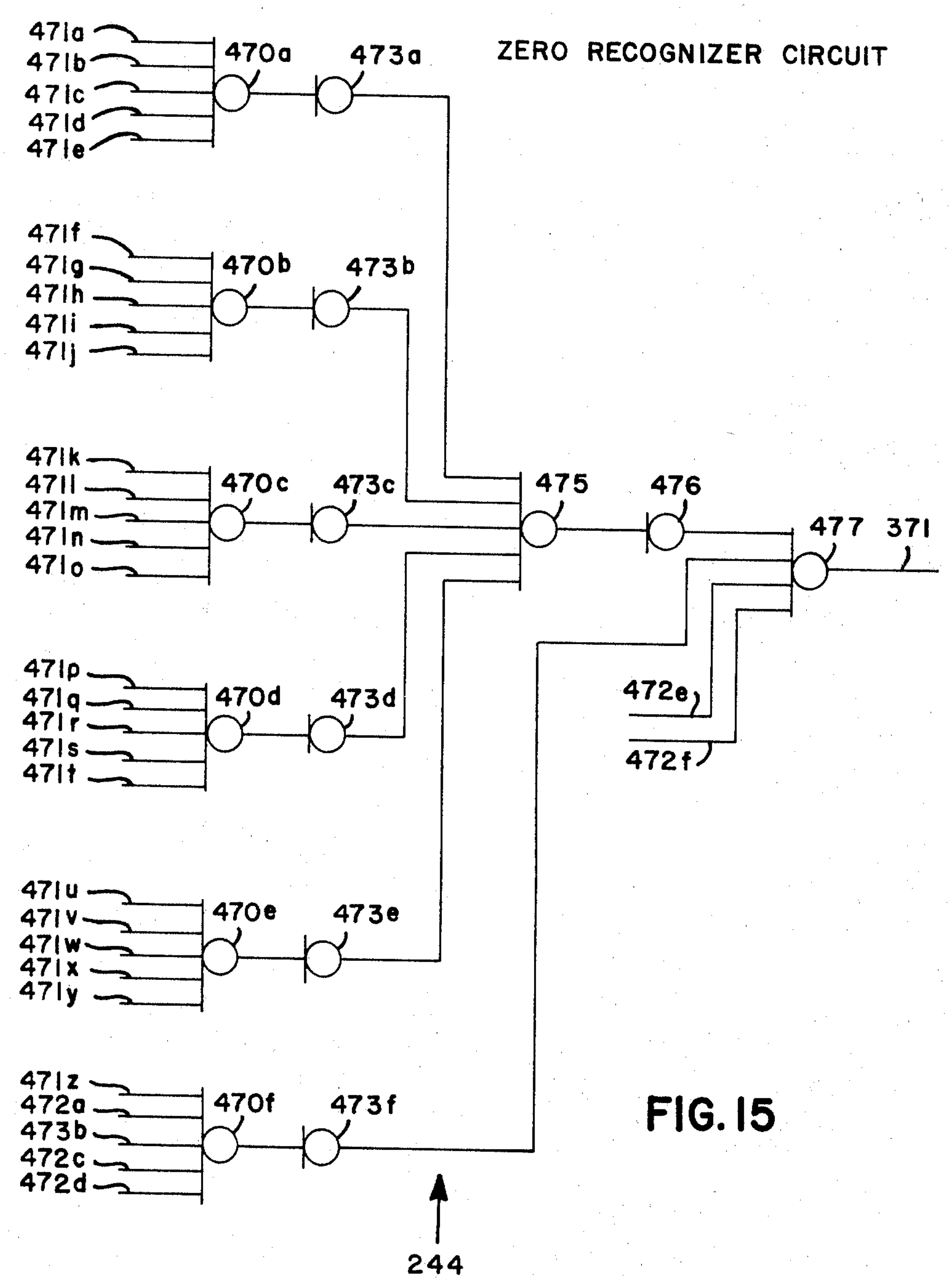

FIG. 15 is a schematic diagram of the zero recognition circuit employed in the presorting apparatus of the present invention.

Figure 16:
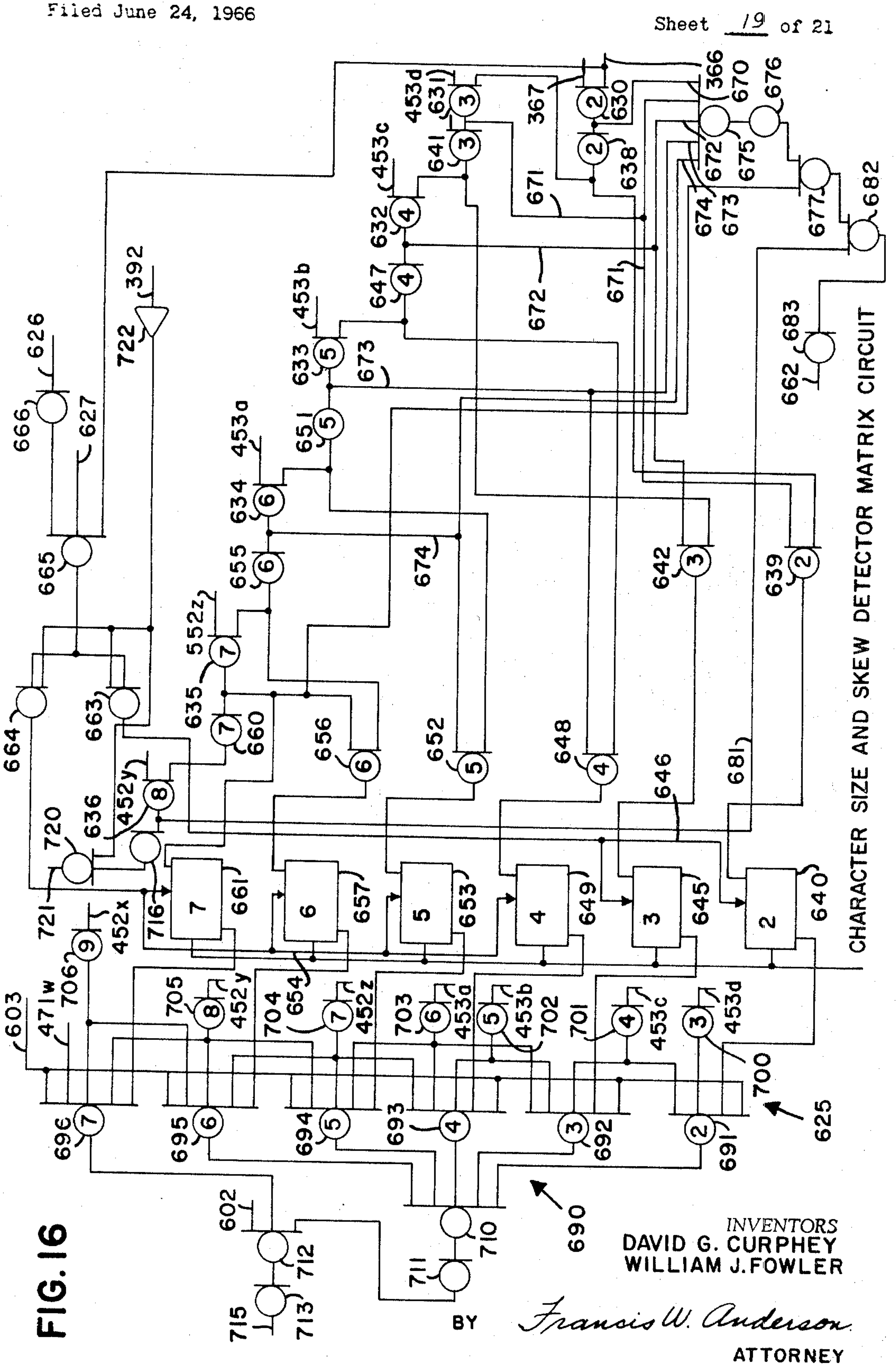

FIG. 16 is a schematic diagram of the character size and skew detector matrix employed in the presorting apparatus of the present invention.

Figure 17:
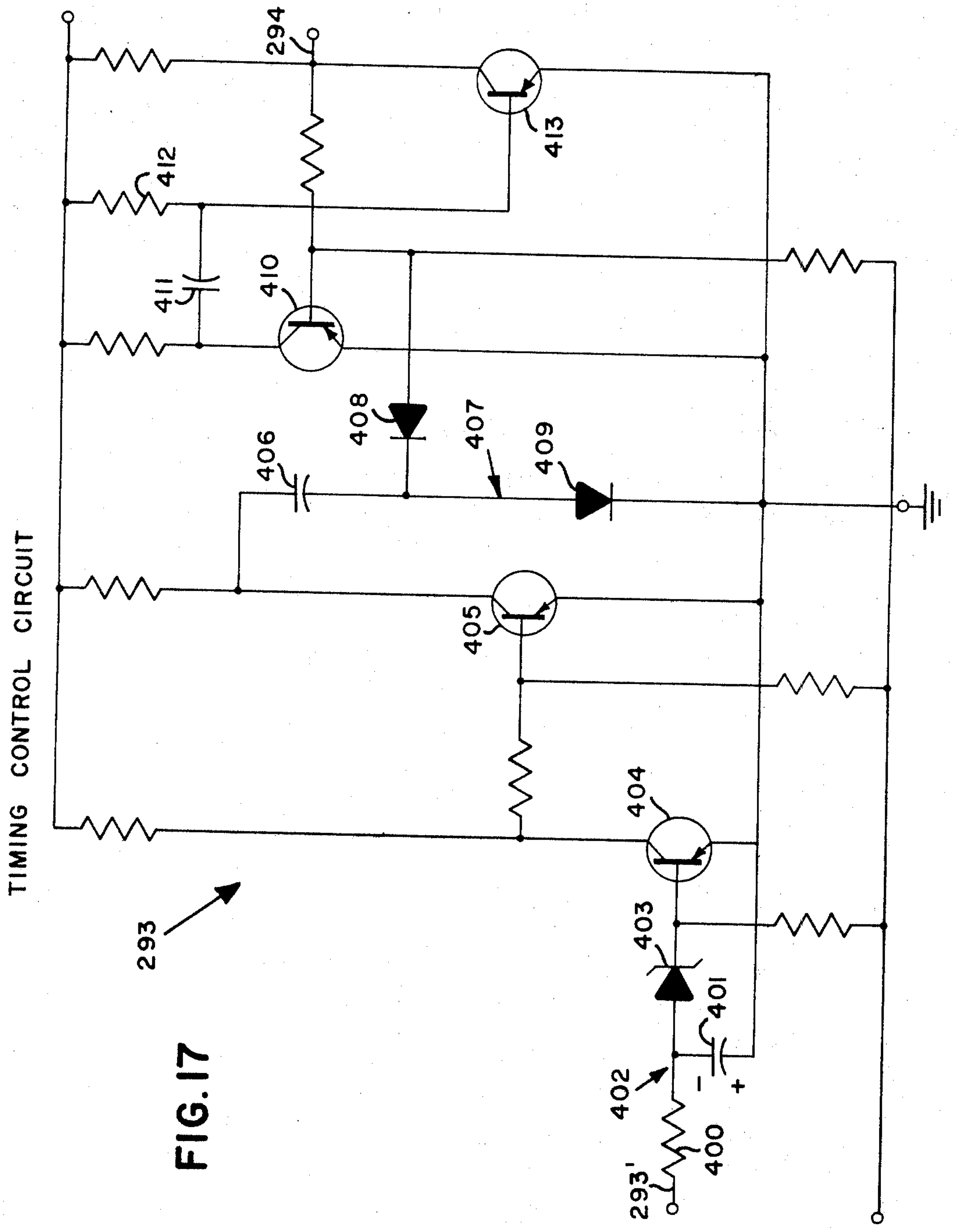

FIG. 17 is a schematic diagram of a timing control circuit employed in the presorting apparatus of the present invention.

Figure 18:
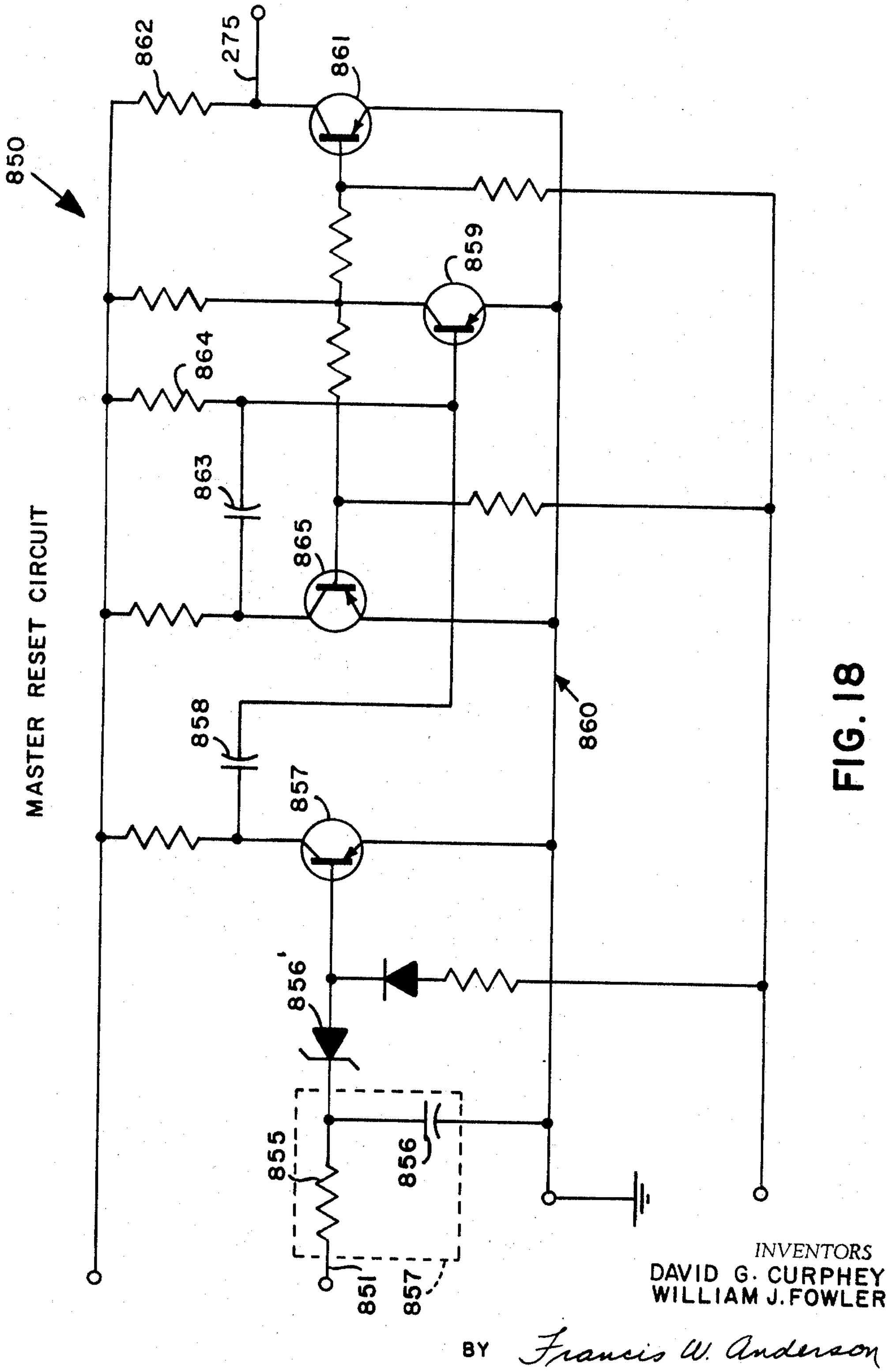

FIG. 18 is a schematic diagram of a master reset circuit employed in the presorting apparatus of the present invention.

GENERAL DESCRIPTION

Figure 1:
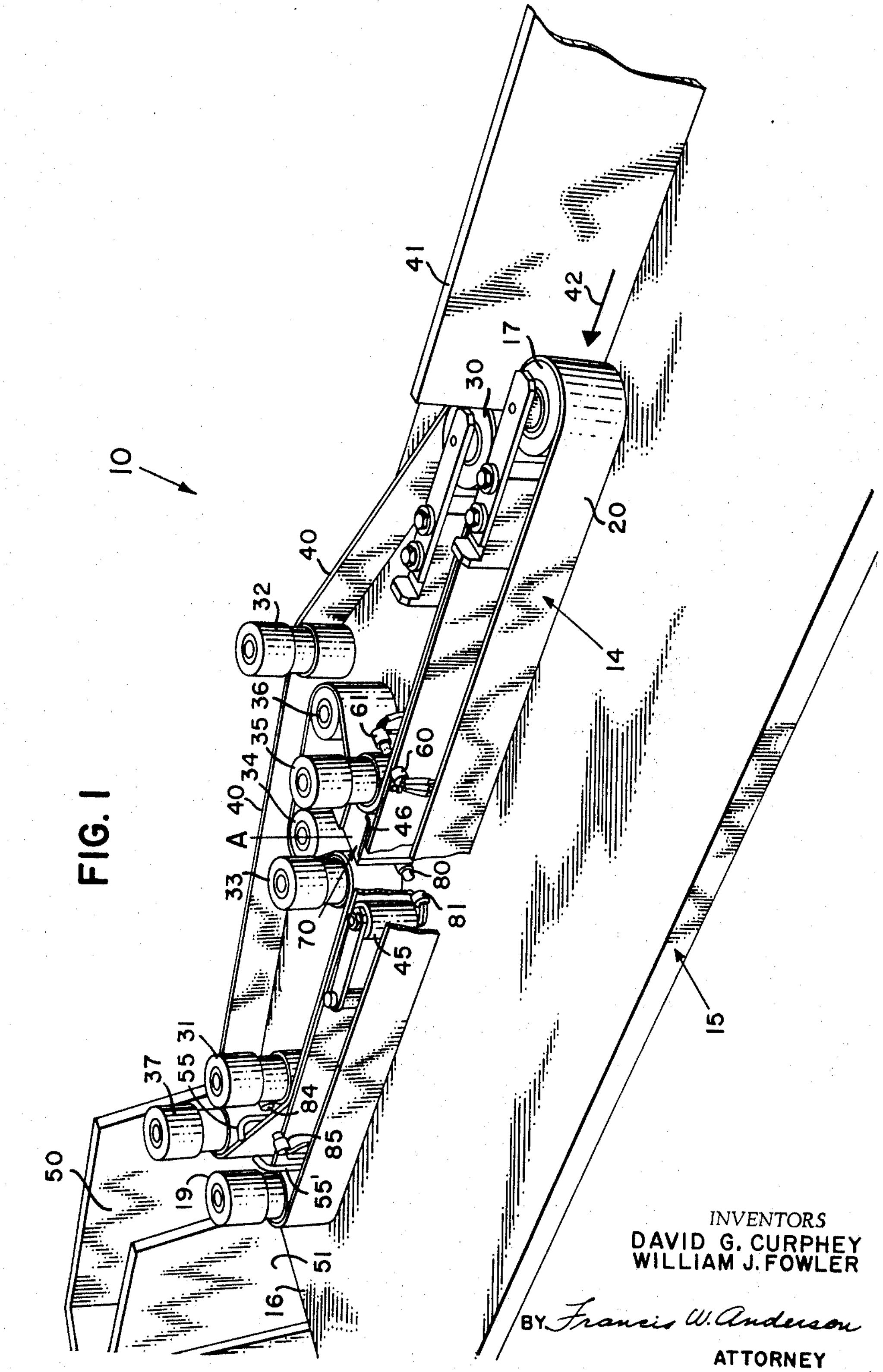
FIG. 1 is a perspective view of the presorting apparatus of the present invention.

Illustrated in FIG. 1 is the presorting apparatus 10 of the present invention, which comprises a support structure 15 having a flat, horizontally disposed platform 16. Mounted on the platform 16 is a letter transport mechanism 14 having an idler roller 17 and a drive roller 19. The rollers 17 and 19 have their axes disposed in the upright position. Trained around the rollers 17 and 19 is an endless pinch belt 20 of the letter transport mechanism 14 with a flat article engaging surface disposed perpendicular to the platform 16.

Also mounted on the platform 16 are idler rollers 30–32, guide rollers 33–36 and drive roller 37. The rollers 30–37 of the letter transport mechanism 14 have their axes disposed in parallel relation with the axes of the rollers 17 and 19. An endless pinch belt 40 of the letter transport mechanism 14 has its flat article engaging surface disposed in the upright position. Suitable drive means for the letter transport mechanism 14, not shown, are disposed below the platform 16 and drive the drive rollers 19 and 37 to impart rotation to the pinch belts 20 and 40.

Adjacent to the roller 17 and spaced therefrom in the direction of the pinch belt 40 is an upright guide plate 41, which is mounted on the platform 16. The guide plate 41 serves to guide letter mail between the pinch belts 20 and 40 for advancement in the direction of an arrow 42.

The pinch belt 20 supports spaced envelopes in an upright position to be advanced successively in the direction of the arrow 42 over the full length of the path in which the envelopes travel. The pinch belt 40 establishes a pinch drive with the pinch belt 20 for the advancement of the envelopes downstream over the platform 16. Intermediate the ends of the platform 16, the pinch belt 40 travels in spaced relation with the pinch belt 20 over a path defined by the rollers 33–36. The path defined by the rollers 33–36 forms a scanning zone area A. From the scanning zone area A, the pinch belt 40 continues in pinch drive relation with the pinch belt 20. The letter input end of the letter transport mechanism 14 is located between guide plate 41 and the roller 17. The latter discharge end of the letter transport mechanism 14 is located beyond the drive rollers 19 and 37.

A spring loaded roller 45 with an upright axis is disposed in engagement with the pinch belt 20 in opposed relation with the roller 33 for keeping the front surface of the letter mail in flush engagement with an upright spacer plate 46 located in the scanning zone A between the rollers 33 and 35.

At the discharge end of the pinch belts 20 and 40 are disposed letter receptacles 50 and 51 for receiving the machine readable letter mail and the non-machine readable letter mail, respectively. To divert selected letters from the path of travel to either the receptacle 50 or the receptacle 51, suitable air blast diverter nozzles 55 and 55' are provided. Normally, the air blast diverter nozzle 55 is operated directing the letter flow to the non-machine readable letter mail receptacle 51. Should a machine readable letter mail be detected in the scanning zone A, the air blast diverter nozzle 55' is operated and the air blast diverter nozzle 55 is cut off to direct such mail to the machine readable receptacle 50.

Letter mail is placed against the guide plate 41 between the guide plate 41 and the pinch belt 20. The address side of the letter mail is positioned facing the guide plate 41 with the stamp at the leading upper edge of the letter mail. Thus, the letter mail is positioned right side up from the point of view of the reading of the address.

A suitable letter mail feeding apparatus, not shown, continuously feeds letter mail in succession and in spaced relation to the presorting apparatus 10. The gap between the leading edge and the trailing edge of adjacent succeeding envelopes in the exemplary embodiment is in the vicinity of 2¾ inches. The letter mail so fed is pinched between the belts 20 and 40 and is advanced continuously in the preferred embodiment in the direction of the arrow 42 at the rate of 120 inches per second.

The presorting apparatus 10 of the present invention serves to separate the non-machine readable letter mail from the machine readable letter mail. It is the purpose of the presorting apparatus 10 to scan and detect the character-to-character relationship of the address to render a presort decision and is not intended to read the address. The reading of the address is accomplished by the character recognition equipment. However, presently available character recognition equipment cannot read script, handwritten, italicized or character connected font.

The factors considered in the presorting of letter mail along with the acceptable ranges thereof are as follows:

| | |
|---|---|
| Character density | 8 to 14 per inch. |
| Character height | 45 to 225 mils. |
| Envelope length | 4¾ inches to 11½ inches. |
| Skew | Less than 5°, with respect to the bottom edge of the envelope. |

Figure 2:
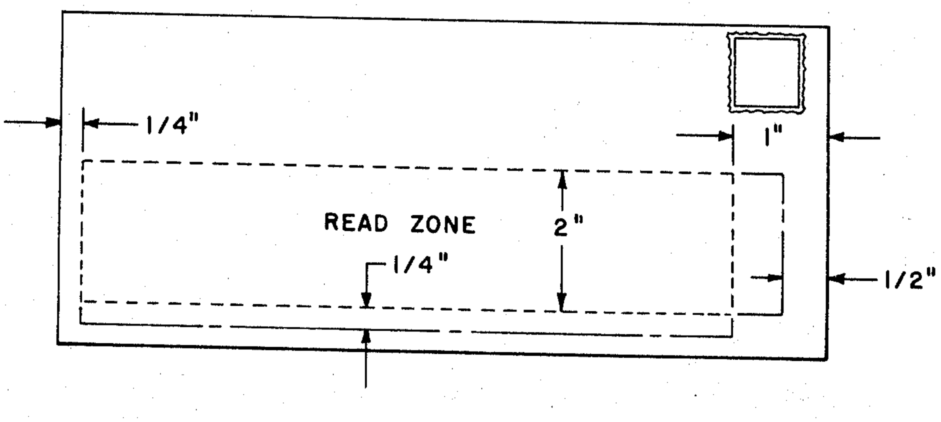
FIG. 2 is a plan view of a letter envelope illustrating various zones scanned by the presorting apparatus of the present invention in the separation of the non-machine readable mail from the machine readable mail.

The location of the address with respect to the envelope should meet the following requirements (see FIG. 2):

More than ½ inch but less than 2½ inches from the bottom edge of the envelope;

At least one inch to the left of the right edge of the envelope.

According to the present invention, the non-readable machine mail is separated from the machine readable machine mail by scanning each envelope individually to detect and analyze the foregoing requirements. The letter mail wherein the above requirements are met is classified as machine readable letter mail. The letter mail failing to meet these requirements is classified as non-machine readable letter mail.

Figure 3:
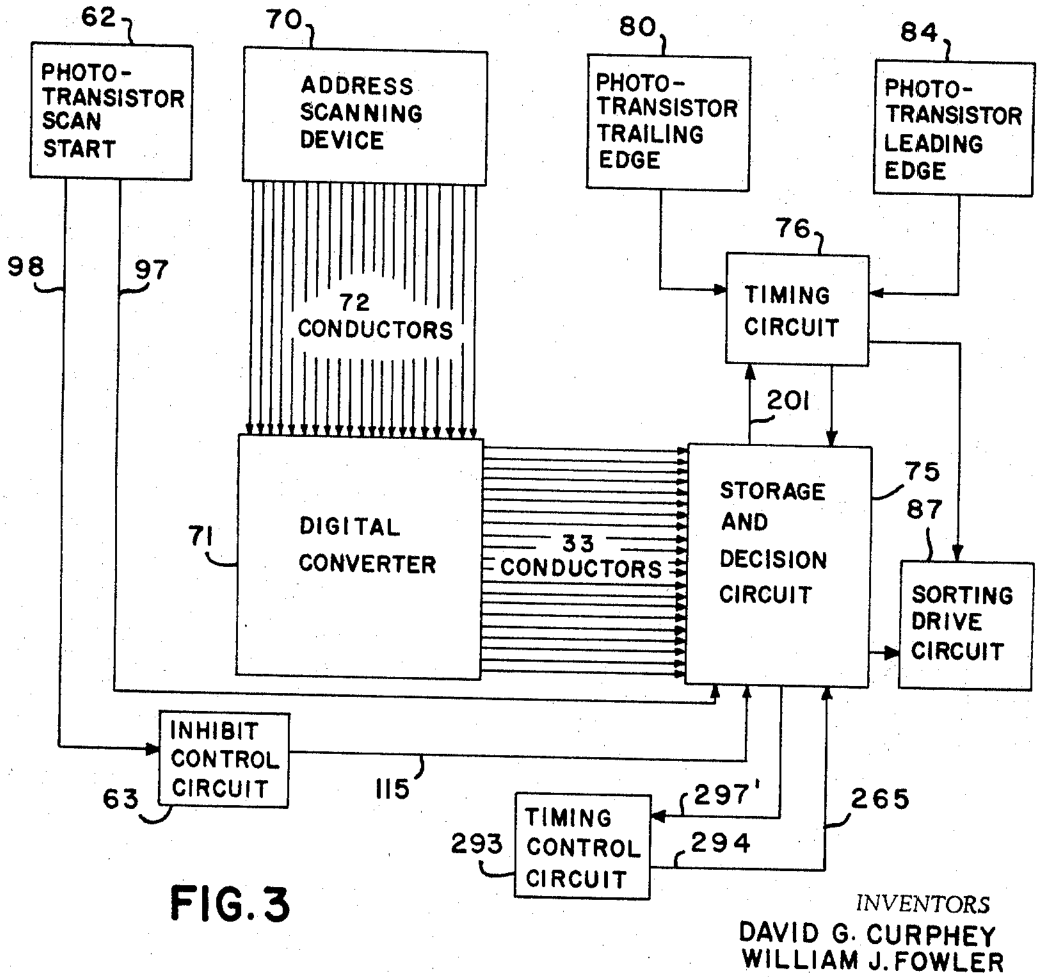
FIG. 3 is a block diagram illustrating the electrical operation of the presorting apparatus of the present invention.
Figure 4:
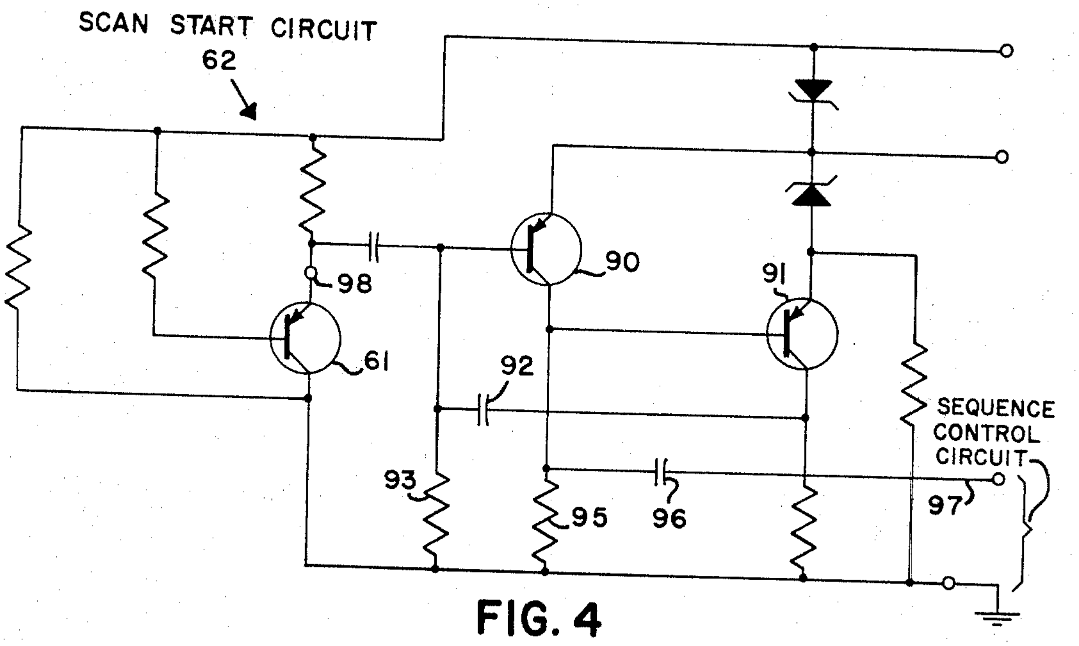
FIG. 4 is a schematic diagram of a scan start circuit employed in the presorting apparatus of the present invention.

Disposed adjacent to the path of travel of the letter mail upstream of the scanning zone A is a source of light 60 and a suitable scan start phototransistor 61 (FIGS. 1 and 4). As an envelope advances toward the scanning zone A, the leading edge thereof interrupts the beam of light projected from the source 60 toward the phototransistor 61. The output of the phototransistor 61 is connected to a scan start circuit 62 (FIG. 3). When the beam of light projected toward the phototransistor 61 is interrupted, the scan start circuit 62 is activated to remove a storage and decision inhibit control circuit 63 and to transmit a timing reference signal for comparing the address longitudinally with respect to the leading edge of the envelope advancing toward the scanning zone A. The storage and decision inhibit control circuit 63 serves to block out false signals that may emanate from the discoloration of the pinch belt 20 when an envelope is not advancing through the scanning zone A.

Figure 5:
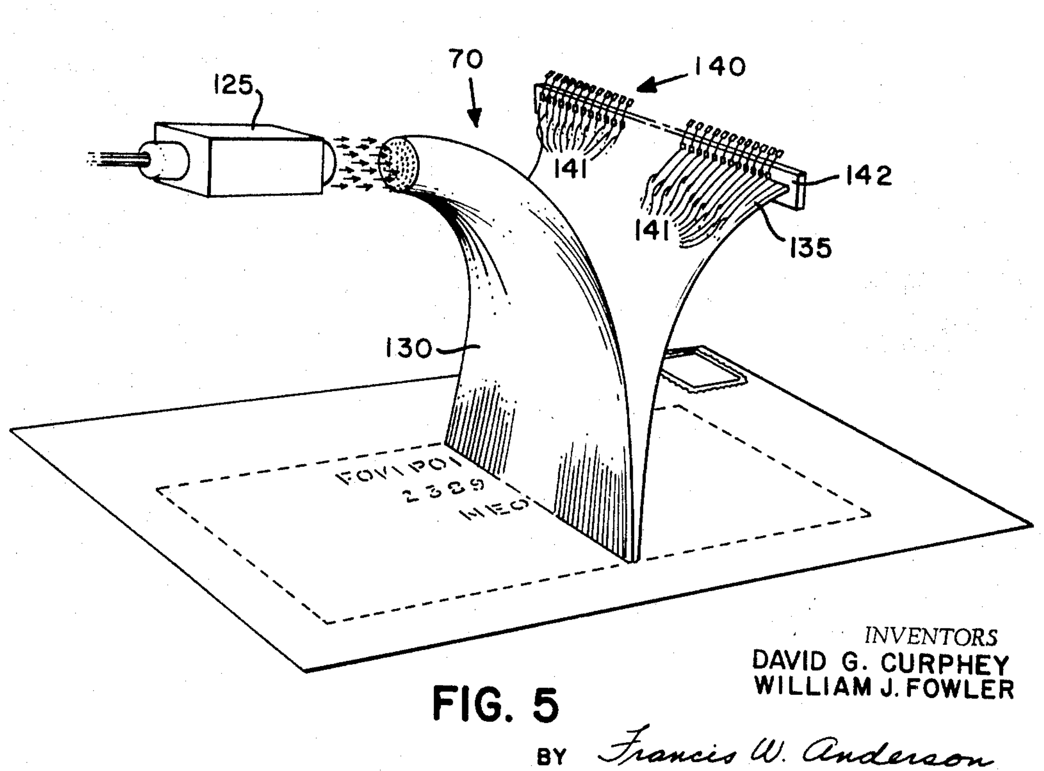
FIG. 5 is a diagrammatic illustration of the address scanning device employed in the presorting apparatus of the present invention illustrated in conjunction with an envelope.

Downstream of the phototransistor 61 and disposed within the scanning zone A is an address scanning device 70 (FIGS. 1, 3 and 5). The address scanning device 70 defines a vertical optical scanning line downstream of and adjacent to the downstream upright edge of the spacer plate 46. The envelope advances continuously through the scanning zone A in an upright position with the front face or address side thereof facing the scanning device 70 and with the stamp adjacent to the leading edge of the envelope and adjacent the upper edge thereof. As the envelope advances continuously through the scanning zone A, the scanning device 70 continuously takes successive vertical line readings commencing with the leading edge of the envelope and terminating at the trailing edge of the envelope.

The scanning device 70 (FIG. 5) includes seventy-two photosensitive elements in vertical alignment to scan the 2½ inch space above the lowest edge of the envelope advancing through the scanning zone A. The lowest eight photosensitive elements are combined for viewing the ½ inch space above the lowest edge of the envelope. The scanning device 70 produces during each vertical line reading sixty-four scanning output signals. The output signals produced by the scanning device 70 are fed respectively to a digital converter circuit 71 (FIG. 3) which converts each scanning signal respectively to a representative logic signal.

Connected to the output of the converter circuit 71 is a storage and decision circuit 75, which stores therein the converted logic signals for rendering a decision as to whether or not the letter mail under test is a machine readable letter or a non-machine readable letter.

As the trailing edge of the envelope advances beyond the phototransistor 61, the projected light to the phototransistor 61 is restored and the inhibit control circuit 63 is re-established to block out false signals that may emanate from the discoloration of the pinch belt 20.

Downstream of the scanning device 70 is located an envelope trailing edge phototransistor 80 (FIGS. 1 and 3) and a source of light 81 disposed adjacent the path of travel of the letter mail. The light source 81 continuously projects a beam of light across the path of travel of the letter mail and toward the phototransistor 80. While the envelope is in the scanning zone A and the trailing edge thereof is upstream of the address scanning device 70, the light beam projected toward the phototransistor 80 is interrupted. As the trailing edge of the envelope advances beyond the scanning device 70, the light cast upon the phototransistor 80 is no longer interrupted, whereby a timing circuit 76 (FIG. 3) is prepared for operating the sorting drive circuit 87.

An envelope leading edge phototransistor 84 (FIGS. 1 and 3) is disposed adjacent to the path of travel of letter mail downstream of the phototransistor 80. Casting light across the path of travel of the letter mail and toward the phototransistor 84 is a source of light 85. As the leading edge of the envelope advances beyond the phototransistor 84 to interrupt the light projected thereon, the timing circuit 76 controls the operation of the sorting drive circuit 87 to control the operation of the diverter air jet nozzles 55 and 55′ in timed relation with the advancement of the letter mail toward the nozzles 55 and 55′ under the control of the storage and decision circuit 75.

Connected to the output of the timing circuit 76 is a solenoid operated circuit 87 that controls the operation of the nozzles 55 and 55′ through a solenoid operated air valve, not shown. When the storage decision circuit 75 reaches the decision of machine readable mail, it prepares the timing circuit 76 to operate the solenoid operated circuit 87 to selectively operate the diverter nozzle 55′ and to cut off the diverter nozzle 55 to divert the letter mail into the receptacle 50. If the storage and decision circuit 75 reaches the decision of non-machine readable mail, the solenoid operated valve remains in its normal condition and the diverter nozzle 55 continuously ejects air to divert the envelope into the receptacle 51 and the diverter nozzle 55′ is cut off.

SCAN START CIRCUIT

In FIG. 4 is shown the phototransistor 61, which is biased in a normally conductive mode. As the letter mail transport mechanism 14 advances the leading edge of an envelope beyond the phototransistor 61, the light beam cast by the source of light 60 is interrupted. As a consequence thereof, the conduction of the phototransistor 61 drops nearly to cut off. Thus, the emitter voltage, which is normally at the saturation voltage above ground, rises to a positive voltage when the phototransistor 61 is at cut off. From this operation the decision and storage inhibit control circuit 63 is activated, and the scan start signal, after a time delay, is transmitted to the storage and decision circuit 75 through the scan start circuit 62.

Connected to the phototransistor 61 is a transistor 90 of a conventional monostable or one-shot multivibrator of the scan start circuit 62 which is normally conducting or at a saturation state. When the phototransistor 61 changes its state to the non-conducting mode, the phototransistor 61 transmits to the transistor 90 a positive charging signal to change the state of the multivibrator to a non-conducting mode.

The output of the transistor 90 is connected to a transistor 91 of the monostable multivibrator, which is normally in a non-conducting mode. As the transistor 90 changes its state to a non-conducting mode, a negative going signal is produced at its collector electrode to change the state of the transistor 91 to a conducting mode and causes a capacitor 92 to discharge. Thereupon, the capacitor 92 recharges through a resistor 93. The resistance-capacitance time constant of the capacitor 92 and the resistance 93 sets the time delay for the returning of the transistor 90 to its normally conducting mode. As the transistor 90 returns to its saturation state or conducting mode, a positive signal is produced at its collector electrode across a resistor 95 which is transmitted through a capacitor 96 over a conductor 97 to the storage and decision circuit 75 as the scan start signal.

As previously described, the letter mail advanced by the letter mail transport mechanism 14 advances at a prescribed speed. The predetermined time delay by the resistance-capacitance network 92 and 93 for the return of the transistor 90 to its normally conducting mode is calculated to enable the area within the first one inch of the leading edge of the envelope under test to advance beyond the vertical optical scanning line of the address scanning device 70. At that time, a determination is made by the storage and decision circuit 75 under the control of the positive signal transmitted by the multivibrator of the scan start circuit 62 to detect whether any address information is in the first one inch area of the envelope under test. If address information does appear within the first one inch of the leading edge of the envelope, then the letter mail will be classified as non-readable machine mail and no further analysis of the envelope is required.

INHIBIT CONTROL CIRCUIT

Figure 8:
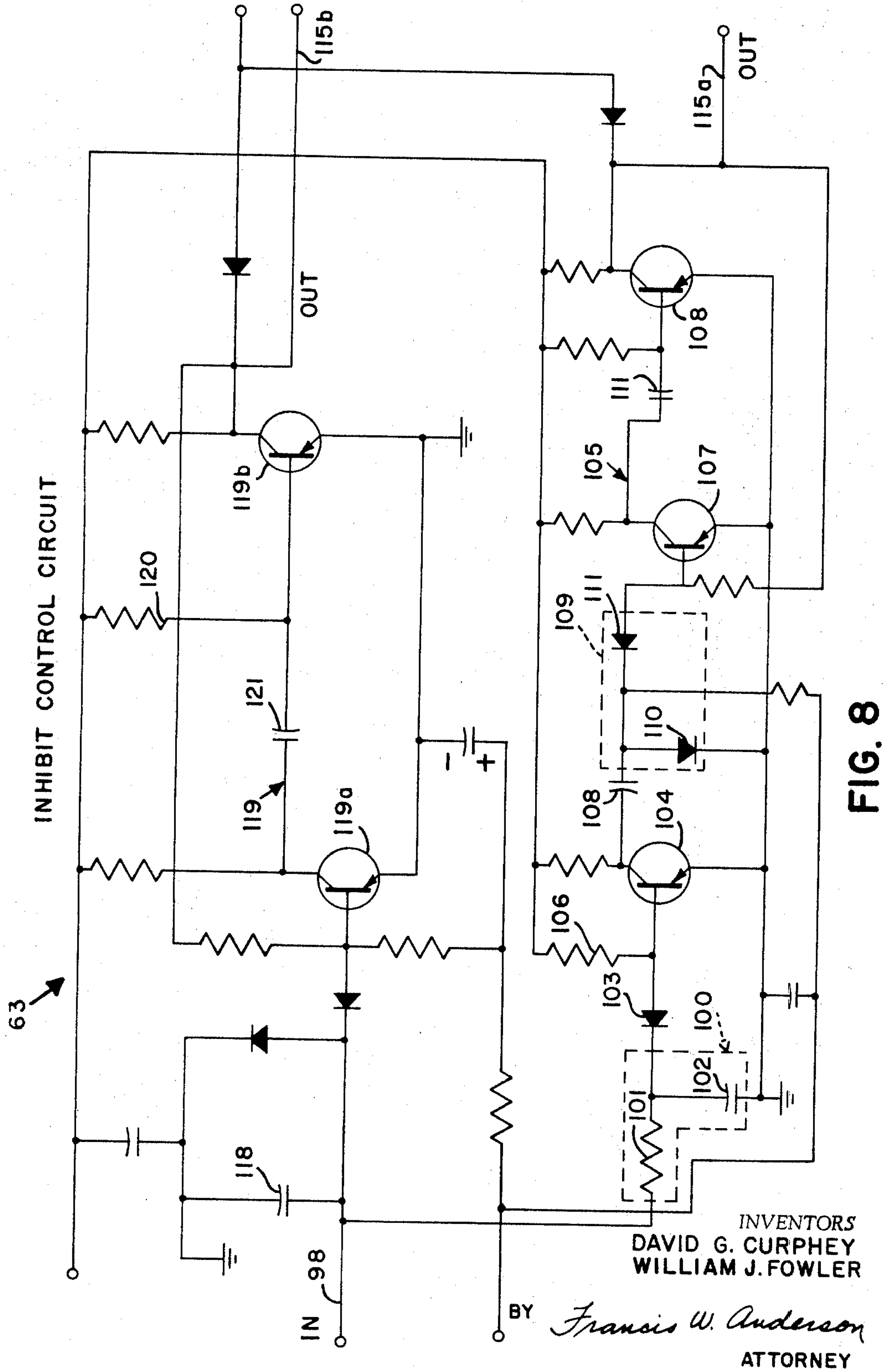
FIG. 8 is a schematic diagram of a storage and decision inhibiting circuit employed in the presorting apparatus of the present invention.

The storage and decision inhibit control circuit 63 (FIG. 8) serves to eliminate from consideration by the storage and decision circuit 75 any false markings scanned by the address scanning device 70 or any false signals received by the digital converter circuit 71. When no letter mail is advancing through the scanning zone A, such false markings and signals may arise from or be generated by the discoloration of the pinch belt 20.

Toward this end, the storage and decision inhibit circuit 63 comprises an integrating network 100, a Zener diode 103, an inverter circuit 104 and a one-shot or monostable multivibrator 105 with a normally non-conducting transistor 107 and a normally conducting transistor 108. The integrating network 100 includes a resistor 101 and a capacitor 102.

When the light cast onto the phototransistor 61 (FIGS. 3 and 4) is interrupted by the leading edge of an envelope advancing toward the scanning zone A, the phototransistor 61 produces over a conductor 98 a positive going signal from the emitter voltage thereon and charges the capacitor 102 through the resistor 101 until the threshold voltage of the Zener diode 103 is reached. As this occurs, the diode 103 conducts to draw current through a resistor 106 to change the state of the inverter circuit 104 from a normally conducting state to a non-conducting state.

At the time the inverter circuit 104 changes its state to a non-conducting mode, a negative signal is produced at the collector electrode thereof, which is fed to the base electrode of the transistor 107 of the multivibrator 105 through a capacitor 108 and steering matrix 109. The steering matrix 109 includes diodes 110 and 111.

The negative signal impressed on the base electrode of the transistor 107 causes the transistor 107 to conduct. As a consequence thereof, the multivibrator 105 changes its state so that the transistor 107 conducts and the transistor 108 is thereby cut off. In addition, a capacitor 111 discharges while the transistor 108 is non-conducting. Thereupon, the capacitor 111 recharges through a resistor 112.

When a sufficient charge accumulates in the recharged capacitor 111 through the resistor 112, the transistor 108 of the multivibrator 105 will return to its normally conducting mode and the transistor 107 is thereby driven to cut off. As the transistor 108 returns to its normally conducting mode, a positive going signal is transmitted over a conductor 115a to the storage and decision circuit 75

(FIGS. 3 and 7) to control the potential on an inhibit line in the storage and decision circuit 75.

When there is a positive potential on the inhibit line of the storage and decision circuit 75, the input circuits of the storage and decision circuit 75 are electrically blocked out and no input signal from the digital converter circuit 71 is advanced through the storage-decision circuit 75. Conversely, when a negative potential is impressed on the inhibit line of the storage and decision circuit 75, the input signals from the digital converter circuit 71 are advanced through the storage-decision circuit 75. The digital converter circuit 71 receives its information from the address scanning device 70.

From the foregoing, it is to be observed that the storage and decision inhibit circuit 63 produces a control signal to produce within the storage and decision circuit 75 a positive potential on the inhibit line thereof, while the phototransistor 61 is continuously conducting from the light projected thereon. As a result thereof, the input circuits of the storage and decision circuit 75 connected to the digital converter circuit 71 are electrically blocked out. As an envelope advancing toward the scanning zone A has its leading edge interrupting the beam of light cast onto the phototransistor 61, the phototransistor 61 is nonconducting. Consequently, the inhibit circuit 63 produces a control signal over the conductor **115*b* to produce within the storage and decision circuit 75 a negative potential on the inhibit line thereof to render the storage and decision circuit 75 receptive to incoming signals from the digital converter circuit 71. More precisely, the resistance-capacitance time delay network comprising the capacitor 111 and the resistor 112 is arranged so that the inhibit circuit 63 transmits a control signal over the conductor 115*a* for the impressing of a negative potential on the inhibit line of the storage and decision circuit 75 after the leading edge of the envelope advances ½ inch beyond the vertical optical scanning line of the addressing scanning device 70**.

When the trailing edge of the envelope passes the phototransistor 61, the light beam cast toward the phototransistor 61 is no longer interrupted. Hence, the phototransistor 61 is again conductive. As the phototransistor 61 conducts, a negative going signal is produced on its emitter electrode which is transmitted to the inhibit circuit 63 over the conductor 98. A filter capacitor 118 in the inhibit control circuit 63 reduces short duration noise spikes.

A monostable or multivibrator circuit 119 in the inhibit circuit 63 (FIG. 8) with a resistance-capacitance network of resistor 120 and capacitor 121 receives the positive going pulse from the phototransistor 61 over the conductor 98 and produces a negative going pulse after a predetermined time delay. Included in the multivibrator circuit 119 are transistors **119*a* and 119*b*. The time delay between the negative going pulse and the positive going pulse is determined by the resistance-capacitance network of the resistor 120 and the capacitor 121. Therefore, the resistance-capacitance time network 120 and 121 is calculated so that the envelope advancing through the scanning zone A will have its trailing edge within ¼ inch of the vertical optical scanning line of the address scanning device 70 as the positive potential is applied to the inhibit line of the storage and decision circuit 75 under the control of the inhibit circuit 63 from the positive going signal transmitted over a conductor 115*a*. It is the application of the positive voltage to the inhibit line of the storage and decision circuit 75 that blocks out the input signals advancing through the storage and decision circuit 75 from the digital converter circuit 71**.

Thus, the inhibit circuit 63 serves to control the removal of the inhibit potential from the inhibit line of the storage and decision circuit 75 when an advancing envelope has the leading edge thereof advancing ½ inch beyond the optical scan line of the address scanning device 70 to enable signals detected by the address scanning device 70 from the address of the advancing envelope to be evaluated by the storage and decision circuit 75. The inhibit potential is reapplied to the inhibit line of the storage and decision circuit 75 when the trailing edge of the advancing envelope is within ¼ inch of the vertical optical scanning line of the address scanning device 70 to block out false signals emanating from the discoloration of the pinch belt 20 from advancing through the storage and decision circuit 75. Hence, only signals detected from the envelope advancing through the scanning zone A are evaluated by the storage and decision circuit 75.

ADDRESS SCANNING DEVICE

Disposed downstream of the scan start phototransistor 61 and located in the scanning zone A is the address scanning device 70 (FIGS. 1, 3 and 5). As shown in FIG. 5, the address scanning device 70 comprises a suitable source of light 125 that projects a relatively narrow beam of light. In the path of the beam of light cast by the source 125 is the input end of a bundle of optical fibers 130. At the input end of the bundle of optical fibers 130, which is the end thereof confronting the beam of light cast by the source 125, the bundle of optical fibers 130 are gathered into a cylindrical configuration with the exposed end thereof having a circular area facing the light source 125. The bundle of optical fibers 130 gradually fans out in the direction of the output end thereof, whereby light entering the input end of the bundle of optical fibers 130 projects out of the output end thereof in a relatively narrow vertical optical line.

The fibers of the bundle of optical fibers 130 may be made of thin fibers of glass, plastic or other transparent material and serve to transmit light therethrough so as to cast a relatively thin vertical optical line of light along the upright address side of the envelope continuously advancing through the scanning zone A. Thus, as an envelope advances continuously through the scanning zone A, the bundle of optical fibers 130 casts a continuous series of successive vertical lines of light along the confronting vertically disposed surface of the envelope which contains the address.

In the preferred embodiment, the output end of the bundle of optical fibers 130 is 2¼ inches high and .008 inch wide to produce an optical scan line for the address scanning device 70 of the same dimension.

A second bundle of optical fibers 135 has its input end disposed in juxtaposition with the output end of the bundle of optical fibers 130. The input end of the bundle of optical fibers 135 is of the same dimension and construction as the output end of the bundle of optical fibers 130 and is parallel thereto in a juxtaposed, contiguous relation. As the envelope advances continuously through the scanning zone A, the bundle of optical fibers 130 projects vertical lines of light of relatively narrow width across the address side of the envelope, which appears as a continuous succession of vertical light beams. The bundle of optical fibers 135 at its input end, in turn, scans in vertical line succession, the vertical lines of the envelope illuminated in succession by the bundle of optical fibers 130 and transmits through the optical fibers 135 the light detected and the light intensity variations created by the presence or absence of characters or the like on the advancing envelope illuminated by the fine vertical light beams.

As shown in FIG. 5, the optical fibers of the bundle of optical fibers 135 are divided into vertically aligned segmental groups, when viewed from the output end thereof. Each segmental group of the optical fibers 135 corresponds to a discrete vertical segement of $\frac{1}{32}$ of an inch. It has been found that for improved detection, each segmental group of optical fibers 135 should view less than the height of the smallest anticipated character font. The groups of optical fibers 135 in the aggregate total 2¼ inches. Therefore, there are seventy-two of such groups of optical fibers. At the output end thereof, the bundles of optical fibers 135 terminate in a plane of four rows of eighteen groups of optical fibers.

Confronting the planar output end of the bundle of optical fibers 135 is an array of light sensitive units 140, such as cadmium selenide photocells 141, which total seventy-two light sensitive units. The photocells 141 are integrally formed on a ceramic substrate 142. Each photocell 141 is individually disposed confronting the output end of an associated group of optical fibers of the bundle of optical fibers 135 to detect variations in light intensity transmitted through its associated group of optical fibers. Variations in light intensity produce variations in output voltage of the photocell.

From the foregoing, it is to be observed that the optical scanning device 70 produces 72 discrete signals per vertical optical scanning line for each successive line while an envelope is continuously advancing through the scanning zone A to scan the address area of the envelope within 2½ inches above the lower edge of the continuously advancing envelope.

The photocells 141 of the optical scanning device 70 produce seventy-two discrete scanning signals per vertical optical line in response to light intensity variations detected from the address side of the continuously advancing envelope. These signals are transmitted over seventy-two conductors (FIG. 3) between the address scanning device 70 and the digital converter circuit 71 and are analyzed for character density, character height and skew.

DIGITAL CONVERTER CIRCUIT

The digital converter circuit 71 converts the signals transmitted by the address scanning device 70 into logic or binary code signals for decision by the storage and decision circuit 75 as to whether the letter mail advancing through the scanning zone A is machine readable mail or non-machine readable mail. For this purpose, the digital converter circuit 71 comprises thirty-three bandpass amplifiers 150 (only one shown in FIG. 6). Connected to each of the amplifiers 150 is an integrator converter circuit 151 (only one shown in FIG. 6). Therefore, the digital converter circuit 71 includes thirty-three integrator converter circuits 151.

Each of the amplifiers 150 has multiple input circuits. The first thirty-two amplifier 150, which are associated with the photocells 141 that scan the area of the advancing envelope between ½ inch and 2½ inches above the lower edge of the envelope, have two input circuits for each amplifier 150. The remaining amplifier 150, which is associated with the photocells that scan the area ½ inch above the lower edge of the envelope, has eight input terminals. The two input circuits for each amplifier 150 are connected to photocells one inch apart on the vertical optical scan line, i.e. cells 1 and 33 drive input circuits of the first amplifier 150, cells 2 and 34 drive input circuits of the next adjacent amplifier 150 and so on. The eight photocells 141 scanning the area within ½ inch of the bottom edge of the envelope are connected to the input circuit on the aforesaid remaining amplifier 150.

Figure 6:
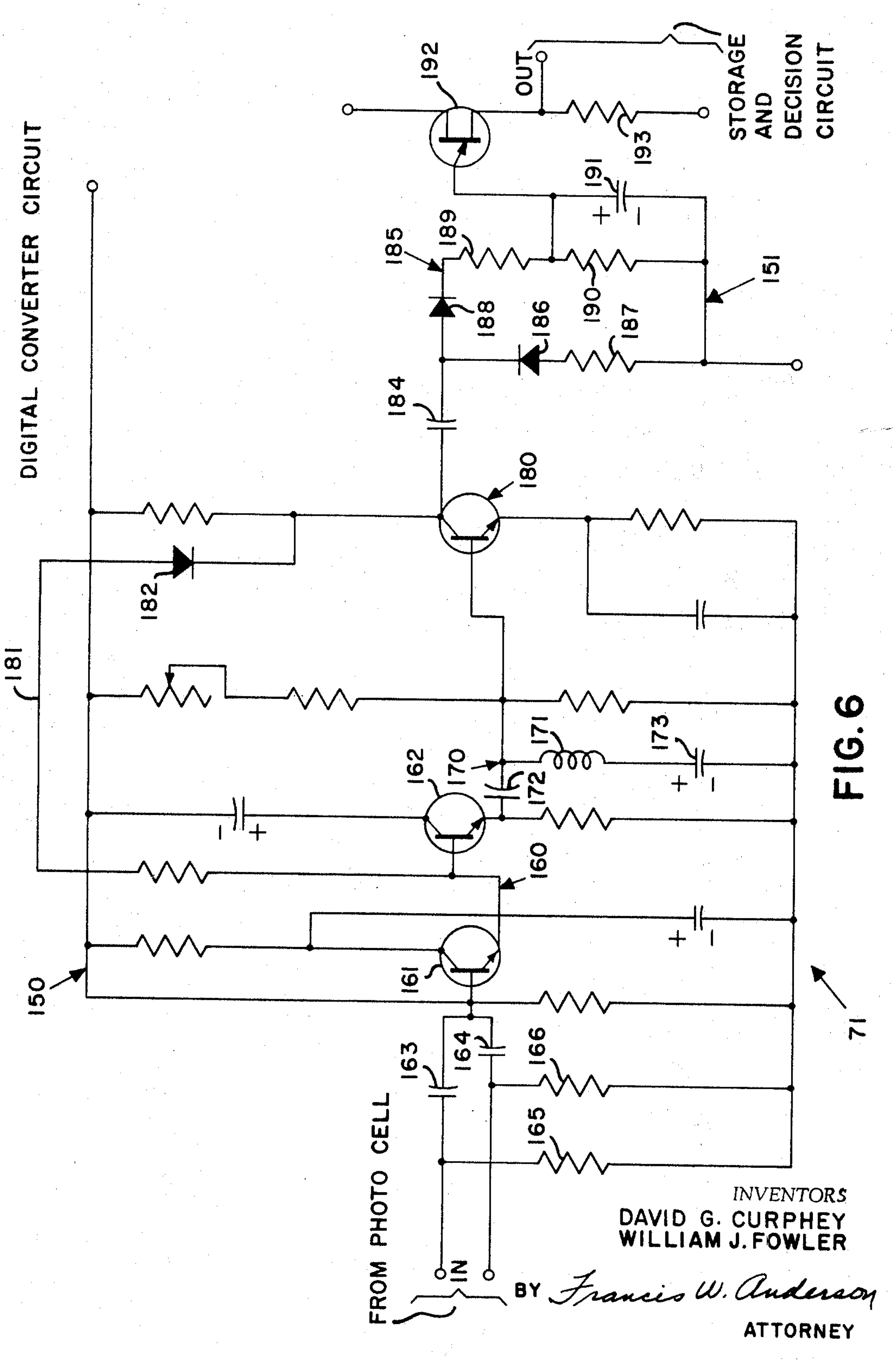
FIG. 6 is a schematic diagram of a bandpass amplifier and an integrator converter of the digital converter circuit employed in the presorting apparatus of the present invention.

In FIG. 6 is shown one of the bandpass amplifiers 150 and one of the integrator converter circuits 151. Since each bandpass amplifier 150 and each integrator circuit 151 is constructed from similar elements and operates in a similar manner, only one bandpass amplifier and one integrator converter circuit 151 will be described in detail.

The bandpass amplifier 150 includes a Darlington amplifier 160 comprising transistors 161 and 162. Connected to the input of the Darlington amplifier circuit 160 are coupling capacitors 163 and 164 and resistors 165 and 166. Through the Darlington amplifier circuit 160, a high impedance input is provided to match the output impedance of the associated photocells 141 and also to provide a stable high gain.

Connected to the output of the Darlington amplifier circuit 160 is an *m*-derived high-pass filter 170 comprising inductance coil 171 and capacitors 172 and 173. Coupled to the output of the Darlington amplifier circuit 160 through the *m*-derived filter 170 is a common emitter amplifier 180. The output of the amplifier 180 is connected to the Darlington amplifier circuit 160 between the transistors 161 and 162 through a feedback network 181 which includes a diode 182.

When a photocell 141 detects a white surface on an envelope advancing through the scanning zone A, a sharp negative signal is produced. This tends to result in the saturation of the filter 170 for a time interval in excess of the scanning line time. The feedback network 181 serves to avoid the saturation of the filter network 170 during the time interval the associated photocells 141 detect a white surface on the envelope advancing through the scanning zone A. This is accomplished without reducing the gain of the signals representing the detection of characters on the address section of the envelope advancing through the scanning zone A. The output of the bandpass amplifier 150 provides a selective signal with a high gain. On the other hand, the integrator converter circuit 151 rejects low level signals and converts preselected strong signals into pulse signals for use in logic circuits.

The output of the amplifier 180 is connected through a capacitor 184 to a logic references positive peak detector circuit 185. The detector circuit 185 includes a diode 186, a resistor 187, a diode 188, a resistor 189 and a resistor 190. The negative excursions of the amplifier 180 are shunted through the diode 186 and the resistor 187. However, the positive peak signals are coupled to a storage capacitor 191 through the diode 188, the resistor 189 and the resistor 190. As a consequence thereof, the capacitor 191 is charged by such positive peak signals. Connected to the storage capacitor 191 is a unijunction transistor 192. It is the output of the transistor 192 that produces the logic level signals or pulses for transmission to the storage and decision circuit 75.

Should predetermined character information be detected by the associated photocell 141, the integrating network consisting of the resistor 190 and the capacitor 191 is adjusted to achieve a selected level of potential charge in the capacitor 191 after a selected number of positive peak signals are produced during a given time interval. The number of selected positive peak signals to charge the capacitor 191 to a predetermined potential corresponds to conditions to be ascertained from the scanning of characters on the envelope advancing through the scanning zone A.

When the capacitor 191 is charged to a preselected potential, the transistor 192 will conduct for a predetermined time duration. Otherwise, the transistor 192 will remain non-conductive. When the transistor 192 conducts, the capacitor 191 discharges. As a result thereof, the transistor 192 produces in the output thereof a logic signal in the form of a pulse with a pulse width determined by the capacitor 191 and a resistor 193. Generally, there is one of such pulses for each five characters detected by the associated photocells 141.

From the foregoing, it is to be observed that the digital converter circuit 71 receives the signals produced by the protocells 141 and prepares the signals for interrogation. Moreover, the digital converter circuit 71 advances only those signals for further test by the decision and storage circuit 75 which satisfy the requirement for character density.

Signals from the individual photocells 141 are examined by its associated bandpass amplifier 150 and its associated integrator-converter circuit 151 for a character repetition rate, in the exemplary embodiment, in the range of 660–1540 black spot detections per second.

This is achieved through the presetting of the integrator network of the integrator converter circuit 151, which includes the capacitor 191 and the resistor 190, and the accurately controlled constant speed letter transport mechanism 14 advancing the envelope through the scanning zone A.

Should the character density of the envelope advancing through the scanning zone A meet the requirements for machine readable mail, then the output of the transistor 192 will be a logic pulse signal of a prescribed amplitude and a predetermined duration to be transmitted to the decision and storage circuit 75. On the other hand, should the character density of the envelope advancing through the scanning zone A not meet the requirements for machine readable mail so as to constitute non-machine readable mail, then there will be an absence of the logic pulse signal of a prescribed amplitude and of a predetermined duration from the output of the transistor 192.

The digital converter circuit 71 transmits logic signals to the storage and decision circuit 75 through thirty-three integrator-converter circuits 151 (FIG. 3). The first thirty-two integrator-converter circuits 151 are associated with the photocells 141 (FIG. 5) that scan the area of the advancing envelope between ¼ inch and 2½ inches above the lower edge of the envelope. The digital pulse signals transmitted therefrom are fed in proper sequence to the storage and decision circuit 75 (FIG. 3).

The remaining integrator-converter circuit 151 is associated with the photocells that scan the area of the envelope ¼ inch above the lower edge of the envelope. The digital pulse signal transmitted by the remaining integrator converter circuit 151 serves to prevent the storage and decision circuit 75 from receiving the digital pulse signals transmitted by the other thirty-two integrator-converter circuits 151, since said remaining integrator converter circuit 151 transmits a pulse when the photocells associated therewith detect the presence of address characters outside of the required address scanning area.

TIMING CIRCUIT AND SORTING DRIVE CIRCUIT

Figure 9:
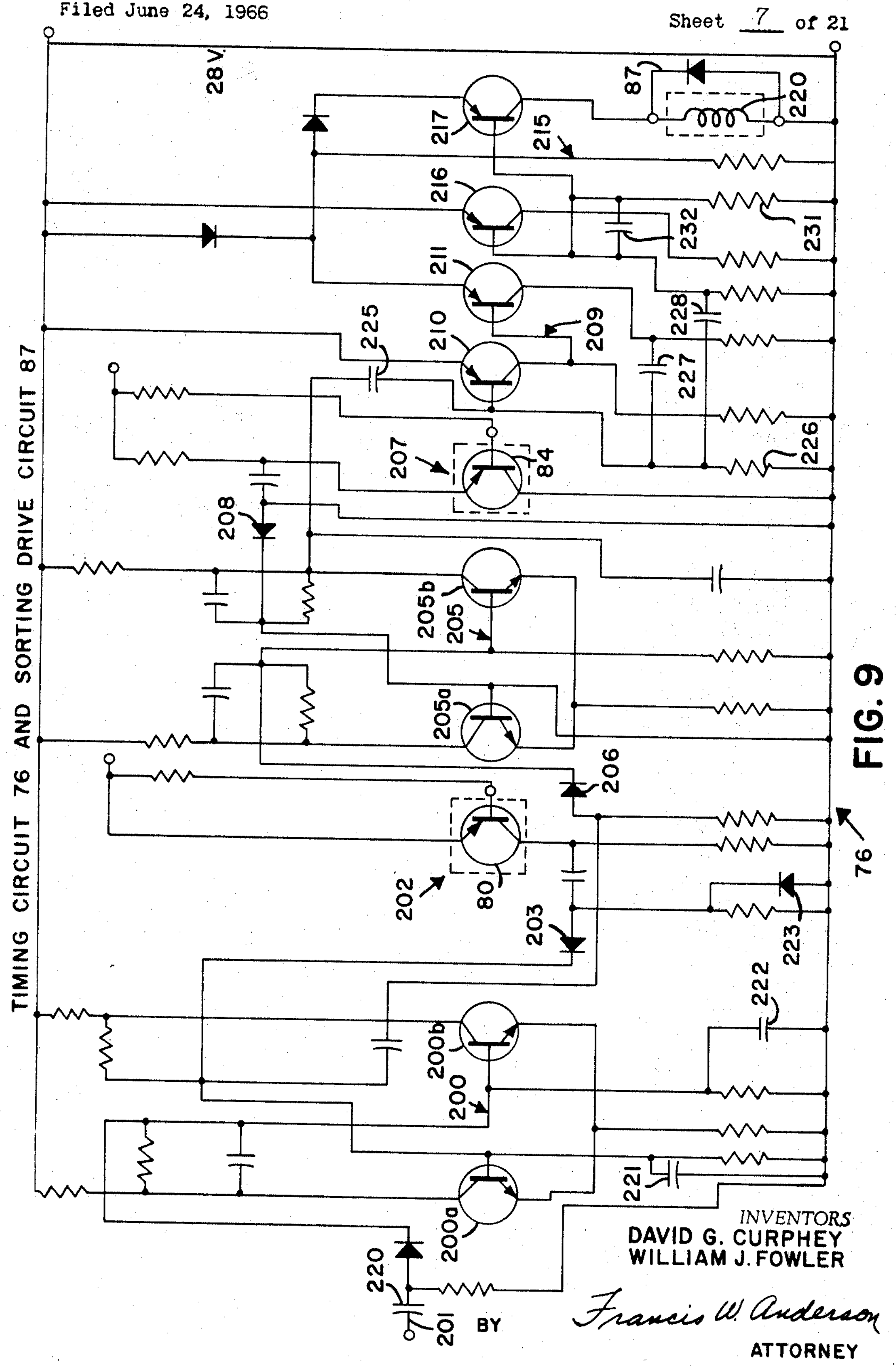
FIG. 9 is a schematic diagram of a timing circuit and gate drive circuit employed in the presorting apparatus of the present invention.

Illustrated in FIG. 9 is the timing circuit 76 and the sorting drive circuit 87. The timing circuit 76 coordinates the position of the envelope advancing into and through the scanning zone A with the operation of the sorting drive circuit 87 to control the operation of the air diverting nozzles 55 and 55′ (FIG. 1) at the precise time the envelope approaches the air diverting nozzles 55 and 55′ for sorting and also to coordinate in timed sequence the decision rendered by the storage and decision circuit 75 with respect to the envelope approaching the air diverting nozzles 55 and 55′ for sorting.

The timing circuit 76 (FIG. 9) includes a conventional flip-flop circuit 200 having transistors 200*a* and 200*b*. One input of the flip-flop circuit 200 is connected to the storage and decision circuit 75 over a conductor 201. Another input of the flip-flop circuit 200 is connected to the output of a trailing edge detector circuit 202. The trailing edge detector circuit 202 is coupled to the flip-flop circuit 200 through a diode 203.

The output of the flip-flop circuit 200 is connected to one input of a conventional flip-flop circuit 205 through a diode 206. The flip-flop circuit 205 includes transistors 205*a* and 205*b*. A leading edge detector circuit 207 is connected to another input of the flip-flop circuit 205 through a diode 208. The output of the flip-flop circuit 205 controls the operation of a one-shot multivibrator circuit 209 having transistors 210 and 211. Connected to the output of the multivibrator circuit 209 is the input of a monostable circuit 215 having transistors 216 and 217. The output of the transistor 217 is connected to an air blast valve control solenoid 220 to selectively control the operation of the air diverting nozzles 55 and 55′.

While the envelope advances into the scanning zone A, the light beam projected toward the trailing edge phototransistor 80 is interrupted. This action produces a negative going pulse to turn off the trailing edge detector 202. The diode 203 prevents the negative going pulse from being transmitted to the flip-flop circuit 200.

As the trailing edge of the envelope in the scanning zone A advances beyond the phototransistor 80, the light cast toward the phototransistor 80 is no longer interrupted. As a consequence thereof, a positive going pulse is transmitted from the trailing edge detector circuit 202 to the flip-flop circuit 200 through the diode 203. If the storage and decision circuit 75 arrives at a decision that the envelope advancing through the scanning zone A is machine readable mail, then a signal is transmitted to the flip-flop circuit 200 through a coupling capacitor 220 to set the flip-flop circuit 200. When the positive going signal is transmitted to the flip-flop circuit 200 from the trailing edge detector circuit 202, the flip-flop circuit 200 is reset.

The action of resetting the flip-flop circuit 200 causes the flip-flop circuit 205 to be set. Capacitors 221 and 222 reduces the susceptibility of the flip-flop circuit 200 to noise. A diode 223 prevents a signal from the flip-flop circuit 205 from being coupled back to the flip-flop circuit 200.

As the leading edge of the envelope in the scanning zone A advances beyond the leading edge phototransistor 84, the light projected toward the phototransistor 84 is interrupted. The phototransistor 84 is spaced downstream from the phototransistor 80 a distance greater than the length of the largest anticipated envelope (FIG. 1). When the light beam projected toward the phototransistor 84 is interrupted, the leading edge detector circuit 207 (FIG. 9) emits a positive going signal through the diode 208 to reset the flip-flop circuit 205. As a result thereof, the output of the transistor 205*b* goes positive. A positive signal from the output of the transistor 205*b* is fed to the one-shot multivibrator circuit 209 through a capacitor 225.

The one-shot multivibrator circuit 209 upon receiving the positive pulse from the transistor 205*b* changes its mode. After a suitable time delay for the leading edge of the envelope to advance adjacent to the air diverting nozzles 55 and 55′, which in the exemplary embodiment is 11.6 milliseconds, the multivibrator circuit 209 returns to its original state. The time delay for the multivibrator 209 to return to its initial mode is determined by the resistance-capacitance time delay network of resistance 226 and capacitor 227.

After the predetermined time delay, which in the exemplary embodiment is 11.6 milliseconds, the multivibrator 209 returns to its original state to emit a signal to 209 returns to its original state to emit a signal to the monostable circuit 215 through a coupling capacitor 228. Normally, the transistor 217 is non-conducting and the transistor 216 is conducting. When the multivibrator 209 emits the signal to the monostable circuit 215 through the capacitor 228, the transistor 216 is cut off, which causes the transistor 217 to conduct. The conduction of the transistor 217 causes the solenoid 220 to be energized for selectively operating the air valve to eject air from the air jet diverting nozzle 55′. Normally and when the solenoid 220 is not energized, the valve is operated to continuously eject air from the air jet diverting nozzle 55.

The time interval during which the solenoid 220 remains energized is determined by the resistance-capacitance network of resistor 231 and a capacitor 232. For ascertaining such time interval, the maximum and minimum length of the envelopes and other properties of the envelopes advanced by the envelope transport mechanism 14 are considered.

Thus, the detection of machine readable mail by the address scanning device 70 causes the storage and decision circuit 75 to prepare the timing circuit 76 for operation. The timing circuit, in turn, controls the operation of the sorting drive circuit 87 to energize the solenoid 220 in timed sequence with the interrogated envelope advancing to the air diverting nozzle 55'. The air diverting nozzle 55' diverts the machine readable mail to the machine readable receptacle 50.

Should non-machine readable mail be detected by the address scanning device 76, the storage and decision circuit 75 does not prepare the timing circuit 76 for operation. Hence, as the non-machine readable mail advances toward the air diverting nozzle 55, the solenoid 220 remains de-energized and the air diverting nozzle 55 diverts the non-machine readable mail into the non-machine readable mail receptacle 51.

Therefore, normally air is ejected from the diverting nozzle 55 to direct an advancing envelope into the non-machine readable mail receptacle 51. Should the storage and decision circuit 75 arrive at a decision that the letter is machine readable mail, then the solenoid 220 is energized to operate the valve for ejecting air through the diverting nozzle 55' and for cutting off the diverting nozzle 55 to direct the advancing envelope to the machine readable mail receptacle 50.

STORAGE AND DECISION CIRCUIT

Figure 7:
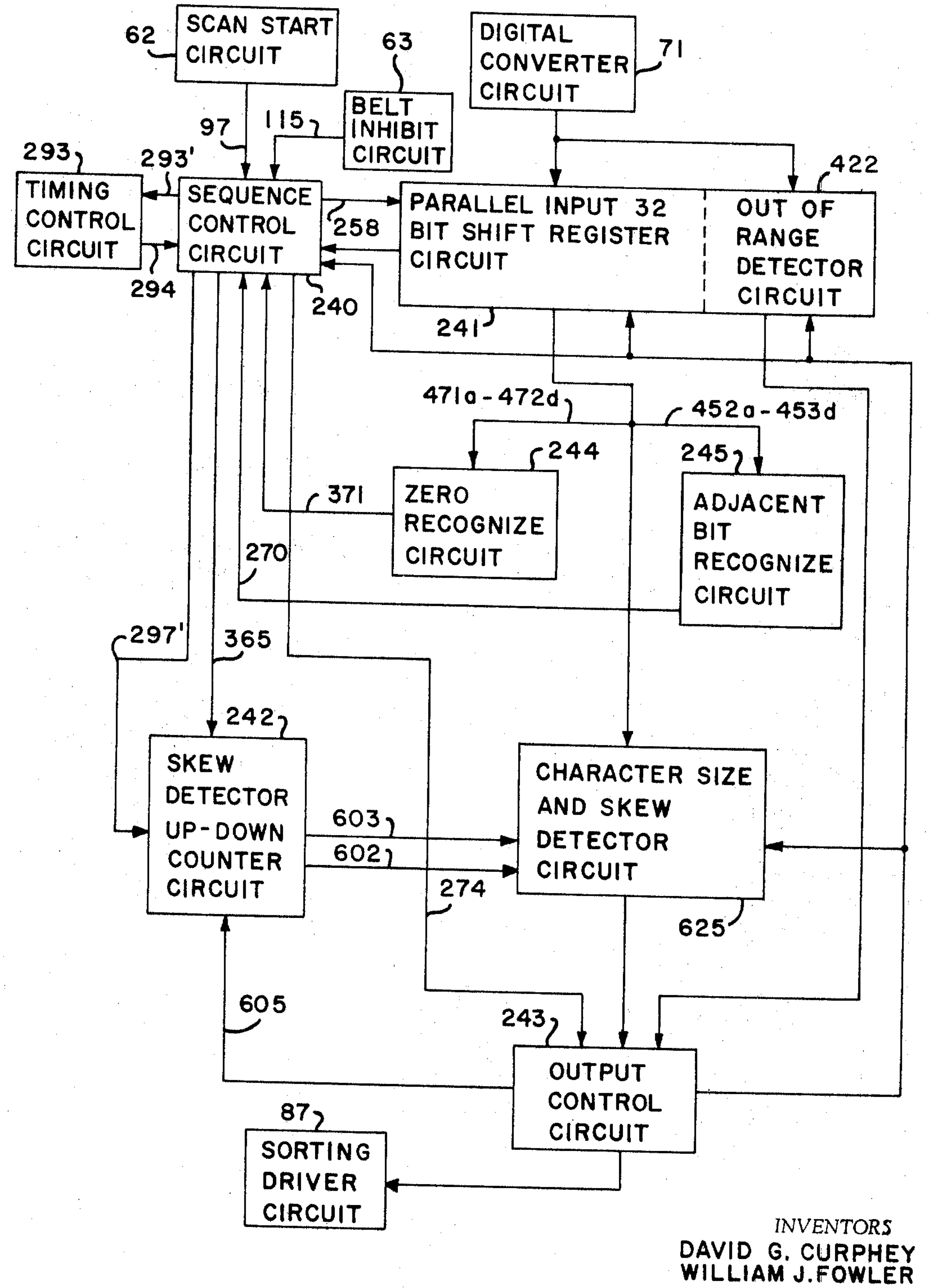
FIG. 7 is a block diagram of the storage and decision circuit employed in the presorting apparatus of the present invention.

Illustrated in FIG. 7 is a block diagram of the storage and decision circuit 75, which includes a sequence control circuit 240. The sequence control circuit 240 supplies clock pulses and logic signals to a shift register circuit 241, a skew detection circuit 242 and an output control circuit 243. Such logic signals are emitted by the sequence control circuit in response to signals transmitted from the inhibit control circuit 63, the scan start circuit 62, and a timing control circuit 293, which are external to the storage and decision circuit 75. In addition thereto, the sequence control circuit 240 produces logic signals in response to signals received from a zero recognizer circuit 244 and an adjacent bit recognizer circuit 245, which are part of the storage and decision circuit 75.

SEQUENCE CONTROL CIRCUIT

When there is no envelope advancing through the scanning zone A, the light projected onto the phototransistor 61 is not interrupted. Hence, the inhibit control circuit 63, in a manner previously described, transmits a negative control signal over the conductor **115*b* to the storage and decision circuit 75, which signal is received by the sequential control circuit 240** (FIGS. 10*a* and 10*b*) of the storage and decision circuit 75. This action prevents the signals transmitted from the digital converter 71 to advance through the shift register circuit 241 (FIG. 7) of the storage and decision circuit 75 and thus prevents the transmission of signals through the shift register circuit 241 during the time an envelope is not advancing through the scanning zone A. In this manner, signals generated from the discoloration of the pinch belt 20 by the scanning device 70 are blocked from advancing through the shift register circuit 241. The negative signal transmitted by the inhibit control circuit 62 over the conductor **115*b* does not change the mode of the flip-flop circuit 253**.

As the leading edge of the envelope advancing into the scanning zone A interrupts the phototransistor 61, the inhibit control circuit 62, after a delay of time sufficient to enable the leading ½ inch of the envelope to advance beyond the vertical scanning line of the scanning device 70, emits a positive going signal over the conductor **115*b* through conventional inverter circuits 250 and 251 to change the state of the flip-flop circuit 253 of the sequential control circuit 240. The change of mode of the flip-flop circuit 253 impresses a logic signal on a conventional three input nor gate circuit 254 through well-known inverter circuits 255 and 256. As a consequence thereof, negative inhibit signals are produced in the output circuits of well-known amplifiers 257 and 335–337 to be impressed on set register conductors 258 and 340–342, respectively. An inverter circuit 259 interconnects the nor gate circuit 254 with the amplifiers 257 and 335–337. Thereupon, the output of the amplifiers 257 and 335–337 impress negative signals on the set register conductors 258 and 340–342, respectively. Now, the shift register circuit 241 is set for receiving logic signals from the digital converter 71**.

When the light cast on the phototransistor 61 is interrupted, the scan start circuit 62 is activated. After a time delay in the scan start circuit 62 sufficient to enable the envelope in the scanning zone A to advance its leading edge one inch beyond the vertical scanning line of the scanning device 70, the scan start signal is transmitted from the scan start circuit 62 over the conductor 97 to the sequence control circuit 240 of the storage and decision circuit 75.

Upon the sequence control circuit 240 receiving the scan start signal over the conductor 97, a conventional flip-flop circuit 266 changes its state. One input of a well-known nor gate circuit 267 is connected to the output of the flip-flop circuit 266. The signal from the flip-flop circuit 266 to the nor gate circuit 267 serves to set the nor gate circuit 267 so that clock pulses generated by a clock pulse generator 268 are impressed on the input of the nor gate circuit 267 for the setting of a conventional flip-flop circuit 268. The setting of the flip-flop circuit 268, in turn, resets the flip-flop circuit 266 to initiate a cycle for examining the envelope advancing through the scanning zone A to determine whether any printed information appears on the address side of the envelope within one inch of the leading edge thereof. Thus, a negative pulse is impressed on one input of a conventional nor logic circuit 269 during a short interval after the scan start pulse is fed to the flip-flop circuit 266.

Should printed matter or information appear in the address portion of the envelope advancing through the scanning zone A within one inch of the leading edge thereof, the adjacent bit recognizer circuit 245, in a manner to be described hereinafter, transmits a signal over a conductor 270 to the sequence control circuit 240. Thereupon, the adjacent bit recognition signal advances through a well-known inverter circuit 271 and changes the mode of a conventional flip-flop circuit 272. This action occurs when two adjacent bits are stored in the shift register circuit 241 up to and including the initiation of the cycle time by the scan start signal being impressed on the conductor 97. The storing of the two adjacent bits occurs when the address scanning device 70 detects the presence of typewritten or printed matter in the portion of the advancing envelope within one inch of the leading edge thereof. The scan start signal, therefore, initiates a series of operations to examine the contents of the shift register circuit 241 to ascertain whether two adjacent bits are present in the shift register circuit 241 prior to the envelope advancing its leading edge one inch beyond the vertical scanning line of the address scanning device 70.

The output of the flip-flop circuit 272 is connected to another input circuit of the nor gate circuit 269, which has its first mentioned input circuit connected to the output of the scan start flip-flop circuit 266. The flip-flop circuit 272, when the adjacent bit recognition signal is fed thereto, impresses a negative pulse signal on the other input of the nor gate circuit 269. Accordingly, both input circuits of the nor gate circuit 269 have negative pulse signals impressed thereon. This action changes the state of a conventional flip-flop circuit 273 and produces a positive pulse in the output thereof. The output circuit of the flip-flop circuit 273 is connected to the output control circuit 243 over a conductor 274. Since a positive pulse is fed to the output control circuit 243, the output control circuit 243 is not operated and the envelope under test is diverted by the air diverting nozzle 55 to the non-machine readable mail receptacle 51. At this point, the test operation for such an envelope is completed and the flip-flop circuit 273 remains set until a master reset signal is impressed on a conductor 275.

Should no printed matter or typewritten information appear in the address portion of the envelope advancing through the scanning zone A within one inch of the leading edge thereof, then the sequential control circuit 240 and the storage and decision circuit 75 are activated for character interrogation operations as formed in the shift register circuit 241, including the first of a two cycle interrogation for skew detection. As previously described, when the inhibit control circuit 63 impressed a positive signal over the conductor **115*b*, the shift register circuit 241 was set to advance therethrough input signals received from the digital converter circuit 71. In so doing, the inhibit control signal transmitted over the conductor 115*b* set the flip-flop circuit 253**.

When a two adjacent bit recognition signal is received from the adjacent bit recognizer circuit 245 over the conductor 270, after the envelope has advanced one inch beyond the vertical scanning line, a negative pulse is impressed on the input circuit of a conventional nor logic circuit 290 (FIG. 10*a*). At the same time, the remaining input circuit of the nor logic circuit 290 is negative. A positive output signal is thereby produced in the output of the nor logic circuit 290 to set a flip-flop circuit 291. Therefore, the initiation of the first interrogation cycle began after the scan start signal is transmitted over the conductor 97 and the two adjacent bit signal is transmitted over the conductor 270.

By setting the flip-flop circuit 291, a conventional inverter circuit 292 produces in the output thereof a negative going pulse for transmission over a conductor 293' to a timing control circuit 293 (FIG. 17) to initiate a predetermined time delay operation in a manner to be described hereinafter. The timing control circuit 293 produces a pulse after a predetermined time delay corresponding to the envelope advancing, in the exemplary embodiment, .68 inch. This pulse is fed into the sequence control circuit 240 over a conductor 294 to initiate the second interrogation cycle for skew detection. The two cycle interrogation is employed for skew detection in the address block portion of the envelope.

Connected to the output of the flip-flop circuit 291 is a first scan cycle flip-flop circuit 295, which is set in response to the flip-flop circuit 291 changing its mode prior to the return pulse from the timing control circuit 243 to initiate the second cycle of interrogation for skew detection. After the flip-flop circuit 295 is set, a conventional flip-flop circuit 296 changes its state in response to the flip-flop circuit 295 changing its mode. This action holds an input circuit of a conventional nor gate logic circuit 297 positive until it is reset. The change of state of the flip-flop circuit 296 transmits a positive pulse signal over a conductor 297' to prepare the skew detector up-down counter 242 (FIGS. 14*a* and 14*b*) for counting clock pulses during the first cycle of interrogation.

As previously described, one input circuit of the nor logic circuit 297 is held positive, which causes the output of the nor logic circuit 297 to be negative. Connected to the output of the nor logic circuit 297 is an inverter circuit 298. Parallel inverter circuits 299 and 300 are connected to the output of the inverter circuit 298. Shift gate amplifiers 310–312 are connected to the output of the inverter circuit 299 and shift gate amplifiers 313–315 are connected to the output of the inverter circuit 300. The output of the shift register amplifiers 310–315 are connected to the input of the shift register circuit 241 over conductors 320–325, respectively.

When the output of the nor logic circuit 297 is negative, the shift gate amplifiers 310–315 transmit signals over the conductors 320–325, respectively, to allow the shift register circuit 241 to shift until the logic signals received from the digital converter circuit 71 have reached a reference zone within the shift register circuit 241. The shift register circuit 241 shifts in response to the receiving of clock pulses produced by the clock generator 268.

When the nor gate 297 produced a negative pulse for transmission to the inverter circuit 298, it had simultaneously produced a negative pulse for transmission through a well-known inverter circuit 330. The output circuit of the inverter circuit 330 is connected to the pair of serially connected inverter circuits 254 and 259. Connected to the output of the inverter circuit 259 are the inhibit drive amplifiers 257 and 335–337. The inhibit drive amplifiers 257 and 335–337 are connected to the shift register circuit 241 over the conductor 258 and the conductors 340–342. Thus, when a negative input signal is fed to the nor logic circuit 330, the shift register circuit 241 is inhibited from advancing therethrough information signals from the digital converter circuit 71 because of the output signals transmitted by the inhibit drive amplifiers 257 and 335–337 over the conductors 258 and the conductors 340–342.

The sequence control circuit 240 also produces clock pulse signals and transmits the clock pulse signals as shift signals for the shift register circuit 241. For this purpose, clock pulse signals are generated by the clock pulse generator 268. Connected to the output of the clock pulse generator 268 is a conventional nor gate inverter logic circuit 345, which has an amplifier 346 connected to the output thereof. A nor logic circuit 347 interconnects the amplifier 346 with clock pulse inverter amplifiers 350–353. The amplifiers 350–353 are connected to the shift register circuit 241 over conductors 355–358.

When a negative signal is impressed on the input of the nor logic circuit 345 over a conductor 360, the gate is opened for the transmission of clock pulses to the shift register circuit 241 over the following path: clock generator 268, nor gate logic inverter circuit 345, amplifier 346, nor gate logic circuit 347, amplifiers 350–353, and conductors 355–358. In addition thereto, the clock pulses are also transmitted simultaneously to the skew up-down counter of the skew detector 242 (FIGS. 7, 14*a* and 14*b*) when the gate of the nor logic circuit 345 is opened, through the amplifier 346 over a conductor 365.

As previously described, the application of a negative signal to the input of the nor logic circuit 330 produced output signals from the inhibit drive amplifiers 257 and 335–337 over the conductors 258 and 340–342 to inhibit the shift register circuit 241 from advancing information signals from the digital converter circuit 71. Also, the application of a negative signal over the conductor 360, which is connected to the input of the output circuit of the nor gate circuit 297, opens the gate for the transmission of clock pulses to the shift register 241 in a manner just described. Through this arrangement, the shift register circuit 241 is inhibited from accepting information signals from the digital converter circuit 71 during the shifting time of the shift register circuit 241.

In the preferred embodiment, the clock pulse generator 268 produces clock pulse signals at a frequency of 50 kilocycles. For improved operation, the clock pulse frequency should be at a rate or speed exceeding the repetitious rate of the characters detected by the address scanning device 70. The clock pulses produced by the clock pulse generator 268 are transmitted to the shift register circuit 241 as shift pulses or clock pulses over the conductors 355–358. Such clock pulses will cause the shift register circuit 241 to shift logic signals received from the digital converter circuit 240 toward a reference zone within the shift register circuit 241. Should two adjacent bits appear in the shift register circuit 241, they will be advanced with the shift register circuit 241 to the reference zone. As a result thereof, negative signals from adjacent bits registered in the reference zone of the shift register circuit 241 are transmitted from the shift register circuit 241 over conductors 366 and 367 to change the mode of a conventional nor gate logic circuit 370. The changing of the mode of the nor gate logic circuit 370 produces a positive going input signal to close the gate of the nor logic circuit 345 to stop the transmission of clock pulses to the shift register circuit 241 over the conductors 355–358. Thus, the shift register circuit 241 shifts until two adjacent bits received from the digital converter circuit 71 reach the reference zone within the shift register circuit 241. Two adjacent bits will appear in the shift register circuit 241 when the characters in the address block are typewritten or printed. When the characters are handwritten, two adjacent bits will not appear in the shift register circuit 241.

Should there be an absence of two adjacent bits within the shift register circuit 241, this condition will be recognized by the zero recognizer circuit 244 (FIG. 15). Upon the detection of an absence of two adjacent bits within the shift register circuit 241, the zero recognizer circuit 244 impresses a positive signal over a conductor 371 to close the gate of the nor logic circuit 345 to block the transmission of clock pulses to the shift register circuit 241 over the conductors 355–358.

In order to ascertain the skew measurement, which is one of the requirements for machine readable mail, the address information is subjected to a first interrogate cycle and a second interrogate cycle. The address information is interrogated twice at a known, predetermined spacing, which in the exemplary embodiment is .68 inch. This spacing of .68 inch was selected because of the maximum allowable skew of five degrees and the resolution of the address scanning device 70.

When the flip-flop circuit 291 was set, a negative going pulse was produced in the output of the inverter circuit 292 for transmission over the conductor 293' to the timing control circuit 293. The timing control circuit 293 initiated a predetermined time delay operation by producing a pulse at a predetermined time delay calculated to enable the envelope to advance, in the exemplary embodiment, .68 inch. The pulse is fed into the sequence control circuit 240 over the conductor 294 to initiate the second interrogation cycle.

The pulse transmitted over the conductor 294 from the timing control circuit 293 sets the flip-flop circuit 281 through conventional nor logic circuits 375 and 376. This occurs when the nor gate circuit 280 has its output circuit at a positive potential by virtue of a negative potential being applied over the conductor 281' when the inhibit control circuit 62 permits the shift register circuit 241 to receive signals from the digital converter circuit 71. Thereupon, the flip-flop circuit 296, which controls the transmission of clock pulses for skew counting, is reset and a second scan flip-flop circuit 380 is set.

The first scan flip-flop circuit 295 is reset at the end of the first cycle of interrogation by a pulse signal transmitted over a conductor 381 from the output control circuit 243 (FIG. 13). This pulse signal is received by the input of a nor logic circuit 382, which transmits its output signal through an inverter circuit 383 to reset the first scan cycle flip-flop circuit 295.

During the first interrogation cycle, the nor gate circuit 297 had the input circuit thereof held positive by the flip-flop circuit 295. At the initiation of the second cycle of interrogation, the flip-flop circuit 296 is reset and the nor gate circuit 297 has an input circuit thereof held positive by the setting of the second scan flip-flop circuit 380. The setting of the flip-flop circuit 380 is brought about by the setting of the flip-flop circuit 281, which had previously reset the flip-flop circuit 296.

Through the resetting of the flip-flop circuit 296, the flip-flop circuit 296 transmits a negative pulse over the conductor 297' to prepare the skew detector up-down counter 242 (FIGS. 14*a* and 14*b*) for counting down pulses during the second cycle of interrogation. Now, the operation of the sequence control circuit 240 is similar to that previously described for the operation of the first interrogation cycle commencing with the operation of the nor logic circuit 297 with the other input of the nor logic circuit 297 held positive.

The skew detection counter of the skew detection circuit 242 will not count down until two adjacent logic signals transmitted from the digital converter circuit 71 reach the reference zone within the shift register circuit 241 or the zero recognizer circuit 244 impresses a positive signal over the conductor 371 in a manner described in detail in connection with the first cycle of interrogation. When two adjacent bits reach the reference zone in the shift register circuit 241, negative signals are impressed over the conductors 366 and 367 to close the clock gate 345. Likewise, a positive signal on the conductor 371 closes the clock gate 345.

When the trailing edge of the envelope is within ¼ inch of the vertical scanning line of the address scanning device 70, a positive going pulse is transmitted by the inhibit control circuit 62 over the conductor **115*a* to change the mode of the flip-flop circuit 253. As a consequence thereof, a positive inhibit signal is impressed on the set register conductors 258 and 340–342 of the shift register circuit 241 to block the transmission of information signals from the digital converter circuit 71 through the shift register circuit 241**.

When the master reset signal is impressed over the conductor 275, the second scan flip-flop circuit 380 is reset. The resetting of the flip-flop circuit 380 impresses a reset signal over a conductor 392 through a conventional inverter circuit 393 to change the state of a conventional flip-flop circuit 394. This action holds an input circuit of the nor gate 254 positive, which reestablishes the positive input signal on the set register conductors 258 and 340–342 of the shift register circuit 241 to block the transmission of information signals from the digital converter circuit 71 through the shift register circuit 241 until the succeeding envelope is advanced into the scanning zone A.

An implifier 398 allows shifting of signals over a conductor 399 within the last three flip-flop circuits of the shift register circuit 241 in the same manner as does the amplifier circuits 310–312 with the addition of instantaneously stopping when the flip-flop circuits in the reference zone are set.

From the foregoing, it is to be observed that the examination of character signals with in the shift register circuit 241 commences after the scan start signal is transmitted over the conductor 97 and a two adjacent bit recognition signal is transmitted over the conductor 270 from the adjacent bit recognizer circuit 245 detecting two adjacent bits within the shift register circuit 241. Thereupon, the sequence control circuit 240 transmits clock pulses to the shift register circuit 241 to advance the two adjacent bit signals in the shift register circuit 241 to the reference zone of the shift register circuit 241. When this occurs, the shift register circuit 241 transmits signals to the sequence control circuit 240 over conductors 366 and 367 to stop the transmission of clock pulses to the shift register circuit 241. Now the first cycle of interrogation for skew detection is completed.

The second cycle of interrogation for skew detection commences with the return pulse of the timing control circuit 293. This action advances two adjacent bits in the shift register circuit 241 to the reference zone. The detection of the two adjacent bit signals by the shift register circuit 241 causes the sequence control circuit to stop the transmission of clock signals to the shift register circuit 241 and the second cycle of interrogation for skew detection is completed.

TIMING CONTROL CIRCUIT

The timing control circuit 293 (FIG. 17) serves to provide the time delay for the operation of the sequence control circuit 240 between the first and second interrogation cycle for skew detection. When the sequence control circuit 240 transmits a pulse over the conductor 293', the timing control circuit 293 is activated. After a predetermined time delay calculated to enable the envelope advancing through the scanning zone A to move .68 inch, the timing control circuit 293 thereupon transmits a signal to the sequence control circuit 240 over the conductor 294 to initiate a second interrogation cycle for skew detection.

Toward this end, the input signal transmitted over the conductor 293' by the sequence control circuit 240 is a negative going signal. The input signal so transmitted is fed across a resistor 400 to charge a storage capacitor 401 which forms an integrating circuit 402. When the capacitor 401 is charged to a predetermined potential, a diode 403 conducts to turn on a normally off transistor 404. The collector voltage of the transistor 404 goes positive during the conduction of the transistor 404 to turn off a normally conducting transistor 405. The turning off of the transistor 405 couples a negative going signal through a capacitor 406 to a steering matrix 407 comprising diodes 408 and 409. Thereupon, a transistor 410 is turned on from the transmission of the negative going signal. As the transistor 410 conducts, a capacitor 411 is charged through a resistor 412. As the charge on the capacitor 411 reaches a predetermined potential, transistor 413 is turned on. When the transistor 413 conducts, the transistor 410 is turned off to produce a positive going output pulse for transmission over the conductor 294 to the sequence control circuit 240.

The resistor 412 and the capacitor 411 determine the monostable time delay, which adds to the time delay of the integrating circuit 402 to give the desired time delay. The integrating circuit 402 prevents false triggering by short duration noise spikes.

SHIFT REGISTER AND OUT-OF-RANGE DETECTOR

In the preferred embodiment, the shift register circuit 241 (FIGS. 11*a*–11*d*) is a parallel input, 32 bit storage device. Accordingly, thirty-two input conductors 420*a*–421*f* interconnect the output of the digital converter circuit 71 with the parallel, 32 bit input of the shift register circuit 241 (FIGS. 3 and 7). A thirty-third conductor 421*g* interconnects the digital converter circuit 71 with an out-of-range detector circuit 422.

It is recalled that the address scanning device 70 produces 72 discrete signals per vertical optical scanning line for each successive line while an envelope is continuously advancing through the scanning zone A. In so doing, seventy-two discrete scanning signals per vertical line scan are produced in response to light intensity variations detected from the address side of the continuously advancing envelope. These discrete signals are transmitted to the digital converter circuit 71, which converts the signals into logic or binary code signals. The upper sixty-four discrete signals are fed to thirty-two band pass amplifiers 150, respectively, of the digital converter circuit 71, which represents the area of the address block of the envelope between ½ and 2½ inches above the lower edge of the envelope. The remaining lower eight discrete signals are fed to the thirty-third bandpass amplifier 150, which represents the area of the envelope within ¼ inch of the lower edge thereof or the out-of-range portion of the envelope. The signals from the first thirty-two amplifiers are fed to thirty-two integrator circuits 151, respectively, of the digital converter circuit 71. It is the conductors 420*a*–421*f* of the shift register circuit 241 that are connected to the first thirty-two integrator circuits 151, respectively, of the digital converter circuit 71. Thus, logic or binary signals are transmitted over the conductors 420*a*–421*f*, respectively, to represent the scanning of the envelope between ½ and 2½ inches above the lower edge of the envelope.

The thirty-third integrator circuit 151 is fed the signal from the thirty-third amplifier 150 and the conductor 421*g* interconnects the thirty-third integrator circuit 151 with the out-of-range detector circuit 422. Hence, the logic signal transmitted over the conductor 421*g* represents the scanning of the envelope within ¼ inch of the lower edge thereof.

Each integrator circuit 151 produces a logic or binary signal in its output for transmission over its associated conductor (420*a*–421*g*) only when its associated photocells 141 have detected characters that satisfy the requirement of character density. Therefore, the requirement of character density is satisfied before the logic signals enter the shift register circuit 241 or else the diverting nozzle 55 continues to operate for diverting the envelope into the non-machine readable mail receptacle 51.

In a manner described in connection with the sequence control circuit 240, should information appear within one inch of the leading edge of the envelope, the diverting nozzle 55 continues to operate for diverting the envelope into the non-machine readable mail receptacle 51. Therefore, the following tests remain: character height, character skew, and information appearing within ¼ inch of the lower edge of the envelope.

Connected to the conductors 420*a*–421*g* are conventional inverter circuits 425*a*–426*g*, respectively. The output circuits of the inverter circuits 425*a*–426*g* are connected to an input circuit of conventional nor logic circuits 430*a*–431*g*, respectively. The other input circuits of the nor logic circuits 430*a*–430*q* are connected to the set register conductors 258, and the nor logic circuits 430*r*–431*g* are connected to the set register conductor 342. When positive inhibit control signals are transmitted over the conductors 258 and 340–342 from the inhibit drive amplifiers 257 and 335–337 of the sequence control circuit 240, logic signals transmitted over the conductors 420*a*–421*g* cannot advance through the shift register circuit 241. On the other hand, negative signals transmitted over the conductors 258 and 340–342 from the inhibit drive amplifiers 257 and 335–337 of the sequence control 240 enable the logic circuits 430*a*–431*g* to produce in the output thereof, respectively, information logic signals in response to logic information signals transmitted over the conductors 420*a*–421*g*, respectively, from the digital converter circuit 71.

The output circuits of the logic circuits 430*a*–431*g* are connected to input circuits of conventional flip-flop circuits 435*a*–436*g*, respectively. The flip-flop circuits 435*a*–436*f* are connected in cascade so that a logic signal stored in one flip-flop circuit may be advanced to the succeeding flip-flop circuit for storage. Nor logic circuits 440*a*–441*f* have their output circuits connected to input circuits of the flip-flop circuits 435*a*–436*f*, respectively. The clock pulsed, shift logic circuits 440*a*–441*f* have their input circuits connected to the conductors 320–325 and 399. Over the conductors 320–325 and 399 are transmitted pulses from the shift gate amplifiers 310–315 of the sequence control circuit 240 (FIG. 10*b*). Connected to output circuits of the flip-flop circuits 435*a*–436*e* are input circuits of shift logic circuits 445*a*–446*e*, respectively. Clock shift pulses are transmitted by the amplifiers 350–353 over conductors 355–358 to the clock input circuits of the flip-flop circuits 435*a*–435*g*.

When a logic signal is transmitted over one or more of the conductors 420*a*–421*g*, the logic circuit (430*a*–431*g*) associated with such conductor or conductors will produce an output logic pulse to set the flip-flop circuit (435*a*–436*g*) associated therewith. This occurs when the logic circuits 430*a*–431*g* are not inhibited from any positive signal on the conductors 258 and 340–342. While the flip-flop circuits 435*a*–436*g* are receiving signals from the digital converter circuit 71, shifting through circuits 440*a*–441*f* or 445*a*–446*e* is inhibited by a positive signal from the amplifiers 310–315 in the sequence control circuit 240 through conductors 320–325. Upon the setting of two adjacent flip-flop circuits in the shift register circuit 241, the sequence control circuit 240 provides negative signals to open the shift gate through amplifiers 310–315 through conductors 321–325 and provides clock pulses through amplifiers 350–353 through conductors 355–358 and further provides inhibit signals to prevent logic signals from the digital converter circuit 71 from being transmitted through logic circuits 430*a*–431*g* to the flip-flop circuits 435*a*–436*g*.

The shifting sequential operation of the flip-flop circuits 435a–436f or the continuous advancing of bit information from the flip-flop circuits to the succeeding flip-flop circuits in seriatim continues until one of the following occurs:

(a) Two adjacent bits are detected in the flip-flop circuits 436e and 436f, which constitute the previously referred to reference zone for the shift register circuit 241, and two adjacent bit signals are transmitted over the conductors 366 and 367 to the sequence control circuit 240, or (b) A zero recognition pulse is transmitted to the sequence control circuit 240 over the conductor 371, or (c) A master reset pulse is transmitted to the sequence control circuit 240 over the conductor 275.

This is accomplished in a manner previously described in connection with the sequence control circuit 240.

The out-of-range detector 422 comprises the conductor 421g, which is connected to the integrator circuit 151 of the digital converter circuit 71 that represents the scanning by the address scanning device 70 of the area within ¼ inch of the lower edge of the envelope. Should a logic signal be transmitted over the conductor 421g to indicate the presence of printed or typewritten characters within ¼ inch of the lower edge of the envelope and a negative signal is on the inhibit set conductor 340, then the logic circuit 431g will emit an output pulse to set the flip-flop circuit 436g to indicate the envelope is non-machine readable mail. Thereupon, a non-machine readable mail signal will be transmitted over conductors 447 and 448 to the output control circuit 243 (FIG. 13).

ADJACENT BIT RECOGNIZER CIRCUIT

The adjacent bit recognizer circuit 245 (FIG. 12) serves several functions. The first function is to determine whether the envelope contains any printed matter within one inch of the leading edge thereof, and thereupon emit an adjacent bit recognize signal over the conductor 270 to the sequence control circuit 240. This action enables the diverter nozzle 55, which is operating continuously, to divert the advancing article to the non-machine readable mail receptacle 51. The second function is to initiate the first interrogation cycle of skew detection after the leading edge of the envelope has advanced more than one inch past the vertical scanning line of the address scanning device 70.

It is to be observed that the adjacent bit recognizer circuit 245 transmits over the conductor 270 an adjacent bit recognize signal, when two adjacent bits are stored in the shift register circuit 241. Two adjacent bits stored in the shift register circuit 241 indicate the address on the envelope is printed or typewritten and is not handwritten. Thus, the detection of two adjacent bits in the shift register circuit 241 would be a test for detecting machine readable mail.

Toward this end, the adjacent bit recognizer circuit 245 (FIG. 12) comprises conventional nor logic circuits 450a–451d. Each logic circuit (450a–451d) has two input circuits and such input circuits are respectively connected to output circuits of adjacent flip-flop circuits (435a–436d) of the shift register circuit 241 (FIGS. 11a–11d).

More specifically, the logic circuit 450a has one input circuit connected to an output circuit of the flip-flop circuit 435a over a conductor 452a and has another input circuit thereof connected to an output circuit of the adjacent flip-flop circuit 435b over the conductor 452b. The logic circuit 450b has one input circuit connected to an output circuit of the flip-flop circuit 435b over the conductor 452b and another input circuit thereof connected to an output circuit of the succeeding and next adjacent flip-flop circuit 435c over conductor 452c. Similarly, the logic circuit 450c has an input circuit thereof connected to an output circuit of the flip-flop circuit 435c over the conductor 452c and has another input circuit thereof connected to the succeeding and next adjacent flip-flop circuit 435d over the conductor 452d. This arrangement continues through logic circuit 451d, through the flip-flop circuit 436d of the shift register circuit 241, and over conductors 452e–453d.

Every four logic circuits of the logic circuits 450a–451d have their output circuits connected to a conventional nor logic circuit, such as logic circuits 455a–455f. Accordingly, each logic circuit (455a–455f) has four input circuits which are connected respectively to the output circuits of groups of four of the logic circuits 450a–451d. Connected to the logic circuits 455a–455f are conventional inverter circuits 456a–456f, respectively. In turn, the output circuits of the inverter circuits 456b–456f are connected to a well-known four input nor logic circuit 460. A conventional inverter circuit 461 is connected to the output of the logic circuit 460. A well-known four input logic circuit 462 is connected to the output of the converter circuit 461 and the output of the logic circuit 456a.

When two adjacent bit logic signals are stored in a pair of adjacent flip-flop circuits 435a–436g of the shift register circuit 241, an associated nor logic circuit (450a–451d) will produce a logic signal in the output circuit thereof. As a consequence thereof, an associated nor logic circuit (455a–455f) will produce a logic signal in the output thereof. This action results at times in a logic signal being produced in the output of the logic circuit 460 and at all times in a logic signal being produced in the output of the logic circuit 462. Stated otherwise, should two adjacent bit signals be stored in the flip-flop circuits 435a–436d of the shift register circuit 241, a logic signal will be produced in the output of the logic circuit 462 for transmitting an adjacent bit recognition signal over the the conductor 270 to the sequence control circuit 240.

Connected to the other input circuits of the nor logic circuit 462 are the output circuits of nor logic circuits 463 and 464. One input circuit of the logic circuit 463 is connected to the conductor 453d. One input circuit of the logic circuit 464 is connected to the conductor 366 and the other input circuits of the logic circuits 463 and 464 are connected to the conductor 367. Transmitted over the conductors 366 and 367 are output circuits of the flip-flop circuits 436e and 436f, which constitute the reference zone of the shift register circuit 241. Thus, two adjacent bit logic signals in the reference zone of the shift register circuit 241 will also produce a logic signal from the output of the logic circuit 462 for transmitting over the conductor 270 an adjacent bit recognition signal for the sequence control circuit 240.

In the event no two adjacent bit signals are detected in the shift register circuit 241, then no logic signal will be produced in the output of the logic circuit 462. Therefore, the envelope will be classified as non-machine readable mail.

ZERO RECOGNIZER CIRCUIT

Should the adjacent bit recognizer circuit 245 fail to detect two adjacent bit logic signals in the flip-flop circuits 435a–436f of the shift register circuit 241, then the shift register circuit 241 would shift in an endless manner. This will occur when there is a complete absence of logic signals in the flip-flop circuits 435a–436f of the shift register circuit 241 or when there are scattered bits of information in the flip-flop circuits 435a–436f of the shift register circuit 241.

To obviate this condition, the zero recognizer circuit 244 (FIG. 15) will transmit a pulse over the conductor 371 to the sequence control circuit 240 to stop the shifting of the shift register circuit 241 when the adjacent bit recognizer circuit 245 fails to detect two adjacent bits in the flip-flop circuits 435a–436f of the shift register circuit 241.

For this purpose, the zero recognizer circuit 244 includes conventional five input nor logic circuits 470a–

470*f*. Connected to the input circuits of the logic circuits 470*a*–470*f* in groups of five are conductors 471*a*–472*d*, which are connected respectively to the outputs of the flip-flop circuits 435*a*–436*d*. Conventional inverter circuits 473*a*–473*f* are connected to the output circuits of the logic circuits 470*a*–470*f*, respectively. A well-known five input nor logic circuit 475 is connected to the output of the inverter circuits 473*a*–473*e*. The output circuit of the logic circuit 475 is connected to an inverter circuit 476, which has its output circuit connected to an input circuit of a well-known four input nor logic circuit 477. Another input circuit of the logic circuit 477 is connected to the output of the inverter circuit 473*f*. The remaining input circuits of the logic circuit 477 are connected to respective output circuits of the flip-flop circuits 436*e* and 436*f* of the shift register circuit 241 over conductors 472*e* and 472*f*.

All of the conductors 471*a*–472*f* are connected to the set side of the flip-flop circuits 435*a*–436*f*, respectively. As long as a flip-flop circuit is not set by the change of state through the receipt of a logic signal, the set side is at a negative potential. When a flip-flop circuit is at a zero state, a negative potential is found on the set side output circuit thereof. Should all the conductors 471*a*–471*e* be at a negative potential, a logic pulse is produced in the output of the logic circuit 470*a*. On the other hand, should one or more of the conductors 471*a*–471*e* not be at a negative potential, then the logic circuit 470*a* will not produce a logic pulse in the output thereof. The same operations apply to the logic circuits 470*b*–470*f* with respect to their respective groups of input conductors.

If logic pulses are produced in the output circuits of all the logic circuits 473*a*–473*e*, then a logic pulse will be produced in the output of the logic circuit 475. The conductors 472*e* and 472*f* are connected to the flip-flop circuits 436*e* and 436*f*, which constitute the reference zone of the shift register circuit 241. In the event, there is a logic pulse produced in the output circuits of the logic circuit 475, logic circuit 473*f*, and over the conductors 472*e* and 472*f*, then a zero recognize pulse signal is transmitted over the conductor 371 to the sequence control circuit 240 to stop the transmission of shift pulses to the shift register circuit 241.

SKEW DETECTION CIRCUIT

The skew detection, up-down counter circuit 242 (FIGS. 14*a* and 14*b*) makes the primary skew measurement. It measures the difference in the number of shift pulses required to shift the logic signals of two adjacent bits to the reference zone of the shift register circuit 241 during the first interrogation cycle and during the second interrogation cycle. It is recalled that the sequence control circuit 240 stops the transmission of clock pulses during both the first and second cycle of interrogation when two adjacent bits are stored in the reference zone of the shift register circuit 241. Two interrogation cycles are required to determine the skew measurement, which occur within a predetermined space on the envelope in the direction of travel as it continuously advances through the scanning zone A. In the exemplary embodiment, a spacing of .68 inch was selected, because of the maximum allowable skew of five degrees and the resolution of the address scanning device 70 of 1/32 inch.

Illustrated in FIGS. 14*a* and 14*b* is the skew detector, up-down counter circuit 242, which comprises an inverter amplifier 500. Connected to the input of the amplifier 500 is the conductor 297′ that is connected to the sequence control circuit 240. Connected to the output of the amplifier 500 is a conductor 501 and a conductor 502. The conductor 502 is connected to the output circuit of the amplifier 500 through a nor logic circuit 503. Interconnecting one input circuit of the logic circuit 503 and the amplifier 500 is a conductor 504.

Connected to the conductor 501 are input circuits of nor logic circuits 505–508. Connected to the conductor 502 are input circuits of nor logic circuits 510–513. During the first interrogation cycle for skew detection, the sequence control circuit 240 transmits a positive pulse over the conductor 297′ to prepare the logic circuits 505–508 for shifting operation. The positive pulse transmitted over the conductor 297′ is fed to the amplifier 500, which feeds an input signal to the nor logic circuit 503. The output pulse of the logic circuit 503 is impressed on the conductor 502 to prevent the logic circuits 510–513 from producing shift pulses during the first cycle of interrogation for skew detection.

During the second cycle of interrogation, the sequence control circuit 240 transmits a negative pulse over the conductor 297′, which prevents the shift logic circuits 505–508 from producing shift pulses. However, the negative pulse is fed to the amplifier 500, which produces an output signal for transmission over the conductor 504. This results in an output signal produced by the logic circuit 503 that prepares the shift logic circuits 510–513 for producing shift pulses during the second cycle of interrogation.

A conventional flip-flop counter circuit 520 has its set output circuit connected to an input circuit of the logic circuit 505 and a reset output circuit connected to an input circuit of the logic circuit 510. Connected to the input circuit of the flip-flop circuit 520 over a conductor 521 is the conductor 365. Over the conductor 365 are transmitted clock pulses from the sequential control circuit 240 during each cycle of interrogation for skew detection. The output circuits of the logic circuits 505 and 510 are connected to input circuits of a conventional nor logic circuit 522.

The output circuit of the nor logic circuit 522 is connected to an input circuit of a well-known flip-flop counter circuit 523. A set output circuit for the flip-flop circuit 523 is connected to the logic circuit 506 and a reset output circuit for the flip-flop circuit 523 is connected to the logic circuit 511. A logic circuit 524 is connected to the set side of the flip-flop circuit 523 and a logic circuit 525 is connected to the reset side of the flip-flop circuit 523. These logic circuits control the polarity on the input circuits of the flip-flop circuit 523 to control the operation thereof.

The output circuits of the shift logic circuits 506 and 511 are connected to input circuits of a conventional nor logic circuit 526, which has its output circuit connected to the input circuit of a conventional flip-flop counter circuit 527. The set output circuit of the flip-flop circuit 527 is connected to the input circuit of the logic circuit 507 and the reset output circuit of the flip-flop circuit 527 is connected to the input circuit of the logic circuit 512. Further, the set output circuit of the flip-flop circuit 527 is connected to a logic circuit 528 and the reset output circuit of the flip-flop circuit 527 is connected to a logic circuit 529. These logic circuits control the polarity on the input circuits of the flip-flop circuit 527 to control the operation thereof.

Connected to the output circuit of the logic circuits 507 and 512 is a well-known nor logic circuit 530 and the output of the nor logic circuit 530 is connected to an input circuit of a well-known flip-flop counter circuit 531. A set output circuit of the flip-flop circuit 531 is connected to an input circuit of the logic circuit 508 and a reset output circuit of the flip-flop circuit 531 is connected to an input circuit of the logic circuit 513. In addition thereto, a logic circuit 532 is connected to the set side of the flip-flop circuit 531 and a logic circuit 533 is connected to the reset side of the flip-flop circuit 531. These logic circuits control the polarity on the input circuits of the flip-flop circuit 531 to control the operation thereof.

The output circuits of the logic circuits 508 and 513 are connected to input circuits of a conventional nor logic circuit 534, which has its output circuit connected to the input circuit of a conventional flip-flop counter circuit 535. A logic circuit 536 is connected to the set side of the flip-flop circuit 535 and a logic circuit 537 is connected to the reset side of the flip-flop circuit 535. These logic circuits control the polarity on the input circuits of the flip-flop circuit 535 to control the operation thereof.

The skew detector, up-down counter circuit 242 will count the clock pulses required to shift two adjacent bits to the reference zone in the shift register circuit 241 during the first cycle of interrogation and then count the clock pulses required to shift two adjacent bits to the reference zone in the shift register circuit 241 during the second cycle of interrogation. The difference between the number of shift pulses counted in the first and second cycle of interrogation determines whether the skew requirement of less than five degree skew is met. If the difference in the counted shift pulses is less than three then the skew measurement is acceptable for machine readable mail.

While reference herein is made to an up-down counter, it is intended that the skew detection circuit 242 during the first cycle of interrogation count up to the number of shift pulses, such as eight, and during the second cycle of interrogation count down from eight toward zero.

During the first cycle of interrogation, the flip-flop circuit 561 is held in a reset state by the logic circuit 560. The flip-flop circuit 561 being held in reset state by the logic circuit 560 provides a positive signal from the logic circuit 562 to the block shifting through the logic circuits 505–508 enables logic circuits 510–513 by way of logic circuit 503. The first clock pulse transmitted over the conductor 365 from the sequence control circuit 240 changes the state of the flip-flop counter circuit 520. The second clock pulse transmitted over the conductor 365 by the sequence control circuit 240 returns the flip-flop counter circuit 520 to its initial state. The returning of the flip-flop circuit 520 to its initial state produces a pulse in the output circuit thereof which produces a logic pulse in the output circuit of the shift logic circuit 510. In turn, a pulse is produced in the output of the logic circuit 522 to change the state of the flip-flop counter 523.

The third pulse transmitted over the conductor 365 changes the state of the flip-flop circuit 520. Now, the fourth clock pulse transmitted over the conductor 365 resets the flip-flop circuit 520, which causes the flip-flop circuit 523 to reset. The returning of the flip-flop circuit 523 to its initial state produces a pulse for feeding to the input circuit of the logic circuit 511, which, in turn, produces an output pulse for impressing on the input circuit of the logic circuit 526. Consequently, the logic circuit 526 produces an output pulse to change the state of the flip-flop circuit 527.

By transmitting the fifth clock pulse over the conductor 365, the flip-flop circuit 520 changes its state, while the flip-flop circuit 523 remains at its initial state and the flip-flop circuit 527 remains at its changed state. The sixth clock pulse resets the flip-flop circuit 520, which results in the flip-flop circuit 523 changing its state in a manner previously described. The flip-flop circuit 527 remains at its changed state. The seventh clock pulse changes the state of the flip-flop circuit 520 while the flip-flop circuits 523 and 527 remain in their set or changed state.

On the eighth clock pulse, the flip-flop circuit 520 is reset, which resets the flip-flop circuit 523. The resetting of the flip-flop circuit 523 causes the reset of the flip-flop circuit 527. Now, the return of the flip-flop circuit 527 to its initial state produces a set output pulse, which produces a logic output pulse in the logic circuit 512. This action produces a pulse in the output circuit of the logic circuit 530 to change the state of the flip-flop circuit 431. These operations are repeated and on the sixteenth pulse, the flip-flop circuit 535 is set.

The following table describes the counting operations during the first cycle of interrogation for skew detection wherein the set condition (S) and the reset condition (R) of the flip-flop circuits 524, 528, 532 and 536 determine the numerical count:

| Clock pulses | (1) Flip-flop 520 | (2) Flip-flop 523 | (4) Flip-flop 527 | (8) Flip-flop 531 | (16) Flip-flop 535 | Count |
|---|---|---|---|---|---|---|
| 1 | S | | | | | 1 |
| 2 | R | S | | | | 2 |
| 3 | S | S | | | | 3 |
| 4 | R | R | S | | | 4 |
| 5 | S | R | S | | | 5 |
| 6 | R | S | S | | | 6 |
| 7 | S | S | S | | | 7 |
| 8 | R | R | R | S | | 8 |
| 9 | S | R | R | S | | 9 |
| 10 | R | S | R | S | | 10 |
| 11 | S | S | R | S | | 11 |
| 12 | R | R | S | S | | 12 |
| 13 | S | R | S | S | | 13 |
| 14 | R | S | S | S | | 14 |
| 15 | S | S | S | S | | 15 |
| 6 | R | R | R | R | S | 16 |

During the second cycle of interrogation for skew detection, a negative potential signal is transmitted from the sequence control circuit 240 over the conductor 297′ and through the amplifier 500, which enables the operation of the logic circuits 505–508. However, the negative potential signal is fed to the logic circuit 503, which produces an output potential for inhibiting the logic circuits 510–513. Furthermore, the skew detection circuit 242 will now count down from the number of clock pulses transmitted to the shift register circuit 241 during the first interrogation cycle for skew detection toward zero.

Assuming for the purpose of convenience that the number of clock pulses transmitted during the first cycle of interrogation is eight. The first clock pulse of the second cycle of interrogation is transmitted over the conductor 365 from the sequence control circuit and is impressed on the input circuit of the flip-flop circuit 520. As a consequence thereof, the flip-flop circuit 520 changes its state to a set state. The change of the flip-flop circuit 520 to a set state produces an output pulse, which is fed to the logic circuit 505 to produce an output pulse in its output circuit. Thereupon, an output pulse is produced in the output circuit of the logic circuit 522. This action changes the state of the flip-flop circuit 523 to its set state.

By changing the state of the flip-flop circuit 523, an output pulse is produced at its set output circuit to produce an output pulse in the output of the logic circuit 506. Therepon, an output pulse is produced in the output of the logic circuit 526 to change the state of the flip-flop circuit 527 to its set mode.

The changing of the mode of the flip-flop circuit 527 to its set mode produces a pulse in the output circuit thereof, which produces an output pulse in the logic circuit 507. Thereupon, an output pulse is produced in the output of the logic circuit for impressing the pulse on the input circuit of the flip-flop circuit 531. However, the flip-flop circuit 531 remains in the same mode because of the on condition of the logic circuit 532. The chain created by the first pulse in the second cycle of interrogation stops and the count of the flip-flop counters 520, 523, 527, 531 and 535 is seven.

The second clock pulse transmitted by the sequence control circuit 240 over the conductor 365 is again applied to the input circuit of the flip-flop circuit 520. This time the flip-flop circuit 520 has its mode changed to the reset state. However, the flip-flop circuits 523 and 527 remain in a set state and the count of the flip-flop circuits 520, 523, 527, 531, and 535 is six.

On the third clock pulse, the mode of the flip-flop circuit 520 is changed to a set state. This action produces an output pulse in the set side of the flip-flop circuit 520 to produce a logic pulse in the output of the logic circuit 505, which, in turn, produces a logic pulse in the output of the logic circuit 522. The output pulse is fed to the input circuit of the flip-flop circuit 523 to change its mode to a reset state.

By changing the mode of the flip-flop circuit 523 to a reset state, an output pulse is produced in the set side of the flip-flop circuit 523, which is fed to an input circuit of the shift logic circuit 506, thereby causing an output pulse to be produced in the output circuit of the logic circuit 526 for impressing on the input circuit of the flip-flop circuit 527. The flip-flop circuit 527 remains in its set state, because of the on condition of the logic circuit 528, and the chain of flip-flop actions from the third clock pulse of the second interrogation cycle is stopped. The count of the flip-flop circuit 520, 523, 527, 531 and 534 is now five.

When the fourth clock pulse of the second interrogation cycle is transmitted from the sequence control circuit 240 over the conductor 365, the flip-flop circuit 520 changes its mode to the reset state, while the flip-flop circuit 523 remains in a reset state and the flip-flop circuit 527 remains in a set state. Thus, the count is reduced to four. During the fifth clock pulse of the second interrogation cycle, the flip-flop circuit 520 has its state changed to the set mode. In a manner previously described, the flip-flop circuit 523 has its mode changed to the set state. Thus, the count is reduced to three. For the sixth pulse the flip-flop circuit 520 is changed to a reset mode, while the flip-flop circuit 523 remains in a set mode. Hence, the count is two. For the seventh pulse, the flip-flop circuit 520 is set to the set state, which in turn changes the flip-flop circuit 523 to the set state. Hence the count as one. The eighth clock pulse changes the flip-flop circuit 520 to its initial mode and the skew detection circuit 242 has its flip-flop in their initial state.

It was previously assumed that the digital pulses counted during the first interrogation cycle was eight. Assuming further that the number of clock pulses required during the second cycle interrogation for skew detection was eight. Then, the difference in the required pulses during the first and second cycle is zero and no skew is present. All the flip-flop circuits 520, 523, 527, 531 and 535 are returned to their initial state. If the required pulses during the second interrogation cycle of skew detection is seven, then the difference in the required pulses during the first and second cycle of interrogation is one. Therefore, the flip-flop circuit 520 is set and the remaining flip-flop circuits 523, 527, 531 and 535 are in their initial state.

Should the required pulses for the second interrogation cycle be six, then the difference in the required pulses during the first and second cycle is two and only the flip-flop circuit 523 remains in a set state. With a count of two, the skew requirement is satisfied. As long as the difference between the shifting pulses required during the first and second interrogation cycles is not more than two, the skew requirement is met.

Should the number of clock pulses required during the second cycle of interrogation exceed the number of clock pulses required during the first cycle of interrogation, then the flip-flop circuits 520, 523, 527, 531 and 535 would register zero. However, the excess number pulses must be counted to determine whether skew is present. This is done during a third cycle of interrogation and the skew detector circuit 242 will again count up as it did during the first cycle of interrogation.

At the time the flip-flop circuits 520, 523, 527, 531 and 535 are in the reset state, a positive output signal is produced by a logic circuit 542′, which signal causes a flip-flop circuit 570 to be reset. The resetting of the flip-flop circuit 570 causes an amplifier 573 to have a positive output signal. The positive output signal of the amplifier 573 is transmitted to inputs of logic circuits 525, 524′, 533, 537, 536, 532, 528 and 524. The positive input to the logic circuits 525, 524, 533, 537, 532, 528 and 524 prevent the next clock pulse from causing the flip-flop circuits 523, 527, 531 and 535 from setting. This same clock pulse, however, does cause the flip-flop circuit 520 to set. Hence, a count of one.

The setting of the flip-flop circuit 520 causes the logic circuit 542′ to change its state giving a minus potential at its output. The next clock pulse causes the flip-flop circuit 570 to set changing the potential on a conductor 574 to a negative voltage through the amplifier circuit 573. Thus, on the second clock pulse the skew detection circuit 242 is returned to the normal count up mode and the count proceeds as it did in the first interrogation cycle.

The purpose of the flip-flop circuits 570 and 573 is to allow sufficient time for all circuits to be reversed before committing the first clock pulse to the counter. Thus, preventing the counter from changing from zero to 31. At the same time, the zero count causes a positive pulse at the output circuit of the logic circuit 542′. A positive signal is produced at the input of the logic circuit 555. This positive input causes the output of the logic circuit 555 to be at a negative potential, thereby allowing the circuit 560 to generate a positive output signal. This action sets the flip-flop circuit 561 whose output, in turn, is transmitted through the amplifier 562 to the inputs of the logic circuits 505, 506, 507 and 508, respectively. The output of the circuit 562 is also transmitted to the logic circuit 503. The output of the logic circuit 503 becomes negative and prepares the logic circuits 510, 511, 512 and 513 for operation.

After the flip-flop circuits 520, 523, 527, 531 and 535 are reset the clock pulses thereafter up to the time the shifting of the adjacent bits in the shift register circuit 241 have stopped. The count up operation is similar to that previously described in the first interrogation cycle.

For counting the remaining pulses after the second cycle of interrogation or for counting the difference in clock pulses required between the first and second cycles of interrogation, conventional logic circuits 590–594 are provided. The logic circuit 590 which is a nor logic circuit, has one input circuit thereof connected to the reset output circuit of the flip-flop circuit 520 over a conductor 595 and has another input circuit thereof connected to the reset output circuit of the flip-flop circuit 523. The logic circuit 591 is a nor logic circuit and has one input circuit thereof connected to the output circuit of the logic circuit 590 and has another input circuit thereof connected to the set side of the flip-flop circuit 523.

The output circuit of the logic circuit 591 is connected to one input circuit of the three input logic circuit 594, which is also a nor logic circuit. Should the remaining pulse count or the difference pulse count be two or three then a logic output pulse will be produced in the output of the logic circuit 591 for producing an output pulse in the logic circuit 594.

The three input logic circuit 592 is a nor logic circuit and has one input circuit thereof connected to the set output circuit of the flip-flop circuit 527 over the conductor 544; another input circuit connected to the set output side of the flip-flop circuit 531 and the third input circuit connected to the set output side of the flip-flop circuit 535. In the event the remaining pulse count or the difference pulse count is greater than three, then the logic circuit 592 will produce a logic pulse in the output circuit thereof.

When the logic circuit 592 produced a logic pulse in the output circuit thereof, an inverter circuit 593 is prepared to produce a logic signal in the output circuit thereof. Should a logic pulse be produced in the output circuit of the logic circuit 592, such pulse will be fed to the inverter circuit 593 for transmission to another input circuit of the logic circuit 594. Therefore, when the count is greater than three the output signal from the inverter circuit 593 inhibits the logic circuit 594 from producing an output pulse.

After the second cycle of interrogation is completed, the output control circuit 243 transmits a signal over a conductor 605 to an input circuit of the logic circuit 600 and to an input circuit of the logic circuit 594 through a well-known inverter circuit 606.

Should the remaining pulse count or the difference pulse count be greater than three, the logic circuit 600 produces an output pulse in the output circuit thereof, which is fed to a well-known inverter circuit 607. The output signal of the inverter circuit 607 is fed to a conventional amplifier circuit 608. The output signal over the amplifier circuit 608 is transmitted over a conductor 603 to the character size and skew detector matrix circuit 625. The character size and skew detector matrix circuit 625 upon receiving the logic signal over the conductor 603 will make a determination of character size and also a determination of whether the address block is skewed.

The skew detector circuit 242 can determine that the address block is skewed when the remaining pulse count or the difference pulse count is two or three. However, when the remaining pulse count or the difference pulse count is greater than three, the character size and skew detector matrix circuit 625 will make a determination as to whether the address block on the envelope is skewed. When the remaining pulse count or the difference pulse count was more than three, the output pulse produced by the logic circuit 592 was fed to the logic circuit 594 through the inverter circuit to prevent the logic circuit 594 from producing an output pulse for transmission over the conductor 602.

When the remaining pulse count or the difference pulse count was two or three, the output pulse produced by the logic circuit 591, when no output pulse was produced by the logic circuit 592 and the output circuit 243 produced a signal over the conductor 605, produced a logic signal in the output circuit 594 which is transmitted to the character size and skew detector circuit 625 over the conductor 602. Hence, the address is skewed. The logic signal transmitted over the conductor 603 initiates the operation of the character size and skew detector circuit 625 for measuring the height of the characters when the count is four or more and skew may be present. If the count is zero or one, there is no skew and no output pulse is produced by the skew detection circuit 242 over either the conductor 602 or the conductor 603.

CHARACTER SIZE AND SKEW DETECTOR MATRIX CIRCUIT

The character size and skew detector matrix circuit 625 (FIG. 16) measures the character height and completes the evaluation of skew when the different pulse count or the remaining pulse count is greater than three. The range of character size or height that is acceptable to be classified as machine readable mail is $\frac{1}{16}$ inch to $\frac{7}{32}$ inch or with respect to character bits stored in the shift register circuit 241 two to seven bits. Any character falling outside of this range will result in the envelope being classified as non-machine readable mail.

The character height measurement is made by sensing the contents of the last eight flip-flop circuits 435*y*–436*f* (FIG. 11*d*) of the shift register circuit 241. Since the flip-flop circuit 436*f* represents the last flip-flop circuit within the reference zone, it will be examined first. Then in succesion the flip-flop circuits 436*e* through 435*y* will be examined. If the character is of such a size as to set two flip-flop circuits, the character will be recognized as acceptable to meet the requirements of machine readable mail. Similarly, if the size or height of the character is such as to cause three, four, five, six or seven flip-flop circuits to be set, the character height will be recognized as acceptable to meet the requirements of machine readable mail. However, if less than two flip-flop circuits are set or more than seven flip-flop circuits are set, then the height of the characters will be recognized as unacceptable and the envelope will be classified as non-machine readable mail.

Since two adjacent bits in the shift register circuit 241 are required to start the interrogation cycle for skew detection, no actual measurement is made of characters being too small or less than two bits high. The reset side of the flip-flop circuits 435*x*–436*f* (FIGS. 11*b* and 11*d*) of the shift register circuit 241 are connected to conventional nor logic circuits 630–636 (FIG. 16) of the character size and skew detector matrix circuit 625 over conductors 366, 367 and 453*d*–452*y*.

Assuming initially, there are two adjacent bits stored in the flip-flop circuits 436*f* and 436*e* of the shift register circuit 241, then the output reset circuits of the flip-flop circuits 436*f* and 436*e* are at a negative potential. As a consequence thereof, negative potential signals are applied to the input circuits of the logic circuit 630 to cause a positive logic pulse to be produced in the output circuit thereof. The positive pulse produced by the logic circuit 630 is fed to a well-known inverter circuit 638. A conventional nor logic circuit 639 has one input circuit thereof connected to the output of the inverter circuit 638 with the result a positive logic output pulse is produced in the output of the logic circuit 639. Connected to the output of the logic circuit 639 is a conventional flip-flop memory circuit 640, which is set by the pulse produced in the output of the logic circuit 639. Thus, should only two adjacent bits be stored in the flip-flop circuits 436*e* and 436*f* of the shift register circuit 241, then this information will be stored in the flip-flop circuit 640 of the character size and skew detector matrix circuit 625.

If the flip-flop circuits 436*d*–436*f* of the shift register circuit 241 were set to indicate the presence of a character three bit high, then negative potential signals are impressed on the conductors 366, 367 and 453*d*. This action causes a positive output pulse to be produced in the output circuits of the logic circuits 630 and 631 of the character size and skew detector matrix circuit 625. The output of the inverter circuit 638 is connected to the other input of the logic circuit 631 so that the logic circuit 630 must produce an output logic signal for the logic circuit 631 to produce an output logic signal. The output signal from the inverter circuit 638 is at a negative potential.

Connected to the output of the logic circuit 631 in a conventional inverter circuit 641, which has its output circuit connected to a nor logic circuit 642. A conventional flip-flop memory circuit 645 is connected to the output circuit of the logic circuit 642. The negative potential signals applied to the input circuit of the logic circuit 631 produces a positive output logic signal on the output circuit thereof, which causes the inverter circuit 641 to produce a negative output logic signal. Thereupon, the logic circuit 642 produces a positive logic output signal, which causes the flip-flop circuit 645 to set. When the flip-flop circuit 645 sets the flip-flop circuit 640 is prevented from setting through the conductor 671. Thus, should three adjacent bits be stored in the flip-flop circuits 436*d*–436*f* of the shift register circuit 241, then this information will be stored in the flip-flop circuit 645 of the character size and skew detector matrix circuit 625.

Should the flip-flop circuits 436*c*–436*f* of the shift register circuit 241 be set to indicate the presence of a character four bit high, then negative potential signals will be impressed on the conductors 366, 367, 453*d* and 453*c*. The circuits 630, 631, 638 and 641 will operate in a manner just described. The output of the inverter circuit 641 is connected to an input of the logic circuit 632 to impress a negative potential signal thereon. Therefore, a positive logic signal is produced in the output circuit of the logic circuit 632.

Connected to the output circuit of the logic circuit 632 is a conventional inverter circuit 647 and the output circuit of the inverter circuit 647 is connected to an input circuit of a conventional nor logic circuit 648. In turn, the output circuit of the nor logic circuit 648 is connected to the input circuit of a conventional flip-flop memory circuit 649. The positive output pulse produced by the logic circuit 632 caused a negative pulse to be produced in the output of the inverter circuit 647, which in turn, causes the logic circuit 648 to produce a positive logic output signal for setting the flip-flop circuit 649. By setting the flip-flop circuit 649, the flip-flop circuits 640 and 645 are prevented from setting by the potential applied over the conductors 671 and 672. Hence, should four adjacent bits be stored in the flip-flop circuits 436*c*–436*f* of the shift register circuit 241, then such information will be stored in the flip-flop circuit 649.

In the event five adjacent bits are stored in the flip-flop circuits 436*b*–436*f* of the shift register circuit 241, then negative potential signals are applied over the conductors 366, 367 and 453*b*–453*d* to input circuits of the logic circuits 630–633. The logic circuits 630–632 operate in a manner previously described. The logic circuit 633 produces a positive output logic signal, since a negative signal is applied to an input thereof over the conductor 453*b* and the inverter circuit 647 produces a negative potential signal for application to the other input circuit of the logic circuit 633.

Connected to the output of the logic circuit 633 is an inverter circuit 651 and connected to the output of the inverter circuit 651 is a nor logic circuit 652. A conventional flip-flop memory circuit 653 is connected to the output circuit of the logic circuit 652. When a positive pulse is produced in the output circuit of the logic circuit of the logic circuit 633, a negative pulse is produced in the output circuit of the inverter circuit 651, which is fed to the input circuit of the logic circuit 652. Thereupon, a positive output signal is produced in the output of the logic circuit 652 to set the flip-flop circuit 653. The flip-flop circuits 640, 645 and 649 are prevented from setting by a potential applied over conductors 671, 672 and 673. Hence, should five adjacent bits be stored in the flip-flop circuits 436*b*–436*f* of the shift register circuit 241, then such information is stored in the flip-flop circuit 653.

Should six adjacent bits be stored in the flip-flop circuits 436*a*–436*f* of the shift register circuit 241, then a negative potential will be applied over the conductors 366, 367 and 453*a*–453*d* to the logic circuits 630–634 of the character size and skew detector matrix circuit 625. The logic circuits 630–633 operate in a manner previously described. Th logic circuit 634 produces a positive logic pulse signal in the output thereof, since a negative potential signal is impressed on the conductor 453*a* and the inverter circuit 651 applies a negative potential signal to the other input circuit, of the logic circuit 634.

Connected to the output circuit of the logic circuit 634 is a well-known inverter circuit 655, which has its output circuit connected to a conventional nor logic circuit 656. In turn, the logic circuit 656 has its output circuit connected to the input circuit of a conventional flip-flop memory circuit 657.

When a positive pulse is produced in the output circuit of the logic circuit 634, a negative pulse is produced in the output circuit of the inverter circuit 655, which in turn, causes a positive output signal to be produced in the output of the logic circuit 656. This action causes the flip-flop circuit 657 to be set. By setting the flip-flop circuit 657, the flip-flop circuits 640, 645, 649 and 653 are prevented from setting by the potential applied over the conductors 671, 672, 673 and 674. Therefore, should six adjacent bits be stored in the flip-flop circuits 436*a*–436*f* of the shift register circuit 241, then such information is stored in the flip-flop circuit 657.

In the event seven adjacent bits are stored in the flip-flop circuits 435*z*–436*f* of the shift register circuit 241, then a negative potential will be applied over the conductors 366, 367 and 453*d*–552*z* to the logic circuits 630–635 of the character size and skew detector matrix circuit 625. The logic circuits 630–634 operate in a manner previously described. A positive output pulse signal in produced by the logic circuit 635, since a negative potential is applied to an input circuit thereof over the conductor 552*z* and is applied to the other input circuit thereof through the output circuit of the inverter circuit 655.

Connected to the output circuit of the logic circuit 635 is a well-known inverter circuit 660. The output of the logic circuit 635 is connected directly to an input circuit of a conventional flip-flop memory circuit 661. The positive output pulse produced by the logic circuit 635 is applied to the input circuit of the flip-flop circuit 661 to set the flip-flop circuit 661. By setting the flip-flop circuit 661, the flip-flop circuits 640, 645, 649, 653 and 657 are prevented from setting. Thus, should seven adjacent bits be stored in the flip-flop circuits 435*z*–436*f* of the shift register circuit 241, then such information is stored in the flip-flop circuit 661.

The above described character size measurement takes place during the first interrogation cycle for skew detection and the character size is stored in the flip-flop circuits 640, 645, 649, 653, 657 or 661 during the first cycle of interrogation for skew detection. The flip-flop circuits 640, 645, 649, 653, 657 and 661 operate only during the first cycle of interrogation. This is accomplished by a potential impressed on the conductors 646 and 654 through logic circuits 663–665 and inverter circuit 666. The logic circuits 663–665 and the inverter circuit 666 are operationally controlled by the potentials applied over the conductors 626 and 627 from the sequence control circuit 240. Should the character height be seven bits or less, then a negative signal is transmitted over a conductor 662 to the output control circuit 243 to indicate that the character height meets the requirement for machine readable mail. If eight adjacent bits are stored in the flip-flop circuits 435*y*–436*f*, then the character height is greater than the maximum allowed character height and the envelope will be classified as non-machine readable mail.

Connected to the output circuits of the logic circuits 630–635 over conductors 670–674, respectively, is a conventional nor logic circuit 675. When the number of adjacent bits stored in the flip-flop circuits 435*z*–436*f* of the shift register circuit 241 is less than eight, then an output pulse is produced in the output circuit of the logic circuit 675, which produces a logic output signal in the output circuit of a well-known inverter circuit 676.

The output circuit of the inverter circuit 676 is connected to an input circuit of a nor logic circuit 677. The other input circuit of the nor logic circuit 677 is connected to the output circuit of the logic circuit 635. The logic circuit 677 produces in its output circuit a positive logic signal when the height of the character is less than eight bits.

Should the height of the character be greater than seven bits, the flip-flop circuits 435*y*–436*f* of the shift register circuits 241 will impress a negative potential signal over the conductors 366, 367 and 453*d*–452*y* to the character size and skew detector matrix circuit 625. Thereupon, the logic circuits 630–635 of the character size and skew detector matrix circuit 625 will operate in the manner previously described and a negative logic signal is produced in the output circuit of the inverter circuit 660.

Connected to the output circuit of the inverter circuit 660 is one input circuit of a nor logic circuit 636. The other input of the nor logic circuit 636 is connected to the conductor 452*y*. When eight adjacent bits are stored in the flip-flop circuits 435*y*–436*f* of the shift register circuit 241, negative potential signals will be impressed on the input circuits of the logic circuit 636. Therefore, a positive output signal is produced in the output circuit of the logic circuit 636 for transmission over a conductor 681.

Connected to the output circuits of the logic circuits 677 and 636 is a nor logic circuit 682. Interconnecting the conductor 662 with the logic circuit 682 is a well-known inverter circuit 683. Should the height of the character be less than eight bits, then a negative potential signal is fed to the output control circuit 243 over the conductor 662 to indicate that the envelope is machine readable mail. On the other hand, should the height of the character be greater than seven bits, then a positive potential signal is fed to the output control circuit 243 over the conductor 662 to indicate that the envelope is non-machine readable mail.

During the first cycle of interrogation, the character size measurement, if not greater than seven bits high, is stored in the flip-flop memory circuits 640, 645, 649, 653, 657, and 661 for use during the second cycle of interrogation in conjunction with the skew measurement by the skew detector matrix of the character size and skew detector matrix circuit 625.

The final skew determination remains to be examined. As of the present time the final skew determination has not been decided for difference or remaining pulse count of four or more. The difference in pulse count may be caused by skew or by two separate lines. The decision will be made by checking for spaces between set flip-flop circuits in the shift register circuit 241. If the address is not skewed, there will be a distinct space in the set flip-flop circuits of the shift register circuit 241 between lines of characters in the address block. If the address is skewed greater than ten degrees, the lines will tend to run together and the address will appear as a solid block with no spacing in the set flip-flop circuits of the shift register circuit 241.

In a skew detector matrix 690 of the character size and skew detector matrix circuit 625 are conventional nor logic circuits 691–696. The logic circuits 691–696 have input circuits thereof connected to the skew detection up-down counter circuit 242 over the conductor 603 to prepare the character size and skew detector matrix circuit 625 for rendering a decision.

Connected to another input circuit of the logic circuit 691 is the output circuit of the flip-flop memory circuit 640. A third input circuit of the logic circuit 691 is connected to the conductor **453*d* through an inverter circuit 700. In a like manner, the fourth input circuit of the logic circuit 691 is connected to the conductor 453*c* through an inverter circuit 701. The conductors 453*d* and 453*c* are connected to the output circuits of the flip-flop circuits 436*d* and 436*c*, respectively, of the shift register circuit 241. Should negative potential signals be applied to all the input circuits of the logic circuit 691, then a positive pulse will be produced in the output circuit of the logic circuit 691. On the other hand, should one or more input circuits of the logic circuit 691 have a positive potential applied thereto, then the logic circuit 691 does not produce a pulse in the output circuit thereof. Should one or more positive potential signals be present, then there is a distinct space between address lines as sensed by the shift register circuit 241.**

In a similar manner, connected to another input of the logic circuit 692 is the output circuit of flip-flop circuit 645. A third input circuit of the logic circuit 692 is connected to the conductor **453*c* through the inverter circuit 701. The fourth input circuit of the logic circuit 692 is connected to the conductor 453*b* through the inverter circuit 702. Still another input circuit is connected to the conductor 453*a* through an inverter circuit 703. The conductors 453*c*, 453*b* and 453*a* are connected to the reset side of the flip-flop circuits 436*c*, 436*b* and 436*a*, respectively, of the shift register circuit 241. Should negative potentials be applied to all the input circuits of the logic circuit 692, then a positive pulse will be produced in the output circuit of the logic circuit 692. Should one or more positive potential signals be applied to the input circuits of the logic circuit 692, then the logic circuit 692 does not produce a pulse in the output circuit thereof. This is indicative of a distinct space between address lines as detected by the shift register circuit 241.**

Likewise, connected to the input circuit of the logic circuit 693 is the output of the flip-flop circuit 649 and connected to still another input circuit of the logic circuit 693 is the conductor **453*b* through the inverter circuit 702. The conductor 453*a* is connected to another input circuit of the logic circuit 693 through the inverter circuit 703. Still another input circuit is connected to the conductor 453*z* through an inverter circuit 704. The conductors 453*b*, 453*a* and 452*z* are connected to the reset side of the flip-flop circuits 436*b*, 436*a*, and 435*z*, respectively, of the shift register circuit 241. In the event negative potential signals are applied to all the input circuits of the logic circuit 693, then a positive pulse will be produced in the output circuit of the logic circuit 693. Should one or more positive potential signals be applied to the input circuits of the logic circuit 693, then the logic circuit 693 does not produce a pulse in the output circuit thereof. This is indicative of a distinct space between address lines as detected by the shift register circuit 241.**

The logic circuit 694 has its remaining input circuits connected to the output of the flip-flop circuit 653, the conductor **453*a* through the inverter circuit 703, the condutcor 452*z* through the inverter circuit 704, and the conductor 452*y* through an inverter circuit 705. The flip-flop circuits 436*a*, 435*z* and 435*y* of the shift register circuit 241 when set impress respectively negative potential signals over the conductors 453*a*, 452*z* and 452*y*, respectively, to apply through the inverter circuits 703–705 positive pulses to the input circuits of the logic circuit 694. In the event negative potential signals are applied to all the input circuits of the logic circuit 694, then a positive pulse will be produced in the output circuit of the logic circuit 694. Should one or more positive potential signals be applied to the input circuits of the logic circuit 694, then the logic circuit 694 does not produce a pulse in the output circuit thereof. This is indicative of a distinct space between address lines as detected by the shift register circuit 241.**

The logic circuit 695 has its remaining input circuits connected to the output circuit of the flip-flop circuit 657, the conductor **452*z* through the inverter circuit 704, the conductor 452*y* through the inverter circuit 705, and the conductor 452*x* through an inverter circuit 706. The flip-flop circuits 435*z*, 435*y* and 435*x* of the shift register circuit 241, when set, impress respectively, negative potential signals over the conductors 452*z*, 452*y* and 452*x* through the inverter circuits 704–706 to feed positive pulses to the input circuits of the logic circuit 695. In the event negative potential signals are applied to all the input circuits of the logic circuit 695, then a positive pulse will be produced in the output circuit of the logic circuit 695. Should one or more positive potential signals be applied to the input circuits of the logic circuits 695, then the logic circuit 695 does not produce a pulse in the output circuit thereof. This is indicative of a distinct space between address lines as detected by the shift register circuit 241.**

The logic circuit 696 has its remaining input circuits connected to the output circuit of the flip-flop memory circuit 661 to the conductor **452*y* through the inverter circuit 705, to the conductor 452*x* through the inverter circuit 706 and to the conductor 471*w*. The flip-flop circuits 435*y*, 435*x* and 435*w* of the shift register circuit 241, when set, impress respectively, negative potential signals over the conductors 452*y* and 452*x* through the inverter circuits 705 and 706 and positive potential signals over the conductor 471*w* to feed positive pulses to the input circuits of the logic circuit 696. In the event negative potential signals are applied to all the input circuits of the logic circuit 696, then a positive pulse will be produced in the output circuit of the logic circuit 696. Should one or more positive potential signals be applied to the input circuits of the logic circuit 696, then the logic circuit 696 does not produce a pulse in the output circuit thereof. This is indicative of a distinct space between address lines as detected by the shift register circuit 241.**

Each logic circuit 691–696 examines for skew detection its associated flip-flop memory circuit 640, 645, 649, 653, 657 and 661 for character height information stored during the first cycle of interrogation of skew detection and its associated logic circuits 700–706 to detect the presence of bit character information advanced toward the reference zone in the shift register circuit 241 during the second cycle of interrogation for skew detection. In so examining these conditions, each logic circuit 691–696 seeks to determine the presence of spaces between address lines. The presence of space between address lines is indicative of the absence of skew. The absence of space between address lines indicates that the skew present fails to meet the requirement for machine readable mail.

Assuming during the first cycle of interrogation for skew detection, the character size was measured to be two bits high. This information is stored in the flip-flop memory circuit 640. Assuming further that at the end of the second cycle of interrogation, the difference pulse count required was seven. The logic circuit 691 examines the flip-flop circuits **436*c*–436*f* of the shift register circuit 241. If the flip-flop circuits 436*c*–436*f* are set, indicating an absence of space between the first and second line of the address block, then the envelope is classified as non-machine readable mail. If one or more of the flip-flop circuits 436*c*–436*f*** is not set, then a decision is reached that there are spaces between successive address block lines and the envelope is classified as machine readable mail.

Connected to the output circuits of the logic circuits 691–695 is a nor logic circuit 710, which has its output connected to a conventional inverter circuit 711. The output of the inverter circuit 711, in turn, is connected to one input of a nor logic circuit 712. Another input of the nor logic circuit 712 is connected to the output circuit of the logic circuit 696. The remaining input circuit of the logic circuit 712 is connected over the conductor 602 to the skew detector, up-down counter circuit 242. A pulse signal transmitted over the conductor 602 from the skew detector, up-down counter circuit 242 represents the presence of a skew decision from the skew detector, up-down counter circuit 242.

The output of the nor logic circuit 712 is connected to an inverter circuit 713. The output control circuit 243 is connected to the output of the inverter circuit 713 over a conductor 715.

Should no space be detected between address lines in the address block a logic pulse will be produced in the output of one of the logic circuits 691–695 to produce an output logic pulse in the output circuit of the logic circuit 710. In the event the skew detection up-down counter circuit 242 indicates that skew is present, a pulse is transmitted over the conductor 602 to operate the logic circuit 712 to produce a positive pulse in the output circuit thereof. The logic circuit 712 produces a negative pulse when a positive pulse is received from either the logic circuit 696 or the inverter circuit 711. A negative pulse transmitted over the conductor 715 to the output control circuit 243 (FIG. 15) operates the output control circuit 243 to indicate the absence of skew at the end of the second cycle of interrogation of skew detection. Therefore, the envelope may be classified as machine readable mail. A positive pulse transmitted over the conductor 715 to the output control circuit 243 does not operate the output control circuit 243 to indicate the presence of skew. Accordingly, the envelope will be classified as non-machine readable mail.

Should the character height logic circuit 636 produce an output pulse to indicate the height of the character is greater than seven bits and therefore too high, an inverter circuit 716 produces a pulse in its output circuit. Connected to the output of the inverter circuit 716 is an input circuit of a nor logic circuit 720. The output circuit of the nor logic circuit 720 is connected to the output control circuit 243 over a conductor 721. Connected to the other input of the logic circuit 720 through an amplifier circuit 722 is the conductor 392. After the completion of the second cycle of interrogation for skew detection, the sequence control circuit 240 transmits a signal over the conductor 392 to prepare the logic circuit 720 for producing a pulse. Should a pulse be produced by the logic circuit 636 to indicate the character height is too great, a pulse is transmitted over the conductor 721 to the output control circuit 243.

OUTPUT CONTROL CIRCUIT

The output control circuit 243 (FIG. 13) makes the final decision as to whether the envelope advancing through the scanning zone A is machine readable mail or non-machine readable mail based upon all the information received from the various logic circuits. In addition, the output control circuit 243 generates reset pulses and the pulse which activates the timing circuit 76 and the sorting drive circuit 87.

After the shift register circuit 241 has advanced during the first cycle of interrogation for skew detection two adjacent bits to the reference zone of the shift register circuit 241, the sequence control circuit 240 received a pulse over the conductors 366 and 367 (FIG. 10*a*) to indicate the end of the first cycle of interrogation and that two adjacent bits have reached the reference zone of the shift register circuit 241. Thereupon, the sequence control circuit 240 transmitted a pulse signal to the output control circuit 243 over a conductor 722. The pulse so transmitted over the conductor 722 signals the output control circuit 243 that the first interrogation cycle for skew detection is completed and can be interrogated.

Connected to the conductor 722 is an inverter circuit 724, which has its output circuit connected to an input circuit of a nor logic circuit 725. The other input circuit of the nor logic circuit 725 is connected to the sequence control circuit 240 over a conductor 723. Over the conductor 723, the sequence control circuit 240 transmits clock pulses to the output control circuit 243. The logic circuit 725 produces a pulse in the output circuit thereof when the first interrogation cycle for skew detection is completed and in timed relation with a clock pulse transmitted over the conductor 723.

The output of the logic circuit 725 is connected to a conventional flip-flop circuit 727. The signal produced in the output of the logic circuit 725 enables the flip-flop circuit 727 to change its state. Also connected to the output of the logic circuit 725 is an inverter circuit 728. One input of a nor logic circuit 730 is connected to the output of the inverter circuit 728 and another input of the logic circuit 730 is connected to the set output side of a conventional flip-flop circuit 731. The output of the logic circuit 730 is connected to the set input side of the flip-flop circuit 731. Connected to the trigger input of the flip-flop circuit 731 is a conductor 726. Over the conductor 726, the sequence control circuit 240 transmits clock pulses to the output control circuit 243.

When the logic circuit 725 produces an output pulse, the logic circuit 730 produces an output pulse to enable the flip-flop circuit 731. The clock pulses transmitted over the conductor 726, after the flip-flop circuit 731 is enable, triggers the flip-flop circuit 731 to change its state to a set mode and a reset mode. Each time the flip-flop circuit 731 changes its state to a reset mode, an output pulse is produced by the flip-flop circuit 731 for changing the mode of the flip-flop circuit 727. Thus, during the three clock pulse time period, the flip-flop circuit 727 is set and then reset.

Connected to the output circuits of the flip-flop circuits 727 and 731 is a nor logic circuit 735. When the flip-flop circuit 727 returns to its initial state, it produces a pulse for feeding to the logic circuit 735. A nor logic circuit 736 is connected to the output of the logic circuit 735 and an output pulse produced by the logic circuit 735 causes an output pulse to be produced in the output of the logic circuit 736. Therefore, the logic circuit 736 produces a logic pulse in the output thereof after a time delay of three clock pulses or sixty microseconds after the logic circuit 725 produces a pulse in the output thereof. In this manner, the decision making logic circuits have sufficient time to analyze the contents of the shift register circuit 241, since there is a time delay between the operation of the output control circuit 243 and the completion of each interrogation cycle for skew detection.

The output control circuit 243 comprises a machine readable mail logic circuit 780 and a non-machine readable mail logic circuit 781. Connected to the input circuits of the logic circuits 780 and 781 are conductors 447, 448, 662, 715 and a flip-flop circuit 755. When the character height is greater than the acceptable requirement for machine readable mail, the character size and skew matrix circuit 625 transmits a signal over the conductor 721 to set the flip-flop circuit 755. The setting of the flip-flop circuit 755 impresses a potential signal on the input circuits of the logic circuits 780 and 781 to inhibit the logic circuit 780 from producing a pulse in the output circuit thereof and for causing the logic circuit 781 to produce an output pulse.

Figure 11D:
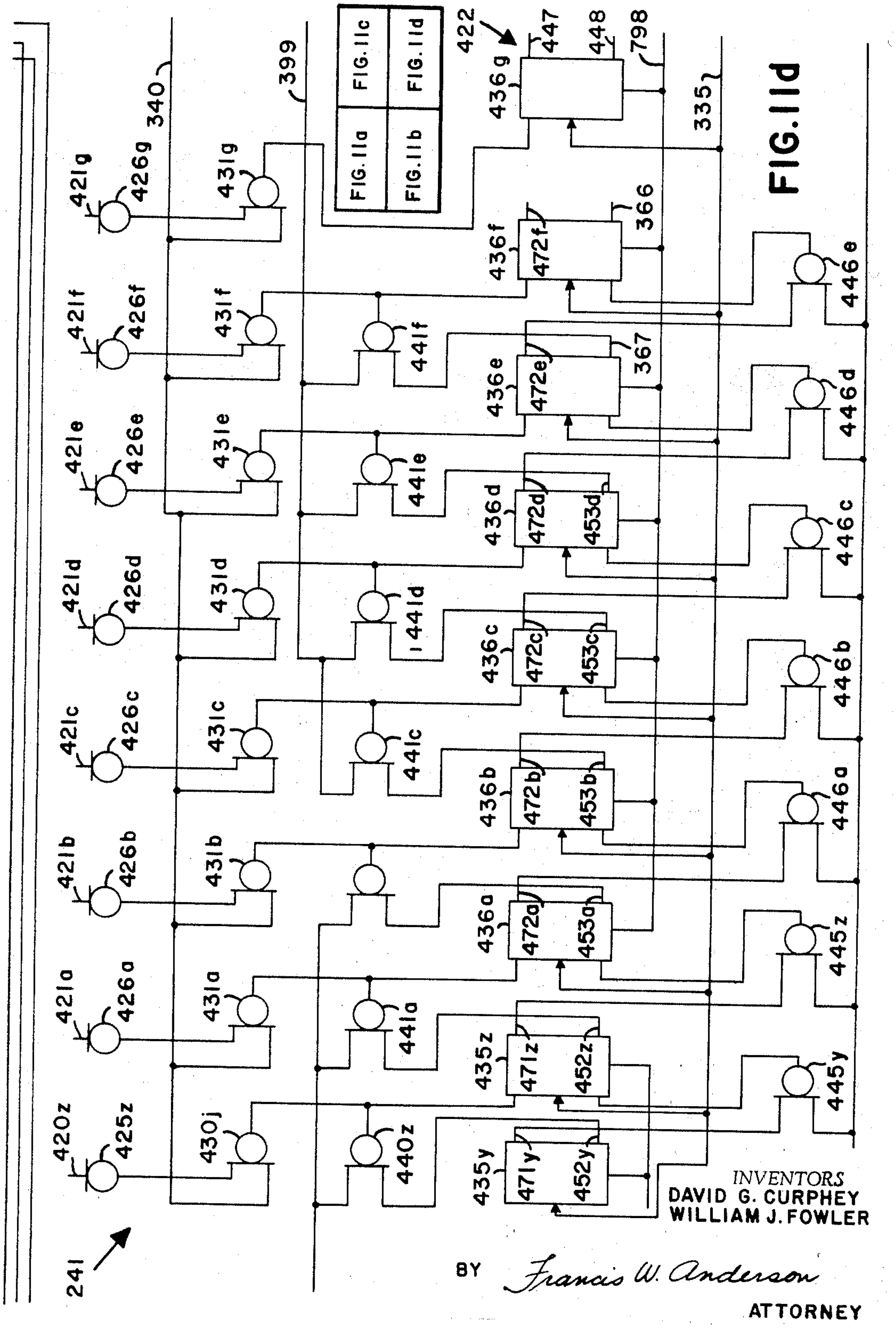

The conductor 448 interconnects the output control circuit 243 with the out-of-range detector circuit 422 (FIG. 11*d*). When the out-of-range detector circuit 422 transmits a signal over the conductor 448 to indicate the presence of printed information within ¼ inch of the lower edge of the envelope, the logic circuit 780 is inhibited from producing a pulse in the output thereof and the logic circuit is operated to produce a pulse in the output circuit thereof.

The conductor 662 interconnects the output control circuit 243 with the character size and skew detector matrix circuit 625. When the character size and skew detector matrix circuit 625 reaches the decision that the height of the address characters is too large during the second interrogation cycle and are not within the range acceptable for machine readable mail, it transmits a signal over the conductor 622 to inhibit the logic circuit 780 from producing an output pulse and causes the logic circuit 781 to produce an output pulse.

When the character size and skew detector circuit 625 reaches the decision that the skew of the characters do not meet the requirements of machine readable mail, it transmits over the conductor 715 a signal to inhibit the logic circuit 780 from producing an output pulse and for producing an output pulse in the logic circuit 781.

If the logic signals transmitted from the flip-flop circuit 755 and over the conductors 448, 662 and 715 indicate that one or more of the requirements of machine readable mail are not met, then the logic circuit 781 produces an output pulse to set a non-machine readable mail flip-flop circuit 756 through a logic circuit 782. The flip-flop circuit 756 stores the non-machine readable mail decision that is reached during the first cycle of interrogation. Under these conditions, no output pulse is produced from the logic circuit 780.

If the logic signals transmitted from the flip-flop circuit 755 and over the conductors 448, 662 and 715 indicate that all the requirements of machine readable mail are met, then the logic circuit 780 will produce a pulse in the output circuit thereof to set a machine readable mail flip-flop circuit 785. The setting of the flip-flop circuit 785 is accomplished when an output pulse is produced by the logic circuit 736 after the previously mentioned three clock pulse delay. The flip-flop circuit 785 stores the machine readable mail decision that is reached during the first cycle of interrogation. Under these conditions, no output pulse is produced from the logic circuit 781.

Connected to the output circuit of the logic circuit 780 and connected to the output circuit of the logic circuit 782 is a nor logic circuit 785′. The nor logic circuit 785′ will produce an output pulse either when the logic circuit 780 produces an output pulse or when the logic circuit 782 produces an output pulse. An inverter circuit 786 has its input circuit connected to the logic circuit 785′ and its output connected to amplifier 790–793. When the logic circuit 785′ produces an output pulse, reset signals are transmitted by the amplifiers 790–793 over conductors 795–798 to reset the flip-flop circuits 435*a*–436*g* of the shift register circuit 241. The reset signals transmitted by the amplifiers 790–793 clears the shift register circuit in preparation for accepting new information to be used during the second cycle of interrogation.

At the conclusion of the second cycle of interrogation, the above-described sequence is followed. However, should the non-machine readable mail flip-flop circuit 756, be set during the first cycle of interrogation, then the decision of non-machine readable mail during the second cycle of interrogation would cause the set flip-flop circuit 756 to set a non-machine readable mail flip-flop circuit 757. If during the second cycle of interrogation, the decision of non-machine readable mail is reached while the flip-flop circuit 756 is in its initial state, then only the flip-flop circuit 756 will be set.

Should the machine readable mail flip-flop circuit 785 be set during the first cycle of interrogation, then the decision of machine readable mail during the second cycle of interrogation would cause the set flip-flop circuit 785 to set a machine readable mail flip-flop circuit 786. If during the second cycle of interrogation, the decision of machine readable mail is reached, while the flip-flop circuit 785 is in its initial state, then only the flip-flop circuit 785 will be set.

Connected to the output circuit of the flip-flop circuit 786 is an input circuit of a nor logic circuit 740, and connected to another input circuit of the nor logic circuit 740 is the conductor 274. Should two adjacent bits appear in the shift register circuit 241 before the scan start cycle or within one inch of the leading edge of the envelope, which occurs when printed information appears within one inch of the leading edge of the envelope, the sequence control circuit 240 transmits a positive pulse over the conductor 274. The logic circuit 740 has its output connected to the timing circuit 76 and the sorting gate drive circuit 87 over the conductor 201.

When the sequence control circuit 240 transmits a positive pulse over the conductor 274, the logic circuit 740 is inhibited from producing an output pulse for activating the timing circuit 76 in order to operate the sorting gate drive circuit 87. When the flip-flop circuit 786 is set and no positive pulse is transmitted over the conductor 274, the logic circuit 740 produces an output pulse to activate the timing circuit 76 for operating the sorting gate drive circuit 87. The only time the logic circuit 740 produces an output pulse to operate the sorting gate drive circuit 87 is when the flip-flop circuit 786 is set and this occurs only when a decision of machine readable mail is reached during the first and second cycles of interrogation. When the sorting gate drive circuit 87 is operated, the envelope advancing through the scanning zone A is diverted to the machine readable mail receptacle 50 by the air jet diverting nozzle 55′.

Connected to the output circuits of the flip-flop circuits 785 and 756 is a nor logic circuit 803. One input of a nor logic circuit 805 is connected to the output of the logic circuit 803. Another input of the logic circuit 805 is connected to the output of the flip-flop circuit 757. From the output of the logic circuit 805 is connected a nor logic circuit 802 with an input circuit connected to a conductor 801. The conductor 801 is connected to the skew detector circuit 242. Inverter circuits 806 and 807 interconnect an amplifier 810 with the logic circuit 802. The flip-flop circuit 786 and the conductor 274 are connected to a nor logic circuit 811, which has its output connected to the amplifier 810.

Connected to the output of the amplifier 810 is an inverter circuit 812, and a conductor 800, which is connected to the skew detector circuit 242. The inverter circuit 812 is connected through a manual reset switch 813 and a reset drive circuit 814. From this arrangement, the output control circuit 243, after the completion of the second cycle of interrogation, generates a reset pulse which resets all the logic circuits in preparation for the succeeding envelope.

For resetting the logic circuits after the first cycle of interrogation when no two adjacent bits are detected during the second cycle of interrogation, the output control circuit 243 includes an inverter circuit 751, which has its input connected to the conductor 371. The zero recognize circuit 244 transmits a positive pulse over the conductor 371 to indicate the absence of bits in the shift control circuit 241 during the second cycle of interrogation.

A nor logic circuit 752 is connected to the output of the inverter circuit 751. In addition to the inverter circuit 751, conductors 392 and 750 are connected to the input circuits of the nor logic circuit 752. The sequence control circuit 240 transmits a signal over the conductor 392 to inhibit the logic circuit 752 from producing an output pulse until the second cycle of interrogation is completed. Further, the sequence control circuit 240 transmits a signal over the conductor 750 to inhibit the logic circuit 752 from producing an output pulse during the time shift pulses are transmitted to the shift register circuit 241 from the sequence control circuit 240.

Should two adjacent bits not be detected during the second cycle of interrogation, then the logic circuit 752 produces an output pulse to cause the logic circuit 736 to produce an output pulse. This action causes the logic circuit 782 to produce an output pulse. Thereupon, the logic circuit 785' produces a logic signal. As a consequence thereof, the amplifiers 790–793 transmit reset pulses over the conductors 795–798 to reset all the flip-flop circuits in the shift register circuit 241.

A signal from the belt inhibit control circuit 63 over the conductor 820 serves to produce reset pulses from the amplifiers 790–793 and 810 to clear anything remaining in the logic circuits in preparation for a succeeding envelope.

MASTER RESET CIRCUIT

A master reset circuit 850 (FIG. 18) serves to initiate a reset operation before the succeeding envelope enters the scanning zone A. The master reset circuit 850 comprises an input conductor 851, which is connected to the output control circuit 243 (FIG. 13) through a conductor 852 and through a conductor 853. Connected to the input conductor 851 is a resistor 855 and a capacitor 856 which form a spike-rejecting network 857.

The output control circuit 243 emits a signal over the conductor 852 when the amplifier 810 produces an output pulse to activate the reset driver circuit 814 and emits a signal over the conductor 852 when the manual reset switch 813 is actuated. As a cansequence thereof, the capacitor 856 charges through the resistor 855 until the threshold voltage of a Zener diode 856' is reached. Thereupon, a normally non-conducting transistor 857 is turned on. When the transistor 857 is turned on, it generates a positive signal through a capacitor 858 to turn off a normally conducting transistor 859. The transistors 865 and 859 with their interconnecting circuitry define a monostable multivibrator circuit 860.

As the transistor 859 is turned off, a normally non-conducting transistor 861 is turned on. The conduction of the transistor 861 produces a positive output signal over its load resistor 862 for transmitting a positive pulse signal over the conductor 275. While the transistor 861 conducts a capacitor 863 is charged through a resistor 864. The resistor 864 and the capacitor 863 form a resistance-capacitance timing network, whereby the capacitor 864 has a prescribed potential charge after a predetermined time duration, such as twenty microseconds, to return transistor 865 to its non-conducting mode.

When the transistor 865 is turned off, the transistor 859 is turned on. By turning on the transistor 859, the transistor 861 is turned off. Thus, an input signal of greater than the time constant of resistor 855 and capacitor 856 produces a positive pulse signal of twenty microseconds duration for transmission over the conductor 275. The output pulse transmitted over the conductor 275 is fed to the sequence control circuit 240 (FIG. 10*a*).

OPERATION

In the operation of the presorting apparatus 10, envelopes are placed in spaced relation against the guide plate 41 and the pinch belt 20. The address side of the letter mail is positioned facing the guide plate 41 with the stamp at the leading upper edge of the letter mail. The letter mail is thereupon pinched between the belts 20 and 40 and is advanced continuously in spaced relation in the direction of the arrow 42 (FIG. 1).

As long as an envelope is not advancing through the scanning zone A, the inhibit control circuit 63 (FIG. 8) impresses a potential over the conductor **115*b* to operate the sequence control circuit 240** (FIGS. 10*a* and 10*b*). In so doing, the sequence control circuit impresses a potential over the conductors 340–342 and 258 to inhibit the shift register circuit 241 (FIGS. 11*a*–11*d*) from advancing any logic signals received from the digital converter circuit 71 (FIGS. 10*a* and 10*b*). As a result thereof, the decision and storage circuit 75 does not receive any false signals from the digital converter circuit 71 when no letter is advancing through the scanning zone A arising from or generated by the discloration of the pinch belt 20.

As an envelope advances into the scanning zone A, the leading edge thereof interrupts the beam of light projected toward the phototransistor 61. The interruption of the beam of light projected toward the photo-transistor 61 initiates the operation of the scan start circuit 62. Thereupon, the scan start circuit 62 actives the inhibit control circuit 63 to change the potential impressed on the conductor **115*b*, whereby the sequence control circuit 240 changes the potential impressed on the conductors 258 and 340–342. When this occurs, the shift register circuit 241 is prepared to receive logic signals from the digital converter circuit 71**.

After a prescribed time delay to enable the envelope to advance its leading edge one inch beyond the vertical scanning line of the address scanning device 70, the scan start circuit 62 transmits a scan start signal to the sequence control circuit 240 over the conductor 97.

Downstream of the scan start transistor and located in the scanning zone A is the address scanning device 70. The address scaning device 70 produces 72 discrete signals per vertical optical scanning line for each successive line while an envelope is continuously advancing through the scanning zone A to scan the address area of the envelope within 2½ inches above the lower edge of the continuously advancing envelope. These signals are transmitted to the digital converter circuit 71. The digital converter circuit 71 converts the signals transmitted by the address scanning device 70 into logic or binary code signals.

The digital converter circuit 71 advances to the shift register circuit 241 over the conductors **420*a*–421*g*** (FIGS. 11*a*–11*d*) only those signals which satisfy the requirement for character density. Should the character density of the address block of the envelope fail to meet the requirements for machine readable mail, the presorting apparatus 10 operates as if the address on the envelope were blank. Under these conditions, the air diverting nozzle 55 continues to operate for diverting the envelope into the receptacle 51 for non-machine readable mail.

On the other hand, should the character density of the address block meet the requirements for machine readable mail, then the digital converter circuit 71 transmits the logic signals to the shift register circuit 241 over the conductors **420*a*–421*g***.

If the characters on the envelope are printed, then two or more adjacent bits will appear in the flip-flop circuits **435*a*–436*f* of the shift register circuit 241. Should the characters on the envelope be handwritten, then there will not be two adjacent bits in the flip-flop circuits 435***a*–436*f* of the shift register circuit 241.

Should printed information appear in the address portion of the envelope within one inch of the leading edge thereof, the adjacent bit recognizer circuit 245 will transmit a signal over the conductor 270 of the sequence control circuit 240 before the scan start signal is transmitted to the sequence control circuit 240. Thereupon, the sequence control circuit 240 transmits a signal over the conductor 274 to inhibit the operation of the logic circuit 740 (FIG. 13) of the output control circuit 243. This action prevents the activation of the timing circuit 76 and the sorting gate drive circuit 87. Hence, the air diverting nozzle 55 continues to operate to divert the envelope into the receptacle 51 for non-machine readable mail.

Should no printed matter appear in the address portion of the envelope within the one inch of the leading edge thereof, then the adjacent bit recognizer circuit 245 upon sensing the presence of two adjacent bits in the flip-flop circuits 435*a*–436*f* of the shift register circuit 241 will transmit a two adjacent bit recognition signal to the sequence control circuit 240 over the conductor 270 after the start scan signal is transmitted to the sequence control circuit 240 over the conductor 97. This action starts the first cycle of interrogation for skew detection.

At the start of the first cycle of interrogation, the sequence control circuit 240 generates clock pulses and transmits the clock pulses to the shift register circuit 241 over the conductors 355–358. Such clock pulses will cause the shift register circuit 241 to shift the two adjacent bit signals detected by the adjacent bit recognizer circuit 245 to the reference zone of the shift register circuit 241. The flip-flop circuits 436*e* and 436*f* of the shift register circuit 241 constitute the reference zone. Simultaneously, the sequence control circuit 240 transmits the clock pulses to the skew detector, up-down counter circuit 242 over the conductor 365.

When the two adjacent bit signals reach the reference zone of the shift register circuit 241, signals are transmitted from the shift register circuit 241 to the sequence control circuit 240 over the conductor 366 and 367 to stop the transmission of clock pulses to the shift register circuit 241 from the sequence control circuit 240. Simultaneously, the transmission of clock pulses to the skew detector, up-down counter circuit 242 is also stopped. Therefore, the shift register circuit 241 and the skew detector, up-down counter circuit 242 receive the same number of clock pulses. This ends the first cycle of interrogation for skew detection.

In order to ascertain skew measurement, the address information is subjected to a first interrogation cycle and a second interrogation cycle. The address is interrogated twice within a predetermined spacing. At the start of the first cycle of interrogation, the sequence control circuit 240 transmitted a signal over the conductor 293′ to activate the timing control circuit 293. At a prescribed time delay sufficient for the envelope to advance a predetermined distance, the timing control circuit 293 transmitted a return pulse to the sequence control circuit 240 over a conductor 294. The return pulse initiates the second cycle of interrogation.

At the initiation of the second cycle of interrogation, the sequence control circuit 240 again transmits clock pulses to the shift register circuit 241 over the conductors 355–358 and to the skew detector, up-down counter circuit 242 over the conductor 365. When two adjacent bits are shifted within the shift register circuit 241 to the reference zone, signals are transmitted from the shift register circuit 241 to the sequence control circuit 240 over the conductors 366 and 367. Thereupon, the sequence control circuit 240 stops the transmission of clock pulses to the shift register circuit 241 and to the skew detector, up-down counter circuit 242. Should the adjacent bit recognizer circuit 245 fail to detect two adjacent bit logic signals in the shift register circuit 241 during the second cycle of interrogation, then the zero recognize circuit 244 transmits a signal to the sequence control circuit 240 over the conductor 371 to stop the transmission of shift pulses to the shift register circuit 241 and to the skew detector, up-down counter 242.

The skew detector, up-down counter circuit 242 (FIGS. 14*a* and 14*b*) measures the difference in the number of shift pulses required to shift the logic signals of two adjacent bits to the reference zone of the shift register circuit 241 during the first interrogation cycle and during the second interrogation cycle. The difference between the number of shift pulses counted in the first and second interrogation cycles is indicative of whether the skew requirement is met.

If the difference between the required shift pulses during the first and second cycle of interrogation is zero or one, there is no skew and no output pulse is produced by the skew detector circuit 242 over either the conductor 602 or the conductor 603. When the remaining pulse count or the difference pulse count was two or three, the skew detector circuit 242 transmits a signal over the conductor 602 to the character size and skew detector circuit 625 to indicate the address is skewed. The skew detector circuit 242 transmits a signal over the conductor 603 to initiate the operation of the character size and skew detector circuit 625 for measuring the height of the characters when the count is four or more and skew may be present.

The character size and skew detector matrix circuit 625 (FIG. 16) measures the character height and completes the evaluation of skew when the difference pulse count is greater than three. The character height measurement is made by sensing the contents of the last eight flip-flop circuits 435*y*–436*f* (FIG. 11*d*) of the shift register circuit 241 over the conductors 452*y*–453*d*, 366 and 367. The flip-flop circuits 435*y*–436*f* are sensed in succession commencing with the flip-flop circuit 436*f*.

Should the character height be within the range of not less than two bits high and not more than seven bits high, then a signal is transmitted over the conductor 622 to the output control circuit 243 to indicate that the character height meets the requirement for machine readable mail. On the other hand, should the height of the character be greater than seven bits, then a positive potential signal is fed to the output control circuit 243 over the conductor 662 to indicate that the envelope is to be classified as non-machine readable mail.

During the first cycle of interrogation, the character size measurement, if not greater than seven bits high, is stored in the flip-flop memory circuits 640, 645, 649, 653, 657 and 661 of the character size and skew detector matrix circuit 625 for use during the second cycle of interrogation. The final skew determination remains to be examined for the difference count of four or more. The difference in pulse count may be caused by skew or by two separate lines. If the address is not skewed, there will be a distinct space in the set flip-flop circuits of the shift register circuit 241 between lines of characters in the address block. If the address is skewed greater than ten degrees, the lines will tend to run together and the address will appear as a solid block with no spacing in the set flip-flop circuits of the shaft register circuit 241.

A negative pulse transmitted by the character size and skew detector matrix 625 over the conductor 715 to the output control circuit 243 indicates the absence of skew at the end of the second cycle of interrogation. In such an event, the envelope may be classified as machine readable mail. A positive pulse transmitted over the conductor 715 to the output control circuit 243 indicates the presence of skew. Accordingly, the envelope will be classified as non-machine readable mail. Should the character size and skew detector matrix circuit 625 recognize the height of the character as greater than seven and therefore too high, a signal is transmitted over the conductor 721 from the character size and skew detector matrix circuit 625 to the output control circuit 243.

Should a logic signal be transmitted over the conductor 421*g* from the digital converter circuit 71 to the flip-flop circuit 436*g* (FIG. 11*d*) of the shift register circuit 241 to indicate the presence of printed matter within ½ inch of the lower edge of the envelope, then the shift register circuit 241 will transmit a signal over conductor 448 to the output control circuit 243 (FIG. 13) to indicate the classification of non-machine readable mail.

The output control circuit 243 (FIG. 13) makes the final decision as to whether the envelope advancing through the scanning zone A is machine readable mail or non-machine readable mail based upon all the information received from the various logic circuits. In addition, the output control circuit 243 generates reset pulses and the pulse signal which activates the timing circuit 76 and the sorting drive circuit 87.

In the event the envelope advancing through the scanning zone A meets the requirements for machine readable mail, such as character height, skew and printed matter within the area of ½ inch of the lower edge of the envelope, then the logic circuit 780 emits a pulse. If the envelope advancing through the scanning zone A does not meet the requirements for machine readable mail, such as character height, skew and the area within ½ inch of the lower edge of the envelope, then the logic circuit 71 emits a pulse.

These examinations are made during the first cycle of interrogation and also during the second cycle of interrogation. Should the logic circuit 782 emit a pulse during the first cycle of interrogation, the second cycle of interrogation or both cycles of interrogation, then the logic circuit 740 does not produce an output pulse to activate the timing circuit 76 and the sorting drive circuit 87. On the other hand, should the logic circuit 780 emit a pulse during the first cycle of interrogation and the second cycle of interrogation, then the flip-flop circuits 785 and 786 will be set.

The setting of the flip-flop circuit 786 will cause the logic circuit 740 to produce a pulse, if not signal is impressed over the conductor 274 to indicate the presence of printed matter within one inch of the leading edge of the envelope. When the logic circuit 740 produces an output pulse the timing control circuit 76 is activated. The timing control circuit 76 is activated only when the envelope is classified as machine readable mail.

The timing circuit 76 coordinates the position of the envelope advancing into and through the scanning zone A with the operation of the sorting drive circuit 87 to control the operation of the air diverting nozzles 55 and 55′ at the precise time the envelope approaches the air diverting nozzles 55 and 55′. The detection of machine readable mail by the address scanning device 70 causes the output control circuit 243 to emit an output pulse over the conductor 201 to activate the timing circuit 76. The timing circuit 76, under control of the phototransistor trailing edge detector 80 and the phototransistor leading edge detector 81, energizes the solenoid 220 of the sorting drive circuit 87 in timed sequence with the interrogated envelope advancing toward the air diverting nozzle 55′.

If the envelope is classified as machine readable mail, the solenoid 220 is operated to open the valve, not shown, for permitting the passage of air under pressure through the nozzle 55′ and to cut off the passage of air through the nozzle 55. When the nozzle 55′ ejects air under pressure, the envelope interrogated is diverted to the receptacle 50 for machine readable mail.

If the output control circuit 243 does not transmit a pulse over the conductor 202, the timing circuit 76 is not activated. The solenoid 220 of the sorting drive circuit 87 remains in its initial state. Air under pressure is continuously discharged from the nozzle 55 and the interrogated envelope is diverted into the receptacle 51 for non-machine readable mail.

Printed matter or printed information as herein employed shall mean characters are formed on an article by means or methods other than by writing by hand with a pen, pencil or the like.

It is to be understood that modifications and variations of the embodiment of the invention disclosed herein may be resorted to without departing from the spirit of the invention and the scope of the appended claims.

Having thus described our invention, what we claim as new and desire to protect by Letters Patent is:

1. An article sorting apparatus comprising means for advancing an article along a predetermined path, scanning means disposed along said path for scanning said article and for producing simultaneously a plurality of discrete signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article.

2. An article sorting apparatus as claimed in claim 1 wherein said circuit means in response to said signals received from said scanning means ascertains whether said characters are printed information for controlling the operation of said diverting means.

3. An article sorting apparatus as claimed in claim 1 wherein said circuit means in response to said signals received from said scanning means ascertains whether said characters are printed information or handwritten information for controlling the operation of said diverting means.

4. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said circuit means in response to said signals received from said scanning means determines the density of said characters for controlling the operation of said diverting means.

5. An article sorting apparatus as claimed in claim 4 wherein said circuit means in response to said signals received from said scanning means determines whether the density of said characters is within the range of 6 to 14 per inch for controlling the operation of said diverting means.

6. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the articles, said circuit means in response to said signals received from said scanning means determines the height of said characters for controlling the operation of said diverting means.

7. An article sorting apparatus as claimed in claim 6 wherein said circuit means in response to said signals received from said scanning means determines whether the height of said characters is within the range of 45 to 255 mils for controlling the operation of said diverting means.

8. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said circuit means in response to said signals received from said scanning means determines whether said characters are skewed within a prescribed range for controlling the operation of said diverting means.

9. An article sorting apparatus as claimed in claim 8 wherein said circuit means in response to said signals received from said scanning means determines whether said characters are skewed less than five degrees for controlling the operation of said diverting means.

10. An article sorting apparatus as claimed in claim 1 wherein said circuit means in response to said signals received from said scanning means determines whether said characters are located within a prescribed zone on said article for controlling the operation of said diverting means.

11. An article sorting apparatus as claimed in claim 1 wherein said circuit means in response to said signals received from said scanning means determines whether said characters are located within a predetermined distance from the leading edge of said article for controlling the operation of said diverting means.

12. An article sorting apparatus as claimed in claim 1 wherein said circuit means in response to said signals received from said scanning means determines whether said characters are located within a predetermined distance from the lower edge of said article for controlling the operation of said diverting means.

13. An article sorting apparatus as claimed in claim 4 wherein said circuit means in response to said signals received from said scanning means also determines the height of said characters for controlling the operation of said diverting means.

14. An article sorting apparatus as claimed in claim 4 wherein said circuit means in response to said signals received from said scanning means also determines whether said characters are skewed within a prescribed range for controlling the operation of said diverting means.

15. An article sorting apparatus as claimed in claim 4 wherein said circuit means in response to said signals received by said scanning means also determines whether said characters are located within a prescribed zone on said article for controlling the operation of said diverting means.

16. An article sorting apparatus as claimed in claim 6 wherein said circuit means in response to said signals received from said scanning means also determines whether said characters are skewed within a prescribed range for controlling the operation of said diverting means.

17. An article sorting apparatus as claimed in claim 6 wherein said circuit means in response to said signals received from said scanning means also determines whether said characters are located within a prescribed zone on said article for controlling the operation of said diverting means.

18. An article sorting apparatus as claimed in claim 8 wherein said circuit means in response to said signals received from said scanning means also determines whether said characters are located within a prescribed zone on said article for controlling the operation of said diverting means.

19. An article sorting apparatus as claimed in claim 13 wherein said circuit means in response to said signals received from said scanning means also determines whether said characters are skewed within a prescribed range for controlling the operation of said diverting means.

20. An article sorting apparatus as claimed in claim 13 wherein said circuit means in response to said signals received from said scanning means also determines whether said characters are located within a prescribed zone on said article for controlling the operation of said diverting means.

21. An article sorting apparatus as claimed in claim 19 wherein said circuit means in response to said signals received from said scanning means also determines whether said characters are located within a prescribed zone on said article for controlling the operation of said diverting means.

22. An article sorting apparatus as claimed in claim 1 and comprising an inhibiting circuit for inhibiting said circuit means from responding to said signals received from said scanning means in the absence of an article to be scanned by said scanning means.

23. An article sorting apparatus as claimed in claim 1 wherein said means for advancing the article along said predetermined path is a conveyor belt, and comprising an inhibiting circuit for inhibiting said circuit means from responding to signals from said scanning means emanating from said belt.

24. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, circuit means connected to said scanning means and said diverting means and responsive to said signals produced by said scanning means for controlling the operation of said diverting means in selecting the path of travel of the article, said circuit means includes a digital converter for receiving said signals produced by said scanning means and converting said signals into logic signals, said circuit means further includes a storage and decision circuit for receiving said logic signals to control the operation of said diverting means in selecting the path of travel of said article, and an inhibiting circuit for inhibiting said storage and decision circuit from examining said logic signals in the absence of an article to be scanned by said scanning means.

25. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, circuit means connected to said scanning means and said diverting means and responsive to said signals produced by said scanning means for controlling the operation of said diverting means in selecting the path of travel of the article, said means for advancing the article along said predetermined path being a conveyor belt, said circuit means includes a digital converter for receiving said signals produced by said scanning means and converting said signals into logic signals, said circuit means further includes a storage and decision circuit for receiving said logic signals to control the operation of said diverting means in selecting the path of travel of said article, and an inhibiting circuit for inhibiting said storage and decision circuit from examining logic signals converted from signals emanating from said belt.

26. An article sorting apparatus as claimed in claim 22 and comprising a light responsive circuit disposed adjacent said predetermined path and connected to said inhibiting circuit for controlling the operation of said inhibiting circuit in response to the movement of said article along said predetermined path.

27. An article sorting apparatus as claimed in claim 23 and comprising a light responsive circuit disposed adjacent said predetermined path and connected to said inhibiting circuit for controlling the operation of said inhibiting circuit in response to the movement of said article along said predetermined path.

28. An article sorting apparatus as claimed in claim 25 and comprising a light responsive circuit disposed adjacent said predetermined path upstream of said scanning means and connected to said inhibiting circuit for controlling the operation of said inhibiting circuit in response to the movement of said article along said predetermined path.

29. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said scanning means produces said signals as a plurality of discrete signals, said circuit means being responsive to a plurality of adjacent signals for ascertaining whether said characters on said article are printed information for controlling the operation of said diverting means.

30. An article sorting apparatus as claimed in claim 29 wherein said scanning means scans along a predetermined optical line to produce the plurality of discrete signals.

31. An article sorting apparatus as claimed in claim 30 wherein said discrete signals are transmitted simultaneously to said circuit means.

32. An article sorting apparatus as claimed in claim 30 wherein said discrete signals are transmitted in parallel to said circuit means.

33. An article sorting apparatus as claimed in claim 32 wherein said circuit means includes a digital converter for receiving said parallel signals produced by said scanning means and converting said parallel signals into parallel logic signals, said circuit means further including a storage and decision circuit for receiving said parallel logic signals and detecting a plurality of adjacent signals for ascertaining whether said characters on said article are printed information for controlling the operation of said diverting means.

34. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said scanning means scans along a predetermined optical line to produce said signals as a plurality of discrete parallel signals, said circuit means comprising: a digital converter circuit for receiving said parallel signals and for converting said discrete parallel signals into parallel logic signals, a shift register circuit connected to said digital converter circuit for storing said parallel logic signals, means connected to said shift register circuit for transmitting clock pulses thereto to shift adjacent bit signals in said shift register circuit to a reference zone as said article advances along said path at different locations thereof, and a counter circuit for counting the difference in clock pulses required to shift adjacent bit signals to said reference zone at said different locations along said path for determining whether said characters are skewed within a prescribed range for controlling the operation of said diverting means.

35. An article sorting apparatus comprising means for advancing an article along a predetermined path, scanning means disposed along said path for scanning said article and for producing signals in accordance with the formation of characters on said articles, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said scanning means scans along a predetermined optical line to produce said signals as a plurality of parallel discrete signals, said circuit means comprising: a digital converter circuit for receiving said parallel signals and for converting said parallel signals into parallel logic signals, a shift register circuit connected to said digital converter circuit for storing said parallel logic signals, an adjacent bit recognizer circuit connected to said shift register circuit for detecting the presence of a plurality of adjacent bit signals within said shift register circuit, a sequence control circuit connected to said adjacent bit recognizer circuit and said shift register circuit for transmitting clock pulses to said shift register circuit to advance adjacent bit signals within a reference zone of said shift register circuit during a first and second cycle, means connected to said sequence control circuit to transmit clock pulses to said shift register circuit to commence said second cycle after a predetermined time delay from the commencement of the first cycle, said first cycle commences upon the detection of the adjacent bit signals by said adjacent bit recognizer circuit, and a counter circuit connected to said sequence control circuit for counting the difference in clock pulses required to shift adjacent bit signals to said reference zone during said first and second cycle to determine whether said characters are skewed within a prescribed range for controlling the operation of said diverting means.

36. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said scanning means scans along a predetermined optical line to produce said signals as a plurality of discrete parallel signals, said circuit means comprising: a digital converter circuit for receiving said parallel signals and for converting said discrete parallel signals into parallel logic signals, a shift register circuit connected to said digital converter circuit for storing said parallel logic signals, and a character size detector circuit connected to said shift register circuit for detecting the number of adjacent bit signals in said shift register circuit to determine the size of said characters for controlling the operation of said diverting means.

37. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said scanning means scans along a predetermined optical path to produce said signals as a plurality of discrete parallel signals, said circuit means comprising: a digital converter circuit for receiving said parallel signals and for converting said discrete parallel signals into parallel logic signals, a shift register circuit connected to said digital converter circuit for storing said parallel logic signals, and a skew detector circuit connected to said shift register circuit for detecting the presence of a space between bit signals stored in said shift register circuit to ascertain whether said characters are skewed for controlling the operation of said diverting means.

38. An article sorting apparatus as claimed in claim 35 and wherein said circuit means comprises a character size detector circuit connected to said shift register circuit for detecting the number of adjacent bit signals in said shift register circuit to determine the size of said characters for controlling the operation of said diverting means.

39. An article sorting apparatus as claimed in claim 35 and wherein said circuit means comprises a character size and skew detector circuit connected to said shift register circuit for detecting the number of adjacent bit signals in said shift register circuit to determine the size of said characters for controlling the operation of said diverting means and for detecting the presence of a space between adjacent bit signals stored in said shift register circuit to ascertain whether said characters are skewed for controlling the operation of said diverting means.

40. An article sorting apparatus as claimed in claim 1 wherein said scanning means scans along a predetermined optical path to produce said signals as a plurality of parallel discrete signals.

41. An article sorting apparatus as claimed in claim 35 wherein said circuit means includes a zero recognize circuit connected to said shift register circuit and said sequence control circuit to stop the transmission of clock pulses from said sequence control circuit to said shift register circuit in the absence of adjacent bit signals within said shift register circuit.

42. An article sorting apparatus as claimed in claim 1 and comprising a light responsive circuit disposed adjacent said predetermined path and connected to said circuit means for controlling the operation of said diverting means in timed relation with the advancement of said article along said predetermined path.

43. An article sorting apparatus as claimed in claim 42 wherein said light responsive means includes an article trailing edge detector.

44. An article sorting apparatus as claimed in claim 42 wherein said light responsive means includes an article leading edge detector.

45. An article sorting apparatus as claimed in claim 43 wherein said light responsive means includes an article leading edge detector.

46. An article sorting apparatus comprising means for advancing an article along a predetermined path, scanning means disposed along said path for scanning said article and for producing signals in accordance with the formation of characters on said article, diverting means disposed along said path and operable for diverting the article either into a path for articles classified as machine readable articles or into a path for articles classified as non-machine readable articles, and circuit means connected to said scanning means and said diverting means and responsive to said signals produced by said scanning means for controlling the operation of said diverting means in selecting the path of travel of the article, said scanning means scans along a predetermined optical path to produce said signals as a plurality of parallel discrete signals.

References Cited

UNITED STATES PATENTS

| | | |
|---|---|---|
| 3,108,694 | 10/1963 | Crain et al. |
| 3,266,626 | 8/1966 | Simjian. |

ALLEN N. KNOWLES, *Primary Examiner.*

U.S. Cl. X.R.

209—74, 111.7; 250—219; 340—146.3

UNITED STATES PATENT OFFICE

CERTIFICATE OF CORRECTION

Patent No. 3,432,032

March 11, 1969

David G. Curphey et al.

It is certified that error appears in the above identified patent and that said Letters Patent are hereby corrected as shown below:

Column 3, line 28, "latter" should read -- letter --. Column 7, line 37, "addressing" should read -- address --. Column 18, line 31, "implifier" should read -- amplifier --. Column 25, line 70, "431" should read -- 531 --. Column 26, in the table, first column, line 16 thereof, "6" should read -- 16 --. Column 31, line 70, "in" should read -- is --. Column 35, line 40, "space" should read -- spaces --. Column 43, line 70, "202" should read -- 201 --.

Signed and sealed this 21st day of April 1970.

(SEAL)

Attest:

Edward M. Fletcher, Jr.

Attesting Officer

WILLIAM E. SCHUYLER, JR.

Commissioner of Patents